US012207081B2

(12) United States Patent
Lee

(10) Patent No.: US 12,207,081 B2
(45) Date of Patent: Jan. 21, 2025

(54) APPARATUS, ARTICLES OF MANUFACTURE, AND METHODS FOR AIRCRAFT COMMUNICATION CONFIGURATION

(71) Applicant: Insitu, Inc., Bingen, WA (US)

(72) Inventor: Edward W. Lee, Gig Harbor, WA (US)

(73) Assignee: Insitu, Inc., Bingen, WA (US)

( * ) Notice: Subject to any disclaimer, the term of this patent is extended or adjusted under 35 U.S.C. 154(b) by 453 days.

(21) Appl. No.: 17/527,709

(22) Filed: Nov. 16, 2021

(65) Prior Publication Data

US 2023/0156462 A1    May 18, 2023

(51) Int. Cl.
*H04W 12/069* (2021.01)
*H04W 12/03* (2021.01)
*H04W 72/0453* (2023.01)
*H04W 84/06* (2009.01)

(52) U.S. Cl.
CPC ......... *H04W 12/03* (2021.01); *H04W 12/069* (2021.01); *H04W 72/0453* (2013.01); *H04W 84/06* (2013.01)

(58) Field of Classification Search
CPC .............. H04W 12/03; H04W 12/069; H04W 72/0453
USPC ....................................................... 455/431
See application file for complete search history.

(56) References Cited

U.S. PATENT DOCUMENTS

| 2017/0076617 | A1* | 3/2017 | Schupp ............... G08G 5/0013 |
| 2017/0303123 | A1 | 10/2017 | Villar |
| 2019/0389498 | A1* | 12/2019 | Grimm ................ H04L 43/103 |
| 2021/0336797 | A1 | 10/2021 | Van Duren et al. |

OTHER PUBLICATIONS

European Patent Office, "Extended European Search Report", issued in connection with European Patent Application No. 22184320.4-1218 on Jan. 4, 2023, 6 pages.
DIGI IX15, Programmable gateway connects Digi XBee®-enabled devices to remote applications over cellular and Ethernet, digi.com, 4 pages.
Fruci, Chris, "The Right Wireless Standard for Your IOT Sensors." Retrieved Mar. 7, 2022. https://radiobridge.com/blog/choosing-the-right-wireless-standard-for-your-iot-sensors, 9 pages.
Semtech Corporation, LoRa® and LoRaWAN®: A Technical Overview, Technical Paper, Feb. 11, 2020, 26 pages.

* cited by examiner

*Primary Examiner* — Ted M Wang
(74) *Attorney, Agent, or Firm* — HANLEY, FLIGHT & ZIMMERMAN, LLC

(57) ABSTRACT

Methods, apparatus, systems, and articles of manufacture are disclosed for aircraft communication configuration. An example apparatus includes memory, instructions in the apparatus, and processor circuitry to execute the instructions to decrypt a first message received from a first radio of an aircraft, the first radio using a first communication protocol, the aircraft including a second radio to be configured for a second communication protocol different from the first communication protocol, and, in response to a determination that the first message includes radio configuration information associated with the second radio, configure a third radio to transmit a second message to the second radio based on the radio configuration information.

20 Claims, 29 Drawing Sheets

APPARATUS, ARTICLES OF MANUFACTURE, AND METHODS FOR AIRCRAFT COMMUNICATION CONFIGURATION

FIELD OF THE DISCLOSURE

This disclosure relates generally to aircraft and, more particularly, to apparatus, articles of manufacture, and methods for aircraft communication configuration.

BACKGROUND

Aircraft, such as aerial vehicles (AVs), commercial aircraft, utility aircraft, and unmanned aerial vehicles (UAVs) (e.g., drones), include radios to facilitate communication between the aircraft and ground control stations. Some such radios are configured using a priori or previously known radio configuration settings of the radios. Without such a priori information, establishing communication links between the aircraft and the ground control stations is difficult.

SUMMARY

Figure 1A:
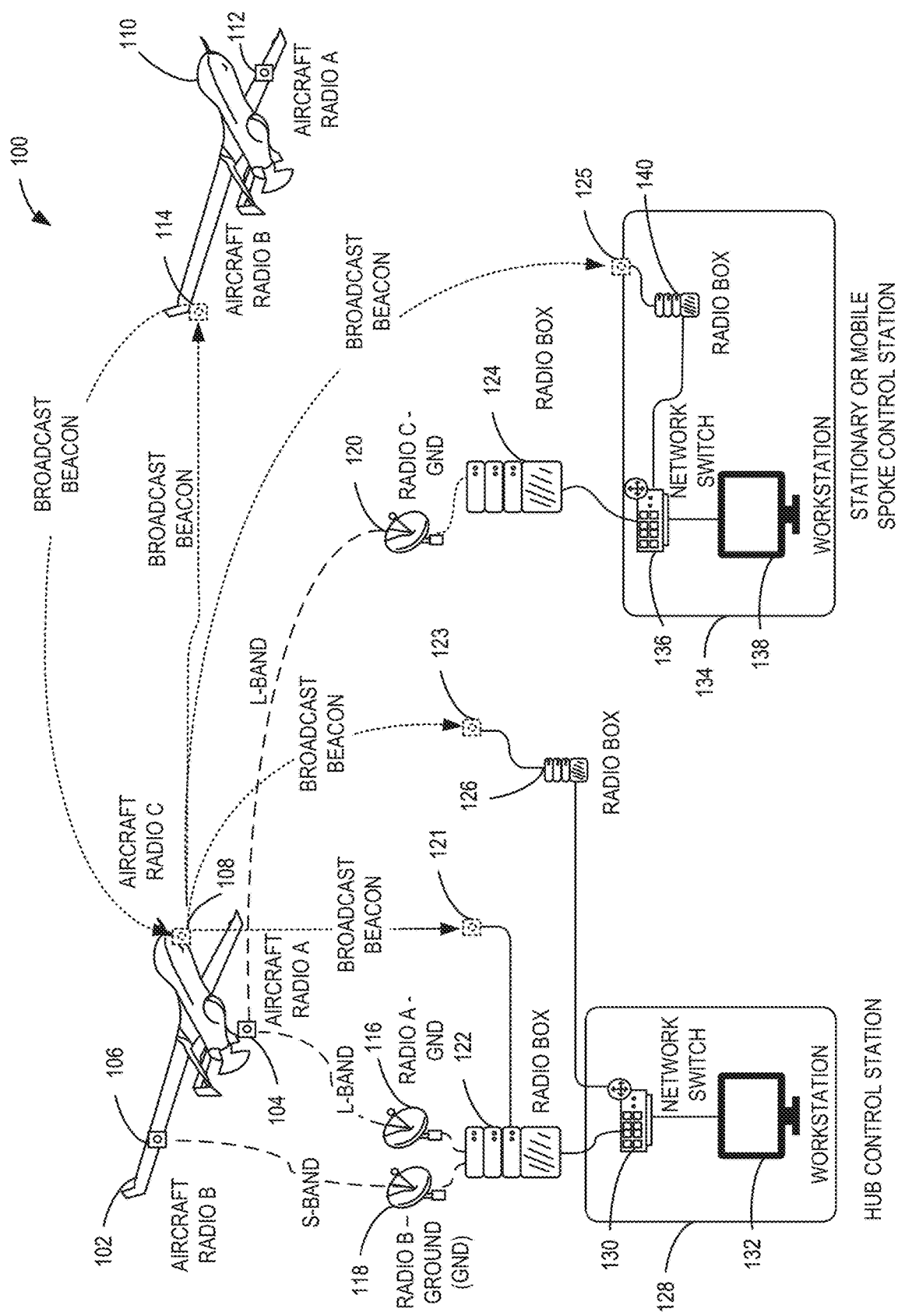
FIG. 1A illustrates a first example aircraft radio communication system to configure example radios associated with an example aircraft, an example control station, and/or an example operator workstation based on example line-of-sight (LOS) radiofrequency paths.

Example apparatus, articles of manufacture, and methods for aircraft communication configuration are disclosed herein. An example apparatus includes memory, instructions in the apparatus, and processor circuitry to execute the instructions to decrypt a first message received from a first radio of an aircraft, the first radio using a first communication protocol, the aircraft including a second radio to be configured for a second communication protocol different from the first communication protocol, and, in response to a determination that the first message includes radio configuration information associated with the second radio, configure a third radio to transmit a second message to the second radio based on the radio configuration information.

An example non-transitory computer readable storage medium includes instructions that, when executed, cause processor circuitry to at least decrypt a first message received from a first radio of an aircraft, the first radio using a first communication protocol, the aircraft including a second radio to be configured for a second communication protocol different from the first communication protocol, and, in response to a determination that the first message includes radio configuration information associated with the second radio, configure a third radio to transmit a second message to the second radio based on the radio configuration information.

An example method includes decrypting a first message received from a first radio of an aircraft, the first radio using a first communication protocol, the aircraft including a second radio to be configured for a second communication protocol different from the first communication protocol, and, in response to determining that the first message includes radio configuration information associated with the second radio, configuring a third radio to transmit a second message to the second radio based on the radio configuration information.

DETAILED DESCRIPTION

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein "substantially real time" refers to occurrence in a near instantaneous manner recognizing there may be real world delays for computing time, transmission, etc. Thus, unless otherwise specified, "substantially real time" refers to real time +/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

Aircraft, such as aerial vehicles (AVs), commercial aircraft, utility aircraft, and unmanned aerial vehicles (UAVs) (e.g., drones), include radios to facilitate communication between the aircraft (e.g., one or more aircraft) and control stations (e.g., ground control stations). Some such radios are configured using a priori or previously known radio configuration settings of the radios. Without such a priori information, establishing communication links between the aircraft and the control stations is difficult.

Examples disclosed herein include systems, apparatus, articles of manufacture, and methods for aircraft communication configuration. In some disclosed examples, an aircraft is provided with and/or otherwise includes at least two radios, which can include a public radio and a private radio. In some such disclosed examples, the public radio can be accessible using a first communication protocol and the private radio can be accessible using a second communication protocol. As used herein, a "public radio" refers to a radio configured using radio configuration information that causes the radio to be accessible to a different radio using known communication protocols. For example, a public radio can correspond to a radio used in a public network, such as the Internet or other publicly available network. As used herein, a "private radio" refers to a radio configured using radio configuration information that causes access to the radio to be restricted. For example, a private radio can correspond to a radio used in a private network, such as an enterprise network in which only enterprise members have access. In some disclosed examples, the private radio can correspond to a primary radio because it may be desirable to communicate messages using the private radio due to the enhanced security aspects of the private radio. In some disclosed examples, the public radio can correspond to a secondary radio because it may not be as desirable to communicate messages using the public radio due to reduced security aspects of the public radio with respect to the private radio.

In some disclosed examples, the first communication protocol can be based on one or more first frequencies or a first frequency band of the electromagnetic spectrum, such as the Industrial, Scientific, and Medical (ISM) frequency band. In some such examples, the ISM frequency bands can include frequency ranges of 902 megahertz (MHz) to 928 MHz, 2.4 gigahertz (GHz) to 2.4835 GHz, 5.725 GHz to 5.825 GHz, etc. For example, devices such as cordless phones and microwaves can utilize frequencies in the frequency range of 902-928 MHz. In some examples, Bluetooth or Wireless Fidelity (Wi-Fi) enabled devices can utilize frequencies in the 2.4-2.4835 GHz frequency range. In some examples, Wi-Fi enabled devices can utilize frequencies in the 5.725-5.825 GHz frequency range.

In some disclosed examples, the first communication protocol can be implemented by an Internet-of-Things (IoT) communication protocol. The IoT is a concept in which a large number of computing devices are interconnected to each other and to the Internet to provide functionality and data acquisition at very low levels. Thus, as used herein, an IoT device can include a semiautonomous device performing a function, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device can be a smart phone, laptop, tablet, or personal computer, or other larger device. Further, an IoT device can be a virtual device, such as an application on a smart phone or other computing device. IoT devices can include IoT gateways, used to couple IoT devices to other IoT devices and to cloud applications, for data storage, process control, and the like. IoT devices can be used in various types of environments, such as residential homes, commercial or industrial settings, and the like.

Networks of IoT devices can include commercial and home automation devices, such as water distribution systems, electric power distribution systems, pipeline control systems, plant control systems, light switches, thermostats, locks, cameras, alarms, motion sensors, and the like. The IoT devices can be accessible through remote computers, servers, and other systems, for example, to control systems or access data. IoT devices can be accessible In some disclosed examples, the second communication protocol associated with the private radio can be based on one or more second frequencies or a second frequency band of the electromagnetic spectrum. For example, the second frequency band can be implemented by the L-Band (e.g., a frequency range of 1 GHz to 2 GHz), the S-Band (e.g., a frequency range of 2 GHz to 4 GHz), the C-Band (e.g., a frequency range of 4 GHz to 8 GHz), or any other band (e.g., the Ka-Band, the Ku-Band, etc.) of the electromagnetic spectrum. In some disclosed examples, the second communication protocol can effectuate communication between radios or other communication devices based on frequency bands that implement Very High Frequency (VHF), Ultra High Frequency (UHF), or other frequency bands utilized for communication with aircraft. For example, VHF can correspond to radio frequencies in the 30 to 300 MHz frequency band of the electromagnetic spectrum. In some examples, UHF can correspond to radio frequencies in the 300 MHz to 3 GHz frequency band of the electromagnetic spectrum. In some examples, the first communication protocol, such as an IoT communication protocol, can have a lower bandwidth than the second communication protocol, such as a satellite communication protocol based on L-Band, S-Band, C-Band, Ka-Band, Ku-Band, etc.

In some disclosed examples, a first aircraft can include a first public radio and a first private radio. For example, the first aircraft can utilize the first public radio for less secure communication (e.g., communication using a first degree or level of encryption) with another device and utilize the first private radio for more secure communication (e.g., communication using a second degree or level of encryption greater than the first degree or level). In some disclosed examples, the first aircraft can be instructed to communicate with a second private radio of a second aircraft that also includes a second public radio. In some disclosed examples, the first aircraft can be instructed to communicate with any number and/or type of vehicles (e.g., a vehicle that includes one or more public radios) within a range of a radiofrequency broadcast beacon. In some such disclosed examples, the first aircraft can communicate with one or more aircraft, one or more ground vehicles (e.g., unmanned or manned ground vehicles), one or more marine vehicles (e.g., unmanned or manned underwater vehicles, boats, vessels, etc.), etc., and/or combination(s) thereof. Without a priori knowledge of radio configuration information (e.g., one or more configurations or settings of a radio, an encryption key parameter or setting, etc., and/or combination(s) thereof) associated with the second private radio, the first aircraft may be unable to communicate with the second aircraft via the first private radio and the second private radio.

Advantageously, examples disclosed herein can utilize the first public radio and the second public radio to effectuate configuration changes of the respective private radios for improved security associated with the communication between the private radios, and/or, more generally, the first aircraft and the second aircraft. For example, the first aircraft can transmit a first message based on an IoT communication protocol using the first public radio to the second public radio. The second aircraft can transmit a second message based on the IoT communication protocol using the second public radio to the first public radio. The first message can include a request for radio configuration information of the second private radio and the second message can include the requested radio configuration information. The first aircraft can configure the first private radio based on the received radio configuration information. The first aircraft can proceed to transmit future messages to the second aircraft via the first private radio for improved security and to decrease a likelihood of communications between the first aircraft and the second aircraft becoming compromised and/or otherwise vulnerable to malicious actors.

In some disclosed examples, the first aircraft can be instructed to communicate with a third private radio of a control station (e.g., a ground control station) that also includes a third public radio. Without a priori knowledge of radio configuration information associated with the third private radio, the first aircraft may be unable to communicate (e.g., unable to establish a communication channel or link) with the ground control station via the first private radio and the third private radio.

Advantageously, examples disclosed herein can utilize the first public radio and the second public radio and/or the first public radio and the third public radio to effectuate configuration changes of the first and third private radios for improved security associated with the communication between the private radios, and/or, more generally, the first aircraft and the ground control station. For example, the first aircraft can transmit a third message based on the IoT communication protocol using the first public radio to the second public radio. The second aircraft can transmit a fourth message based on the IoT communication protocol using the second public radio to the first public radio. The third message can include a request for radio configuration information of the third private radio and the fourth message can include the requested radio configuration information. The first aircraft can configure the first private radio based on the received radio configuration information. Advantageously, the first aircraft can proceed to transmit future messages to the ground control station via the first private radio and the third private radio for improved security and to decrease a likelihood of communications between the first aircraft and the ground control station becoming compromised and/or otherwise vulnerable to malicious actors.

In some disclosed examples, the first aircraft can transmit a fifth message based on the IoT communication protocol using the first public radio to the third public radio. The ground control station can transmit a sixth message based on the IoT communication protocol using the third public radio to the first public radio. The fifth message can include a request for radio configuration information of the third private radio and the sixth message can include the requested radio configuration information. The first aircraft can configure the first private radio based on the received radio configuration information. Advantageously, the first aircraft can proceed to transmit future messages to the ground control station via the first private radio and the third private radio for improved security and to decrease a likelihood of communications between the first aircraft and the ground control station becoming compromised and/or otherwise vulnerable to malicious actors.

FIG. 1A illustrates a first example aircraft radio communication system 100 including a first example aircraft 102, which includes a first example radio 104, a second example radio 106, and a third example radio 108. The first aircraft radio communication system 100 includes a second example aircraft 110, which includes a fourth example radio 112 and a fifth example radio 114. The first aircraft radio communication system 100 includes a sixth example radio 116, a seventh example radio 118, an eighth example radio 120, a ninth example radio 121, a tenth example radio 123, an eleventh example radio 125, a first example radio box 122, a second example radio box 124, and a third example radio box 126. The first aircraft radio communication system 100 includes a first example control station 128, which includes a first example network switch 130 and a first example computing system 132. The first aircraft radio communication system 100 includes a second example control station 134, which includes a second example network switch 136, a second example computing system 138, and a fourth example radio box 140.

In the illustrated example, the first aircraft radio communication system 100 configures one(s) of the radios 104, 106, 108, 112, 114, 116, 118, 120, 121, 123, 125 based on example line-of-sight (LOS) radiofrequency paths. For example, the first aircraft 102, the second aircraft 110, the first control station 128, and/or the second control station 134 can communicate with one(s) of each other via LOS propagation, which is a characteristic of electromagnetic radiation in which two radios or other interface device transmit and/or receive data signals when the two radios are in direct view of each other without intervening obstacles.

In the illustrated example, the first aircraft 102 and the second aircraft 110 are unmanned aerial vehicles (UAVs) (e.g., drones, autonomous UAVs, etc.). Alternatively, the first aircraft 102 and/or the second aircraft 110 may be implemented as manned aircraft. In this example, the first aircraft 102 and the second aircraft 110 are fixed-wing aircraft. Alternatively, the first aircraft 102 and/or the second aircraft 110 may be implemented as another type of aircraft (e.g., a rotorcraft). In some examples, the first aircraft 102 and/or the second aircraft 110 may be implemented by any other quantity and/or type of vehicle. For example, the first aircraft 102 and/or the second aircraft 110 may be implemented by one or more different types of aircraft, one or more ground or land-based vehicles (e.g., a manned or unmanned bus, car, train, truck, etc.), one or more marine-based vehicles (e.g., a manned or unmanned boat, buoy, submarine, vessel, etc.), one or more non-terrestrial crafts (e.g., a satellite such as a LEO satellite, a manned or unmanned spacecraft, etc.), etc., and/or combination(s) thereof.

The radios 104, 106, 108, 112, 114, 116, 118, 120, 121, 123, 125 can respectively include a transmitter (e.g., a radio transmitter, an antenna, etc.), a receiver (e.g., a radio receiver, an antenna, etc.), and/or a transceiver (e.g., a radio transceiver, an antenna, etc.) and/or associated circuitry (e.g., control circuitry, a power supply, an amplifier, a modulator, a demodulator, etc.). In this example, the first radio 104, the second radio 106, the third radio 108, the fourth radio 112, the fifth radio 114, the ninth radio 121, the tenth radio 123, and the eleventh radio 125 include one or more omnidirectional (i.e., omni) antennas. For example, an omnidirectional antenna can be implemented by an antenna that radiates equal or substantially equal (e.g., within a tolerance range of +/−0.1%, 0.5%, 1.0%, 2%, etc.) radio power in all directions perpendicular to an axis, with power varying with angle to the axis, and declining to zero on the axis. Additionally or alternatively, the first radio 104, the second radio 106, the third radio 108, the fourth radio 112, the fifth radio 114, the ninth radio 121, the tenth radio 123, and/or the eleventh radio 125 can include one or more different types of antennas for radio communication.

The first radio box 122, the second radio box 124, the third radio box 126, and the fourth radio box 140 of the illustrated example include one or more radios (e.g., one or more radio transmitters, one or more radio receivers, and/or one or more radio transceivers, and/or associated circuitry).

The first radio box 122, the second radio box 124, the third radio box 126, and the fourth radio box 140 of the illustrated example control(s) operation of a radio and/or an antenna. For example, the first radio box 122, the second radio box 124, the third radio box 126, and the fourth radio box 140 can include one or more computing systems that may implement one or more radios and/or otherwise be in communication with one or more radios. In some such examples, the one or more radios can be implemented by one or more application processors (e.g., a radio application processor), radio circuitry, baseband processing circuitry (e.g., analog-to-digital converters (ADCs), digital-to-analog converters (DACs), etc.), synthesizers (e.g., synthesizer circuitry), filters (e.g., filter circuitry), etc. In some such examples, the one or more radios can be in communication with one or more antennas (e.g., omnidirectional antennas) through front-end module circuitry (e.g., a transmit switch, a receive switch, a transmit and receive switch, one or more duplexers, one or more filters, one or more amplifiers, etc.). In some examples, the first radio box 122, the second radio box 124, the third radio box 126, and/or the fourth radio box 140 can include actuators (e.g., pan actuators, tilt actuators, pan-tilt actuators, etc.) on which a radio and/or an antenna can be coupled. For example, the first radio box 122 can include one or more actuators coupled to the ninth radio 121 to cause an adjustment or change in position or orientation of antenna(e) of the ninth radio 121. In some examples, the third radio box 126 can include one or more actuators coupled to the tenth radio 123 to change a position, orientation, etc., of the tenth radio 123.

In some examples, one(s) of the radio boxes 122, 124, 126, 140 can enable or disable a radio. In some examples, the one(s) of the radio boxes 122, 124, 126, 140 can adjust, modify, etc., a parameter (e.g., a radio parameter, a radio setting, a radio configuration parameter, etc.) of a radio. For example, the one(s) of the radio boxes 122, 124, 126, 140 can adjust radio configuration information of a radio, and the radio configuration information can include one or more parameters. In some such examples, the parameter, and/or, more generally, the radio configuration information, can include a frequency or frequency band of operation, a polarization (e.g., a linear direction such as horizontal or vertical, a circular direction such as left-hand or right-hand, etc.), a power or antenna gain, etc. In some examples, the parameter, and/or, more generally, the radio configuration information, can include decryption or encryption settings, which can include a cipher, a key (e.g., a public key, a private key, etc.), etc., that can be used to decrypt or encrypt data.

In some examples, the first radio box 122, the second radio box 124, the third radio box 126, and/or the fourth radio box 140 can be implemented by hardware, software, and/or firmware. For example, the first radio box 122, the second radio box 124, the third radio box 126, and/or the fourth radio box 140 can be implemented by at least one or more hardware circuits (e.g., processor circuitry, discrete and/or integrated analog and/or digital circuitry, a field programmable gate array (FPGA), an Application Specific Integrated Circuit (ASIC), a comparator, an operational-amplifier (op-amp), a logic circuit, etc.) structured to execute machine readable instructions and/or to perform operations corresponding to the machine readable instructions without executing software or firmware, but other structures are likewise appropriate. In some such examples, the first radio box 122, the second radio box 124, the third radio box 126, and/or the fourth radio box 140 can be implemented by radio or radio box circuitry.

In the illustrated example, the first radio box 122 is coupled to the sixth radio 116, the seventh radio 118, and the ninth radio 121. In some examples, the first control station 128 can utilize the first radio box 122 to control operation of the third radio 108. In this example, the second radio box 124 is coupled to the eighth radio 120. In some examples, the second control station 134 can utilize the second radio box 124 to control operation of the third radio 108. In this example, the third radio box 126 is coupled to the tenth radio 123. In this example, the fourth radio box 140 is coupled to the eleventh radio 125.

In the illustrated example, the first control station 128 includes the first network switch 130 to facilitate communication between the first radio box 122 and the first computing system 132. The second control station 134 includes the second network switch 136 to facilitate communication between the second radio box 124 and the second computing system 138. The first network switch 130 and/or the second network switch 136 can be implemented by interface circuitry. For example, the interface circuitry can include a communication device such as a transmitter, a receiver, a transceiver, a modem, a gateway, a wireless access point, and/or a network interface to facilitate exchange of data with external machines (e.g., computing devices of any kind) by a network. The communication can be by, for example, an Ethernet connection, a digital subscriber line (DSL) connection, a telephone line connection, a coaxial cable system, a satellite system, a line-of-sight wireless system, a cellular telephone system, an optical connection, etc. In some examples, the first network switch 130 and/or the second network switch 136 can be implemented by a virtual network switch. For example, the virtual network switch can be implemented by a virtual machine (VM) and/or a container hosted by a computing system (e.g., physical hardware resources that instantiate virtual hardware resources).

In the illustrated example, the first control station 128 can implement a hub control station (e.g., a hub in a hub-and-spoke control architecture, a primary control station, a main control station, etc.). For example, the first control station 128 can be a primary or centralized control station from which aircraft personnel (e.g., an operator, ground crew member, site lead, mission commander, etc.) can control operation of the first aircraft 102, the second aircraft 110, and/or, more generally, the first aircraft radio communication system 100, or portion(s) thereof. The second control station 134 can implement a spoke control station (e.g., a spoke in a hub-and-spoke control architecture, a secondary control station, a downstream ground control station, etc.). For example, the second control station 134 can be a secondary control station that is either stationary or mobile (e.g., a mobile control station, a control station included in a land-based vehicle, a marine-based vehicle, etc., that is capable of moving from location to location) from which aircraft personnel can control operation of the first aircraft 102, the second aircraft 110, and/or, more generally, the first aircraft radio communication system 100, or portion(s) thereof, in a location separate from the first control station 128. In some examples, more than one spoke control station can be utilized.

In the illustrated example, the first control station 128 includes the first computing system 132 to control and/or otherwise manage the first aircraft radio communication system 100, or portion(s) thereof. The second control station 134 includes the second computing system 138 to control and/or otherwise manage the first aircraft radio communication system 100, or portion(s) thereof. In this example, the first computing system 132 and the second computing system 138 are workstations (e.g., operator workstations), which can be implemented by a server, a desktop computer, a laptop computer, etc. Alternatively, the first computing system 132 and/or the second computing system 138 may be implemented by a smartphone, a tablet computer, etc.

The radios 104, 106, 108, 112, 114, 116, 118, 120, 121, 123, 125 of the illustrated example are configurable as either private or public radios. In this example, the first radio 104, the second radio 106, the fourth radio 112, the sixth radio 116, the seventh radio 118, and the eighth radio 120 are private radios and/or otherwise configured as private radios. In this example, the third radio 108, the fifth radio 114, the ninth radio 121, the tenth radio 123, and the eleventh radio 125 are public radios and/or otherwise configured as public radios. For example, messages, data signals, etc., transmitted using one(s) of the first radio 104, the second radio 106, the fourth radio 112, the sixth radio 116, the seventh radio 118, and the eighth radio 120 can have increased security, encryption, etc., compared with messages, data signals, etc., transmitted using one(s) of the third radio 108, the fifth radio 114, the ninth radio 121, the tenth radio 123, and the eleventh radio 125.

In the illustrated example, the public radios can communicate using a first communication protocol. For example, the third radio 108, the fifth radio 114, the ninth radio 121, the tenth radio 123, and the eleventh radio 125 are public radios and/or otherwise configured as public radios that can transmit and/or receive messages, data signals, etc., based on a public communication protocol. For example, the third radio 108, the fifth radio 114, the ninth radio 121, the tenth radio 123, and the eleventh radio 125 can be adapted, configured, and/or otherwise constructed to communicate using a public communication protocol, which can be used to implement a wireless local area network (WLAN) network used to communicate with devices through IEEE 802.11 (Wi-Fi®) links, a cellular network used to communicate with devices through an LTE/LTE-A (4G) or 5G cellular network or 6G cellular network (e.g., a cellular network based on a cellular communication protocol), a low-power wide area (LPWA) network compatible with the LoRaWan specification promulgated by the LoRa alliance, an IPv6 over Low Power Wide-Area Networks (LPWAN) network compatible with a specification promulgated by the Internet Engineering Task Force (IETF), a Sigfox network, and/or a network based on the IEEE 802.15.4 standard such as Zigbee®, or any other type of network and/or internet application protocol such as Constrained Application Protocol (CoAP).

In the illustrated example, the private radios can communicate using a second communication protocol different from the first communication protocol. For example, the first radio 104, the second radio 106, the fourth radio 112, the sixth radio 116, the seventh radio 118, and the eighth radio 120 are private radios and/or otherwise configured as private radios that can transmit and/or receive messages, data signals, etc., based on a private communication protocol. For example, the first radio 104, the second radio 106, the fourth radio 112, the sixth radio 116, the seventh radio 118, and the eighth radio 120 can be adapted, configured, and/or otherwise constructed to communicate using a private communication protocol, which can be based on a communication protocol (e.g., a radio communication protocol) that utilizes frequencies in a UHF band, a VHF band, an L-Band, an S-Band, a C-Band, or any other frequency band used for restricted access communication. In some such examples, the private communication protocol can be a communication protocol provided by FreeWave Technologies, Inc. (e.g., a FreeWave communication protocol, a radio that communicates using a FreeWave communication protocol, etc.), a communication protocol supported by a BANDIT™ radio (e.g., a BANDIT™ radio that supports L-, S-, and/or C-Band communication), a communication protocol based on an Enhanced Position Location Reporting System (EPLRS) network, a Wave Relay® mobile ad hoc network (MANET) communication protocol or network, a satellite communication (SATCOM) protocol based on L-, S-, C-Band, etc., electromagnetic frequencies, a satellite-based optical datalink, etc.

In some examples, the private communication protocol can be used to restrict access to the first radio 104, the second radio 106, the fourth radio 112, the sixth radio 116, the seventh radio 118, and/or the eighth radio 120, and/or, more generally, the first aircraft 102, the second aircraft 110, the first control station 128, and/or the second control station 134 using encryption techniques. For example, the first radio 104, the second radio 106, the fourth radio 112, the sixth radio 116, the seventh radio 118, and/or the eighth radio 120 can decrypt/encrypt data represented by data signals, messages, etc., transmitted and/or received by the radio(s) using the Advanced Encryption Standard (AES) that includes using a block cipher (e.g., the AES-128 block cipher, the AES-192 block cipher, the AES-256 block cipher, etc.). In some examples, the first radio 104, the second radio 106, the fourth radio 112, the sixth radio 116, the seventh radio 118, and the eighth radio 120 can decrypt/encrypt data represented by and/or otherwise indicated by data signals, messages, etc., transmitted and/or received by the radio(s) using an AES cipher block chaining (AES-CBC) algorithm, a ciphertext feedback (AES-CFB) algorithm, an AES output feedback (AES-OFB) algorithm, a 2-byte CBC message authentication code (CBC-MAC) algorithm, a Galois MAC (GMAC) algorithm, or a keyed-Hashing MAC (HMAC) algorithm. Alternatively, the first radio 104, the second radio 106, the fourth radio 112, the sixth radio 116, the seventh radio 118, and/or the eighth radio 120 can decrypt/encrypt data represented by and/or otherwise referenced by data signals, messages, etc., transmitted and/or received by the radio(s) using any other symmetric algorithm.

In some examples, the first radio 104, the second radio 106, the fourth radio 112, the sixth radio 116, the seventh radio 118, and/or the eighth radio 120 can decrypt/encrypt data represented by data signals, messages, etc., transmitted and/or received by the radio(s) using an asymmetric encryption technique by using two independent keys, which can include a first key (e.g., a first cryptographic key, an encryption key, etc.) to encrypt data and a second key (e.g., a second cryptographic key, a decryption key, etc.) to decrypt the data. For example, the first radio 104, the second radio 106, the fourth radio 112, the sixth radio 116, the seventh radio 118, and/or the eighth radio 120 can decrypt/encrypt data represented by data signals, messages, etc., transmitted and/or received by the radio(s) using a Diffie-Hellman key exchange, a Rivest, Shamir and Adleman (RSA) algorithm, or a cryptographic hash function such as secure hash algorithm 1 (SHA-1), SHA-2, or SHA-3. Alternatively, the first radio 104, the second radio 106, the fourth radio 112, the sixth radio 116, the seventh radio 118, and/or the eighth radio 120 can decrypt/encrypt data indicated by data signals, messages, etc., transmitted and/or received by the radio(s) using any other asymmetric encryption technique.

In the illustrated example, the first radio 104 of the first aircraft 102 is in communication with the sixth radio 116 and the eighth radio 120 using a first private communication protocol using L-Band radio frequencies. The second radio 106 of the first aircraft 102 is in communication with the seventh radio 118 using a second private communication protocol using S-Band radio frequencies. In some examples, the first and second private communication protocol are the same while they are different in other examples.

In example operation, the first aircraft 102 can communicate with the first control station 128. For example, the first aircraft 102 can transmit to and/or receive a message (e.g., a radio message including, representative of, and/or otherwise indicative of data) from the first computing system 132 by way of a first communication path including the first radio 104, the sixth radio 116, the first radio box 122, the first network switch 130, and the first computing system 132. In some examples, the first aircraft 102 can transmit to and/or receive a message from the first computing system 132 by way of a second communication path including the second radio 106, the seventh radio 118, the first radio box 122, the first network switch 130, and the first computing system 132. In some examples, the first aircraft 102 can transmit to and/or receive a message from the first computing system 132 by way of a third communication path including the third radio 108, the ninth radio 121, the first radio box 122, the first network switch 130, and the first computing system 132. In some examples, the first aircraft 102 can transmit to and/or receive a message from the first computing system 132 by way of a fourth communication path including the third radio 108, the tenth radio 123, the third radio box 126, the first network switch 130, and the first computing system 132.

In some examples, the message can be implemented by a beacon (e.g., a radio beacon). For example, a beacon can be implemented by a continuous or periodic radio signal with limited or reduced information compared to other types of radio messages. In some examples, the beacon may be implemented by an asynchronous or aperiodic radio signal with limited or reduced information compared to other types of radio messages.

In example operation, the first aircraft 102 can communicate with the second control station 134. For example, the first aircraft 102 can transmit to and/or receive a message, a beacon, a data signal, etc., from the second computing system 138 by way of a fifth communication path including the first radio 104, the eighth radio 120, the second radio box 124, the second network switch 136, and the second computing system 138. In some examples, the first aircraft 102 can transmit to and/or receive a message, a beacon, a data signal, etc., from the second computing system 138 by way of a sixth communication path including the third radio 108, the eleventh radio 125, the fourth radio box 140, the second network switch 136, and the second computing system 138. In some examples, the first aircraft 102 can transmit to and/or receive a message from the second aircraft 110 by way of a seventh communication path including the third radio 108 and the fifth radio 114. Other communication paths between the first aircraft 102 and at least one of the second aircraft 110, the first control station 128, or the second control station 134 can be implemented by the first aircraft radio communication system 100.

In example operation, the first control station 128 can utilize public radios to configure private radios for communication. For example, the first control station 128 may not be in communication with the first aircraft 102 by way of a private radio (e.g., the sixth radio 116 and the seventh radio 118) because the first control station 128 is unaware of radio configuration information associated with the first radio 104 and/or the second radio 106. Advantageously, the first control station 128 can receive a beacon from the third radio 108 of the first aircraft 102 by way of the third radio 108, the ninth radio 121, the first radio box 122, the first network switch 130, and the first computing system 132. Alternatively, the first control station 128 may receive the beacon from the third radio 108 by way of the third radio 108, the tenth radio 123, the third radio box 126, the first network switch 130, and the first computing system 132. In some examples, the beacon can include radio configuration information, which can be encrypted, for the first radio 104 (or the second radio 106). In some examples, the beacon can be generated based on a public communication protocol, such as an IoT communication protocol. In some examples, the beacon can include longitudes, latitudes, and altitudes (LLAs). For example, the first control station 128 and/or the second control station 134 can utilize the LLAs (or LLA data) included in the beacon to point and/or otherwise orient ground directional antennas (e.g., the sixth radio 116, the seventh radio 118, the eighth radio 120, etc.) to a source of the beacon (e.g., the first aircraft 102, the second aircraft 110, etc.).

In example operation, in response to receiving the encrypted beacon, the first computing system 132 can decrypt the encrypted beacon using a symmetric or asymmetric cryptographic technique. For example, the first computing system 132 can access a decryption key associated with aircraft known to the first control station 128, such as the first aircraft 102 and/or the second aircraft 110. In some such examples, the first computing system 132 can decrypt the encrypted beacon using the decryption key. The first computing system 132 can identify radio configuration information associated with the first radio 104 (or the second radio 106), which can include (i) a radio frequency at which the first radio 104 (or the second radio 106) is configured and/or otherwise tuned to, (ii) encryption/decryption settings associated with a communication protocol by which the first radio 104 (or the second radio 106) packages data, etc., and/or combination(s) thereof. In response to identifying the radio configuration information, the first computing system 132 can instruct the first radio box 122 to configure the sixth radio 116 for communication with the first radio 104 based on the radio configuration information. For example, the first computing system 132 can instruct the first radio box 122 to tune the sixth radio 116 to a radiofrequency identified by the radio configuration information. In some examples, the first computing system 132 can instruct the first radio box 122 to encrypt/decrypt data signals transmitted/received by the sixth radio 116 using the encryption/decryption settings. In some examples, the sixth radio 116 can transmit data to and/or receive data from the first radio 104 based on a private communication protocol to secure communications between the first aircraft 102 and the first control station 128.

In example operation, the second control station 134 can utilize public radios to configure private radios for communication. For example, the second control station 134 may not be in communication with the first aircraft 102 by way of a private radio (e.g., the eighth radio 120) because the second control station 134 is unaware and/or does not have access to radio configuration information associated with the first radio 104 and/or the second radio 106. Advantageously, the second control station 134 can receive a beacon (and/or in some examples request a beacon from the third radio 108 to be transmitted) from the third radio 108 of the first aircraft 102 by way of the third radio 108, the eleventh radio 125, the fourth radio box 140, the second network switch 136, and the second computing system 138.

In example operation, in response to receiving the encrypted beacon, the second computing system 138 can decrypt the encrypted beacon using a symmetric or asymmetric cryptographic technique. For example, the second computing system 138 can access a decryption key associated with aircraft known to the second control station 134, such as the first aircraft 102 and/or the second aircraft 110. In some such examples, the second computing system 138 can decrypt the encrypted beacon using the decryption key. The second computing system 138 can identify radio configuration information associated with the first radio 104 (or the second radio 106), which can include (i) a radio frequency at which the first radio 104 (or the second radio 106) is configured and/or otherwise tuned to, (ii) encryption/decryption settings associated with a communication protocol by which the first radio 104 (or the second radio 106) packages data, etc., and/or combination(s) thereof. In response to identifying the radio configuration information, the second computing system 138 can instruct the second radio box 124 to configure the eighth radio 120 for communication with the first radio 104 based on the radio configuration information. For example, the second computing system 138 can instruct the second radio box 124 to tune the eighth radio 120 to a radiofrequency identified by the radio configuration information. In some examples, the second computing system 138 can direct the second radio box 124 to encrypt/decrypt data signals transmitted/received by the eighth radio 120 using the encryption/decryption settings. In some examples, the eighth radio 120 can transmit data to and/or receive data from the first radio 104 based on a private communication protocol to secure communications between the first aircraft 102 and the second control station 134.

In example operation, the first aircraft 102 and the second aircraft 110 can utilize public radios to configure private radios for communication. For example, the second aircraft 110 may not be in communication with the first aircraft 102 by way of a private radio (e.g., the first radio 104, the second radio 106, and/or the fourth radio 112) because the second aircraft 110 is unaware and/or does not have access to radio configuration information associated with the first radio 104 and/or the second radio 106. Advantageously, the second aircraft 110 can receive a beacon (and/or in some examples request a beacon from the third radio 108 to be transmitted) from the third radio 108 of the first aircraft 102 by way of the third radio 108 and the fifth radio 114. In some examples, the beacon can include radio configuration information, which can be encrypted, for the first radio 104 (or the second radio 106). In some examples, the beacon can be generated based on a public communication protocol, such as an IoT communication protocol.

In example operation, in response to receiving the encrypted beacon, the second aircraft 110 (e.g., processor circuitry of the second aircraft 110 that is in communication with the fifth radio 114) can decrypt the encrypted beacon using a symmetric or asymmetric cryptographic technique. For example, the second aircraft 110 can access a decryption key associated with aircraft known to the second aircraft 110, such as the first aircraft 102. In some such examples, the second aircraft 110 can decrypt the encrypted beacon using the decryption key. The second aircraft 110 can identify radio configuration information associated with the first radio 104 (or the second radio 106), which can include (i) a radio frequency at which the first radio 104 (or the second radio 106) is configured and/or otherwise tuned to, (ii) encryption/decryption settings associated with a communication protocol by which the first radio 104 (or the second radio 106) packages data, etc., and/or combination(s) thereof. In response to identifying the radio configuration information, the second aircraft 110 can invoke circuitry (e.g., radio box circuitry, radio circuitry, radio control circuitry, etc.) of the second aircraft 110 to configure the fourth radio 112 for communication with the first radio 104 (or the second radio 106) based on the radio configuration information. For example, the second aircraft 110 can instruct circuitry of the second aircraft 110 to tune the fourth radio 112 to a radiofrequency identified by the radio configuration information. In some examples, the second aircraft 110 can instruct circuitry of the second aircraft 110 to encrypt/decrypt data signals transmitted/received by the fourth radio 112 using the encryption/decryption settings. In some examples, the fourth radio 112 can transmit data to and/or receive data from the first radio 104 (or the second radio 106) based on a private communication protocol to secure communications between the first aircraft 102 and the second aircraft 110.

Figure 1B:
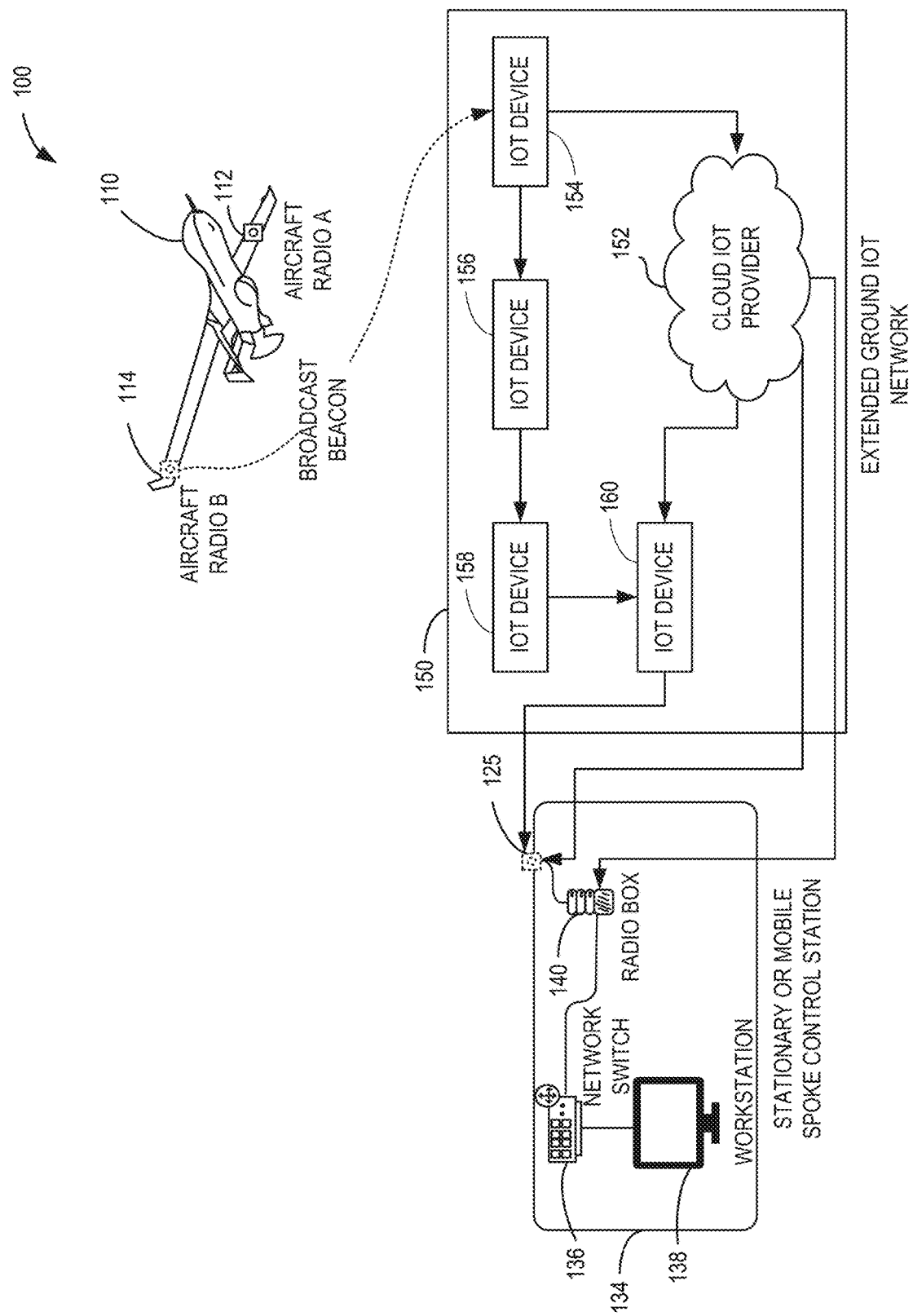
FIG. 1B illustrates the first aircraft communication system of FIG. 1A including an example extended ground Internet-of-Things (IoT) network.

According to another aspect of the present disclosure, another embodiment of a secure communications system for an aerial vehicle is contemplated in which secure communication may be provided by an air vehicle broadcast beacon having a protocol that is formatted to be compatible with consumer electronics to look like an internet tagged device, such that the broadcast beacon will propagate through an Internet terrestrial network until it is received at an air vehicle ground control station, for configuring the air vehicle. FIG. 1B can illustrate such an embodiment. The illustrated example of FIG. 1B depicts the first aircraft radio communication system 100 of FIG. 1A including an example extended ground Internet-of-Things (IoT) network 150. Portions of FIG. 1A are removed from FIG. 1B for enhanced clarity, and it is contemplated that such removed portions can be included in the embodiment depicted in FIG. 1B. It should be understood that the description with one(s) of the aspects, components, illustrations, functions, operations, etc., in connection with FIG. 1A are applicable to FIG. 1B unless otherwise specified.

The extended ground IoT network 150 of the illustrated example includes an example cloud IoT provider 152 and a plurality of example IoT devices 154, 156, 158, 160 including a first example IoT device 154, a second example IoT device 156, a third example IoT device 158, and a fourth example IoT device 160. The cloud IoT provider 152 can be implemented by a cloud provider, cloud network, cloud data center, etc. For example, the cloud IoT provider 152 can be implemented by a central office or content data network. In some examples, the cloud IoT provider 152 can be implemented by one or more physical hardware servers, one or more virtualized servers, etc., and/or any combination(s) thereof. The first IoT device 154, the second IoT device 156, the third IoT device 158, and/or the fourth IoT device 160 can be implemented by an electronic device such as commercial and home automation devices, such as water distribution systems, electric power distribution systems, pipeline control systems, plant control systems, light switches, thermostats, locks, cameras, alarms, motion sensors, and the like. The first IoT device 154, the second IoT device 156, the third IoT device 158, and/or the fourth IoT device 160 can be accessible through remote computers, servers, and other systems, for example, to control systems or access data. In some examples, the first IoT device 154, the second IoT device 156, the third IoT device 158, and/or the fourth IoT device 160 device can be a smart phone, laptop, tablet, or PC, or other larger device. In some examples, the first IoT device 154, the second IoT device 156, the third IoT device 158, and/or the fourth IoT device 160 can be a virtual device, such as an application on a smart phone or other computing device. The first IoT device 154, the second IoT device 156, the third IoT device 158, and/or the fourth IoT device 160 can implement and/or include IoT gateways, which can be used to couple IoT devices to other IoT devices and to cloud applications, for data storage, process control, and the like.

In some examples, one(s) of the cloud IoT provider 152, the first IoT device 154, the second IoT device 156, the third IoT device 158, and the fourth IoT device 160 can be physically and/or otherwise geographically located in different areas. For example, the first IoT device 154 can be in a first location (e.g., a residential home, a condominium, etc.), the second IoT device 156 can be in a second location (e.g., a coffee shop or other commercial entity proximate the first location), the third IoT device 158 can be in a third location (e.g., on the street proximate the first location and/or the second location), and the fourth IoT device 160 can be in a fourth location (e.g., a mobile location such as a vehicle, a bus, etc., proximate the first location, the second location, and/or the third location).

In example operation, the second aircraft 110 (or the first aircraft 102 of FIG. 1A) can broadcast a beacon (e.g., a broadcast beacon) with the fifth radio 114. The first IoT device 154 (or different one(s) of the IoT devices 156, 158, 160) can receive the beacon. In some examples, the first IoT device 154 can provide the beacon to the fourth radio box 140, and/or, more generally, the second control station 134 (or the first control station 128 of FIG. 1A). For example, the first IoT device 154 can provide the beacon to the fourth radio box 140 via a first communication path including the second IoT device 156, the third IoT device 158, the fourth IoT device 160, and the eleventh radio 125. In some such examples, the first IoT device 154 can transmit the broadcast beacon, or portion(s) thereof (e.g., broadcast a data packet with a data payload including portion(s) of the broadcast beacon), to the second IoT device 156 via any wired or wireless communication protocol as described herein. In some such examples, the first IoT device 154 can be communicatively coupled to the second IoT device 156 via a wireless network (e.g., an ad-hoc network, a peer-to-peer (P2P) network, Wi-Fi, a Wi-Fi Direct Network, etc.). In some such examples, the fourth IoT device 160 can receive the beacon and broadcast and/or otherwise transmit the beacon to the eleventh radio 125. The eleventh radio 125 can provide the beacon (or a data packet associated with the beacon) to the second computing system 138 by way of the fourth radio box 140 and the second network switch 136.

In some examples, the first IoT device 154 can provide the beacon to the fourth radio box 140 by way of a second communication path including the cloud IoT provider 152, the fourth IoT device 160, and the eleventh radio 125. In some such examples, the first IoT device 154 can transmit the broadcast beacon, or portion(s) thereof (e.g., transmit a data packet with a data payload including portion(s) of the broadcast beacon), to the cloud IoT provider 152 via any wired or wireless communication protocol as described herein. In some such examples, the first IoT device 154 can be communicatively coupled to the cloud IoT provider 152 via a wireless network. In some such examples, the cloud IoT provider 152 can receive the beacon and broadcast and/or otherwise transmit the beacon to the eleventh radio 125. Alternatively, the cloud IoT provider 152 can transmit the beacon to the fourth IoT device 160, which can, in turn, provide the beacon to the eleventh radio 125.

In some examples, the first IoT device 154 can provide the beacon to the fourth radio box 140 by way of a third communication path including the first IoT device 154, the cloud IoT provider 152, and the fourth radio box 140. In some such examples, the first IoT device 154 can transmit the broadcast beacon, or portion(s) thereof, to the cloud IoT provider 152 via any wired or wireless communication protocol as described herein. In some such examples, the cloud IoT provider 152 can receive the beacon and broadcast and/or otherwise transmit the beacon to the fourth radio box 140 via any wired and/or wireless communication protocol, connection, etc. Advantageously, in some such examples, there may be a vast network of IoT devices that are in different geographical regions (e.g., different cities, states, countries, continents, etc.) that can receive the broadcast beacon from the second aircraft 110 as the second aircraft 110 is flying over those different geographical regions. Advantageously, in some such examples, the cloud IoT provider 152 can receive the broadcast beacon, which can be received by any IoT device in a geographical region over which the second aircraft 110 may fly, and cause delivery of the broadcast beacon to the second control station 134. Advantageously, in some such examples, the extended ground IoT network 150 can implement a remote split operations architecture, which can be used to identify radio configurations of a private radio of an aircraft, such as the fourth radio 112 of the second aircraft 110.

Figure 2:
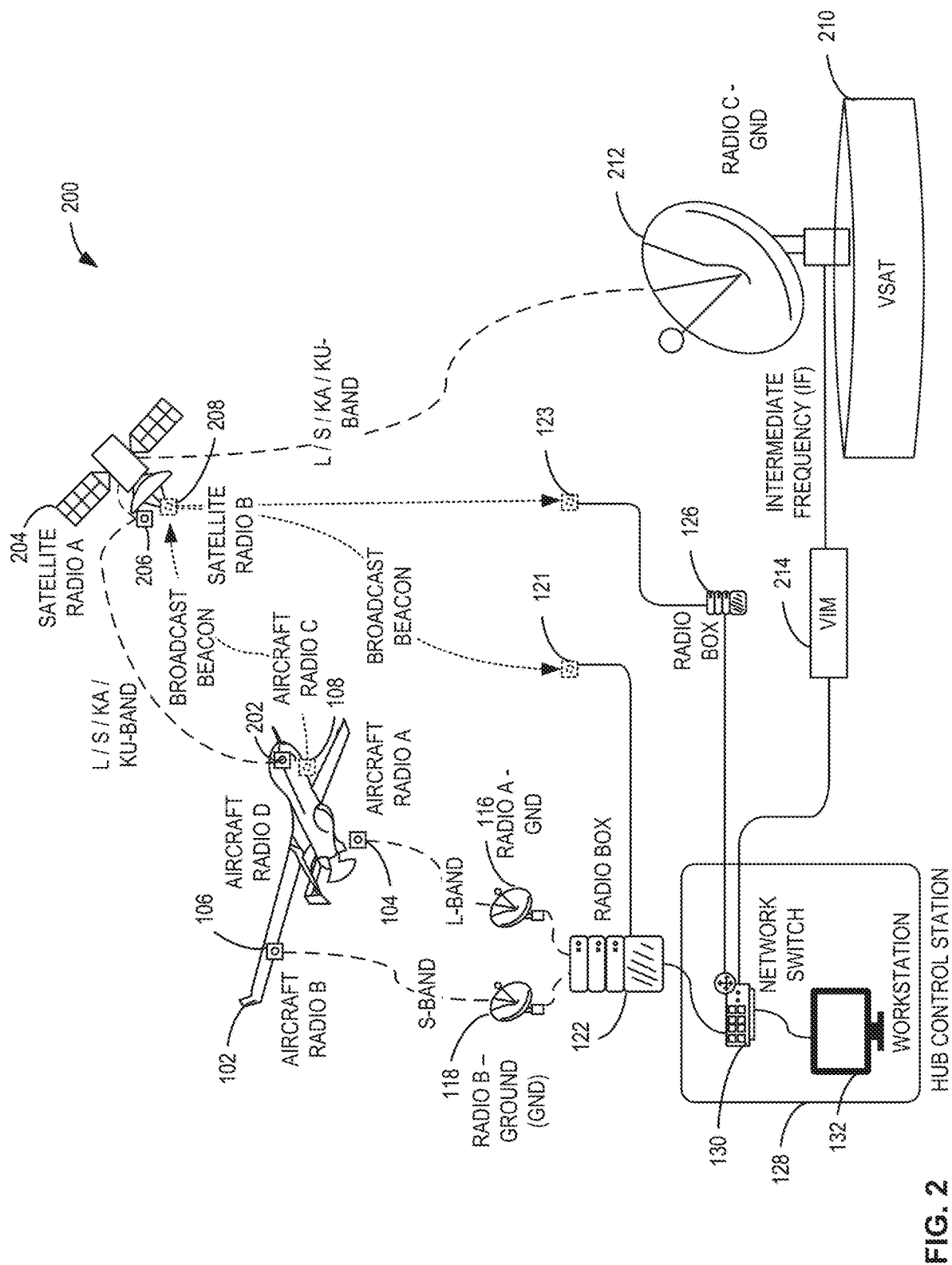
FIG. 2 illustrates a second example aircraft radio communication system to configure the example radios associated with the example aircraft, the example control station, and/or the example operator workstation of FIGS. 1A and/or 1B based on at least one of example LOS or example beyond-line-of-sight (BLOS) radiofrequency paths.

FIG. 2 illustrates a second example aircraft radio communication system 200 to configure private radios using public radios based on at least one of example LOS or example beyond-line-of-sight (BLOS) radiofrequency paths. The second aircraft radio communication system 200 includes the first aircraft 102, the first radio 104, the second radio 106, the third radio 108, the sixth radio 116, the seventh radio 118, the ninth radio 121, the tenth radio 123, the first radio box 122, the third radio box 126, the first control station 128, the first network switch 130, and the first computing system 132 of FIGS. 1A and/or 1B. In this example, the first aircraft 102 includes a twelfth example radio 202. In the illustrated example, the second aircraft radio communication system 200 includes an example satellite 204, which includes a thirteenth example radio 206 and a fourteenth example radio 208. In the illustrated example, the second aircraft radio communication system 200 includes an example very small aperture terminal (VSAT) 210, which includes a fifteenth example radio 212. In the illustrated example, the second aircraft radio communication system 200 includes an example VSAT interface module (VIM) 214.

In the illustrated example, the twelfth radio 202, the thirteenth radio 206, and the fifteenth radio 212 are private radios and the fourteenth radio 208 is a public radio. In this example, the twelfth radio 202 can include a transmitter (e.g., a radio transmitter, an antenna, etc.), a receiver (e.g., a radio receiver, an antenna, etc.), and/or a transceiver (e.g., a radio transceiver, an antenna, etc.) and/or associated circuitry (e.g., control circuitry, a power supply, an amplifier, a modulator, a demodulator, etc.). In this example, the twelfth radio 202 includes one or more directional antennas. Additionally or alternatively, the twelfth radio 202 may include one or more omnidirectional antennas.

The satellite 204 of the illustrated example is a low earth orbit (LEO) satellite. Alternatively, the satellite 204 may be any other type of satellite. For example, the twelfth radio 202 and/or the thirteenth radio 206 can communicate with each other by utilizing radiofrequencies in the S-Band, L-Band, Ku-Band (e.g., a radiofrequency band of 12-18 GHz), Ka-Band (e.g., a radiofrequency band of 26.5-40 GHz), etc., or any other segment(s) of the electromagnetic spectrum.

The VIM 214 of the illustrated example is coupled to the fifteenth radio 212, and/or, more generally, the VSAT 210. The VIM 214 can communicate with the fifteenth radio 212, and/or, more generally, the VSAT 210, using an intermediate frequency (IF). The VIM 214 is coupled to the first network switch 130. In some examples, the VIM 214 can be implemented by hardware, software, and/or firmware. For example, the VIM 214 can be implemented by at least one or more hardware circuits (e.g., processor circuitry, discrete and/or integrated analog and/or digital circuitry, an FPGA, an ASIC, a comparator, an operational-amplifier (op-amp), a logic circuit, etc.) structured to execute machine readable instructions and/or to perform operations corresponding to the machine readable instructions without executing software or firmware, but other structures are likewise appropriate. In some such examples, the VIM 214 can be implemented by VIM circuitry.

In the illustrated example, the first aircraft 102 can communicate with the first control station 128 by LOS and/or BLOS. For example, the first aircraft 102 can communicate with the first control station 128 by LOS by way of the sixth radio 116 and/or the seventh radio 118 and/or by BLOS by way of the satellite 204. In some examples, the first aircraft 102 can communicate with the first control station 128 by BLOS. For example, the first aircraft 102 can transmit to and/or receive a message from the first computing system 132 by way of a first communication path including the twelfth radio 202, the thirteenth radio 206, the fifteenth radio 212, the VIM 214, the first network switch 130, and the first computing system 132. In some examples, the first aircraft 102 can transmit to and/or receive a message from the first computing system 132 by way of a second communication path including the third radio 108, the fourteenth radio 208, the ninth radio 121, the first radio box 122, the first network switch 130, and the first computing system 132. In some examples, the first aircraft 102 can transmit to and/or receive a message from the first computing system 132 by way of a third communication path including the third radio 108, the fourteenth radio 208, the tenth radio 123, the third radio box 126, the first network switch 130, and the first computing system 132.

In example operation, the first control station 128 can utilize public radios to configure private radios for communication. For example, the first control station 128 may not be in communication with the first aircraft 102 by way of a private radio (e.g., the sixth radio 116, the seventh radio 118, the fifteenth radio 212, etc.) because the first control station 128 is unaware of radio configuration information associated with the first radio 104, the second radio 106, and/or the twelfth radio 202. Advantageously, the first control station 128 can receive a beacon from the first aircraft 102. For example, the first control station 128 can receive a beacon from the first aircraft 102 by way of the second and/or third communication path as described above (e.g., by way of the fourteenth radio 208 of the satellite 204). In some examples, the beacon can include radio configuration information, which can be encrypted, for the first radio 104 (or the second radio 106 or the twelfth radio 202). For example, the beacon can include radio configuration information for at least one of the first radio 104, the second radio 106, or the twelfth radio 202 of the first aircraft 102. In some examples, the beacon can be generated based on a public communication protocol, such as an IoT communication protocol as described herein.

In example operation, in response to receiving the encrypted beacon, the first computing system 132 can decrypt the encrypted beacon using a symmetric or asymmetric cryptographic technique. For example, the first computing system 132 can access a decryption key associated with aircraft known to the first control station 128, such as the first aircraft 102. In some such examples, the first computing system 132 can decrypt the encrypted beacon using the decryption key. The first computing system 132 can identify radio configuration information associated with the first radio 104 (or the second radio 106 or the twelfth radio 202), which can include (i) a radio frequency at which the first radio 104 (or the second radio 106 or the twelfth radio 202) is configured and/or otherwise tuned to, (ii) encryption/decryption settings associated with a communication protocol by which the first radio 104 (or the second radio 106 or the twelfth radio 202) assembles, compiles, packages and/or otherwise understands data, etc., and/or combination(s) thereof. In response to identifying the radio configuration information, the first computing system 132 can instruct the first radio box 122 to configure the sixth radio 116 for communication with the first radio 104 based on the radio configuration information. For example, the first computing system 132 can instruct the first radio box 122 to tune the sixth radio 116 to a radiofrequency identified by the radio configuration information. In some examples, the first computing system 132 can instruct the first radio box 122 to encrypt/decrypt data signals transmitted/received by the sixth radio 116 using the encryption/decryption settings. In some examples, the sixth radio 116 can transmit data to and/or receive data from the first radio 104 based on a private communication protocol to secure communications between the first aircraft 102 and the first control station 128.

In some examples, in response to identifying the radio configuration information, the first computing system 132 can instruct the VIM 214 to configure the thirteenth radio 206 (e.g., by way of the fifteenth radio 212) for communication with the twelfth radio 202 based on the radio configuration information. For example, the first computing system 132 can instruct the VIM 214 to cause the VSAT 210 to broadcast radio configuration information from the fifteenth radio 212 to the thirteenth radio 206. In some such examples, the satellite 204 can adjust the thirteenth radio 206 to a radiofrequency identified by the radio configuration information. In some examples, the satellite 204 can encrypt/decrypt data signals transmitted/received by the thirteenth radio 206 using the encryption/decryption settings. In some examples, the thirteenth radio 206 can transmit data to and/or receive data from the twelfth radio 202 based on a private communication protocol to secure communications between the first aircraft 102 and the first control station 128 by way of the satellite 204. Other communication paths between the first aircraft 102 and at least one of the first control station 128, the satellite 204, or the VSAT 210 can be implemented by the second aircraft radio communication system 200.

Figure 3:
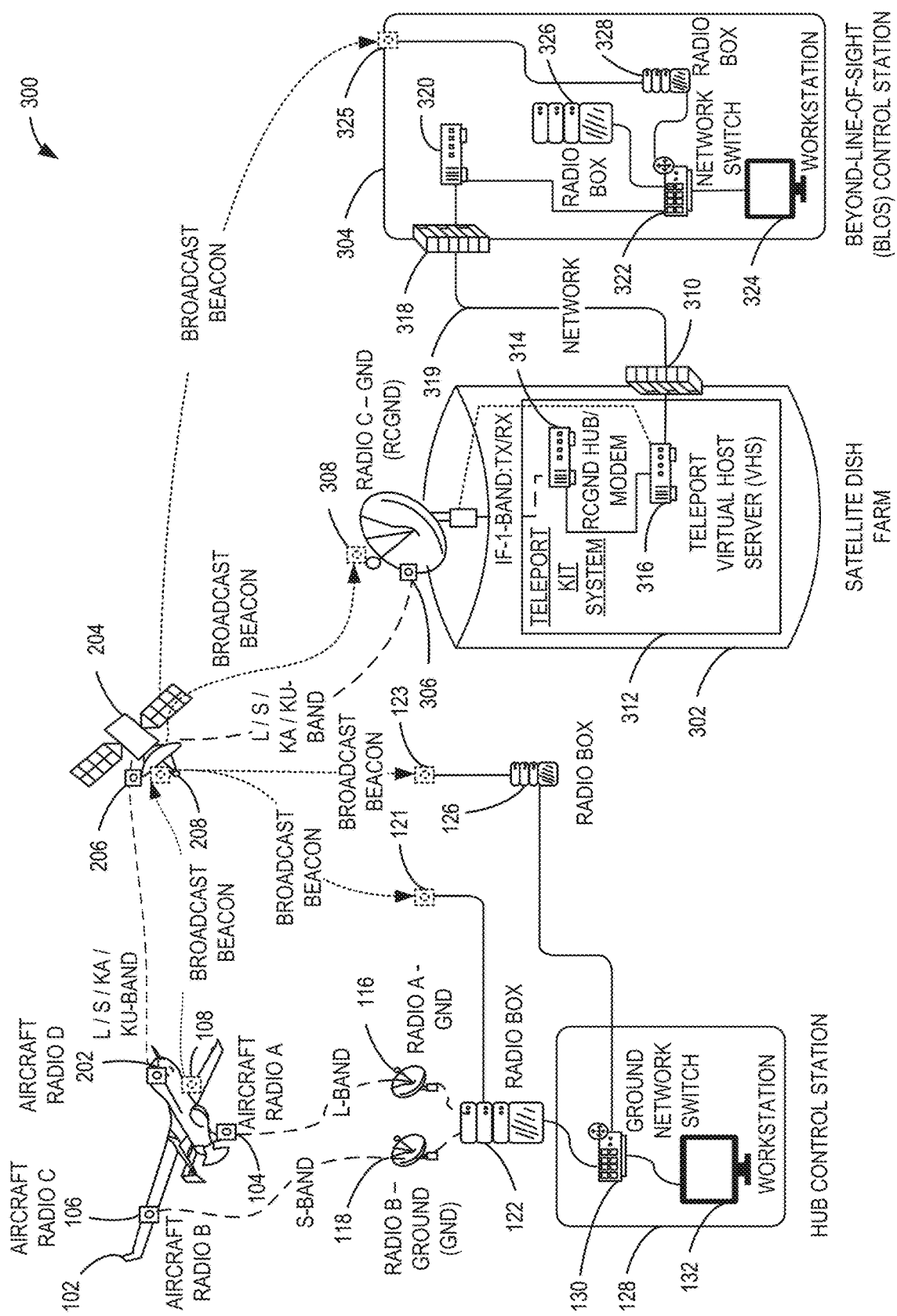
FIG. 3 illustrates a third example aircraft radio communication system to configure the example radios associated with the example aircraft, the example control station, and/or the example operator workstation of FIGS. 1A and/or 1B based on at least one of example LOS or example BLOS radiofrequency paths in an example remote split operations architecture.

FIG. 3 illustrates a third example aircraft radio communication system 300 to configure private radios using public radios based on at least one of example LOS or BLOS radiofrequency paths in an example remote split operations architecture. The third aircraft radio communication system 300 includes the first aircraft 102, the first radio 104, the second radio 106, the third radio 108, the sixth radio 116, the seventh radio 118, the ninth radio 121, the tenth radio 123, the first radio box 122, the third radio box 126, the first control station 128, the first network switch 130, and the first computing system 132 of FIGS. 1A and/or 1B. The third aircraft radio communication system 300 includes the twelfth radio 202, the satellite 204, the thirteenth radio 206, and the fourteenth radio 208 of FIG. 2. The third aircraft radio communication system 300 includes an example satellite dish farm 302 and an example BLOS control station 304. For example, the satellite dish farm 302 can include any number and/or type of satellite dishes in any location in the world (e.g., a location proximate to the first control station 128 or a location substantially far from the first control station 128). The third aircraft radio communication system 300 can implement a remote split operations architecture because the first control station 128 can be in a different geographical location than at least one of the satellite dish farm 302 or the BLOS control station 304.

The satellite dish farm 302 of the illustrated example includes a sixteenth example radio 306, a seventeenth example radio 308, a first example firewall 310, and an example teleport kit system 312, which includes an example hub and/or modem 314 and an example teleport virtual host server (VHS) 316. In this example, the hub/modem 314 is associated with the sixteenth radio 306 (identified by RADIO C-GND). For example, the sixteenth radio 306 and the hub/modem 314 can implement RADIO C-GND.

In this example, the sixteenth radio 306 is coupled to and/or otherwise in communication with the hub/modem 314. For example, the sixteenth radio 306 can communicate with the hub/modem 314 using an intermediate frequency (e.g., a frequency in the L-Band or a different band of the electromagnetic spectrum). In this example, the hub/modem 314 is coupled to and/or otherwise in communication with the teleport VHS 316. In this example, the teleport VHS 316 is coupled to and/or otherwise in communication with the first firewall 310. The seventeenth radio 308 is coupled to and/or otherwise in communication with the teleport VHS 316. For example, the seventeenth radio 308 can be coupled to the teleport VHS 316 through one or more hubs, modems, gateways, switches, etc. In some such examples, the seventeenth radio 308 can communicate with the teleport VHS 316 using an intermediate frequency.

In this example, the sixteenth radio 306 is a private radio and the seventeenth radio 308 is a public radio. The sixteenth radio 306 and/or the seventeenth radio 308 can respectively include a transmitter (e.g., a radio transmitter, an antenna, etc.), a receiver (e.g., a radio receiver, an antenna, etc.), and/or a transceiver (e.g., a radio transceiver, an antenna, etc.) and/or associated circuitry (e.g., control circuitry, a power supply, an amplifier, a modulator, a demodulator, etc.). The sixteenth radio 306 and/or the seventeenth radio 308 can include one or more omnidirectional antennas, one or more directional antennas, etc., and/or combination(s) thereof. The first firewall 310 can be implemented by software, hardware, and/or firmware. For example, the first firewall 310 can be instantiated by software (e.g., a software firewall, a virtual firewall instantiated on a VM, etc.). In some examples, the first firewall 310 can be a physical hardware device with software and/or firmware.

In some examples, the hub/modem 314 can be implemented by interface circuitry. For example, the interface circuitry can include a communication device such as a transmitter, a receiver, a transceiver, a modem, a gateway, a wireless access point, and/or a network interface to facilitate exchange of data with external machines (e.g., computing devices of any kind) by a network. The communication can be by, for example, an Ethernet connection, a DSL connection, a telephone line connection, a coaxial cable system, a satellite system, a line-of-sight wireless system, a cellular telephone system, an optical connection, etc.

The BLOS control station 304 of the illustrated example includes a second example firewall 318, an example network router 320, a third example network switch 322, a third example computing system 324, an eighteenth example radio 325, a fifth example radio box 326, and a sixth example radio box 328. In this example, the first firewall 310 is coupled to and/or otherwise in communication with the second firewall 318 via an example network 319. In this example, the network 319 is the Internet. However, the network 319 can be implemented using any suitable wired and/or wireless network(s) including, for example, one or more data buses, one or more Local Area Networks (LANs), one or more wireless LANs, one or more cellular networks, one or more private networks, one or more public networks, etc. In this example, the second firewall 318 is coupled to and/or otherwise in communication with the network router 320. The network router 320 is coupled is coupled to and/or otherwise in communication with the third network switch 322. The third network switch 322 is coupled to and/or otherwise in communication with the third computing system 324, the fifth radio box 326, and the sixth radio box 328.

In some examples, the second firewall 318 can be implemented by software, hardware, and/or firmware. In some examples, the network router 320 and/or the third network switch 322 can be implemented by interface circuitry. For example, the interface circuitry can include a communication device such as a transmitter, a receiver, a transceiver, a modem, a gateway, a wireless access point, and/or a network interface to facilitate exchange of data with external machines (e.g., computing devices of any kind) by a network. The communication can be by, for example, an Ethernet connection, a DSL connection, a telephone line connection, a coaxial cable system, a satellite system, a line-of-sight wireless system, a cellular telephone system, an optical connection, etc.

The third computing system 324 of the illustrated example is a workstation (e.g., an operator workstation), which can be implemented by a server, a desktop computer, a laptop computer, etc. Alternatively, the third computing system 324 may be implemented by a smartphone, a tablet computer, etc.

In some examples, the fifth radio box 326 and/or the sixth radio box 328 can be implemented by hardware, software, and/or firmware. For example, the fifth radio box 326 and/or the sixth radio box 328 can be implemented by at least one or more hardware circuits (e.g., processor circuitry, discrete and/or integrated analog and/or digital circuitry, an FPGA, an ASIC, a comparator, an operational-amplifier (op-amp), a logic circuit, etc.) structured to execute machine readable instructions and/or to perform operations corresponding to the machine readable instructions without executing software or firmware, but other structures are likewise appropriate. In some such examples, the fifth radio box 326 and/or the sixth radio box 328 can be implemented by radio or radio box circuitry.

The eighteenth radio 325 is coupled to the sixth radio box 328. In this example, the eighteenth radio 325 is a public radio. The eighteenth radio 325 can include a transmitter (e.g., a radio transmitter, an antenna, etc.), a receiver (e.g., a radio receiver, an antenna, etc.), and/or a transceiver (e.g., a radio transceiver, an antenna, etc.) and/or associated circuitry (e.g., control circuitry, a power supply, an amplifier, a modulator, a demodulator, etc.). The eighteenth radio 325 can include one or more omnidirectional antennas, one or more directional antennas, etc., and/or combination(s) thereof.

In example operation, the BLOS control station 304 can utilize public radios to configure private radios for communication. For example, the BLOS control station 304 may not be in communication with the first aircraft 102 by way of a private radio (e.g., the sixteenth radio 306) because the BLOS control station 304 is unaware of radio configuration information associated with the first radio 104, the second radio 106, and/or the twelfth radio 202 of the first aircraft 102. Advantageously, the BLOS control station 304 can receive a beacon from the first aircraft 102. For example, the BLOS control station 304 can receive a beacon from the first aircraft 102 by way of the satellite dish farm 302 and/or the BLOS control station 304. In some such examples, the first aircraft 102 can broadcast a beacon from the third radio 108. In some examples, the beacon can include radio configuration information, which can be encrypted, for the first radio 104 (or the second radio 106 or the twelfth radio 202). For example, the beacon can include radio configuration information for at least one of the first radio 104, the second radio 106, or the twelfth radio 202 of the first aircraft 102. In some examples, the beacon can be generated based on a public communication protocol, such as an IoT communication protocol as described herein.

In example operation, the fourteenth radio 208 of the satellite 204 can receive the beacon that is broadcast from the third radio 108. The satellite 204 can relay the beacon to at least one of the first radio box 122, the third radio box 126, or the seventeenth radio 308 of the satellite dish farm 302. In example operation, the seventeenth radio 308 can deliver the received beacon to teleport VHS 316. In this example, the teleport VHS 316 is a computing or electronic system that can host and/or otherwise instantiate any number of VMs, containers, etc. For example, the teleport VHS 316 can interface with the sixteenth radio 306 and/or the seventeenth radio 308 by way of the hub/modem 314 or any other interface circuitry. In some such examples, the teleport VHS 316 can push data from the sixteenth radio 306 and/or the seventeenth radio 308 to a different location (e.g., anywhere in the world), computing system, etc. In some examples, the teleport VHS 316 can be implemented by a router, a gateway, or any other type of interface circuitry.

In this example, the teleport VHS 316 can provide the beacon to the network router 320 by way of the first firewall 310, the second firewall 318, and the network 319. The network router 320 can provide the beacon to the third network switch 322. The third network switch 322 can deliver the beacon to the third computing system 324. Alternatively, in some examples, the eighteenth radio 325 can receive the beacon from the fourteenth radio 208 of the satellite 204. The eighteenth radio 325 can deliver the beacon to the sixth radio box 328. The sixth radio box 328 can provide the beacon to the third computing system 324 via the third network switch 322.

In example operation, in response to receiving the encrypted beacon from the third network switch 322, the third computing system 324 can decrypt the encrypted beacon using a symmetric or asymmetric cryptographic technique. For example, the third computing system 324 can access a decryption key associated with aircraft known to the first control station 128, such as the first aircraft 102. In some such examples, the third computing system 324 can decrypt the encrypted beacon using the decryption key. The third computing system 324 can identify radio configuration information associated with the first radio 104 (or the second radio 106 or the twelfth radio 202), which can include (i) a radio frequency at which the first radio 104 (or the second radio 106 or the twelfth radio 202) is configured and/or otherwise tuned to, (ii) encryption/decryption settings associated with a communication protocol by which the first radio 104 (or the second radio 106 or the twelfth radio 202) assembles, compiles, packages and/or otherwise understands data, etc., and/or combination(s) thereof. In response to identifying the radio configuration information, the third computing system 324 can instruct the fifth radio box 326 to configure the sixteenth radio 306 for communication with the first radio 104 (e.g., by way of the satellite 204) based on the radio configuration information. For example, the third computing system 324 can instruct the fifth radio box 326 to tune the sixteenth radio 306 (e.g., by transmitting a command, an instruction, configuration information, etc., to the sixteenth radio 306 by way of the third network switch 322, the network router 320, the first firewall 310, the second firewall 318, the network 319, the teleport kit system 312, and the sixteenth radio 306) to a radiofrequency identified by the radio configuration information. In some examples, the third computing system 324 can instruct the fifth radio box 326 to encrypt/decrypt data signals transmitted/received by the thirteenth radio 206 (and/or the sixteenth radio 306) using the encryption/decryption settings. In some examples, the thirteenth radio 206 can transmit data to and/or receive data from the first radio 104 based on a private communication protocol to secure communications between the first aircraft 102 and the BLOS control station 304. Other communication paths between the first aircraft 102 and at least one of the first control station 128, the satellite dish farm 302, or the BLOS control station 304 can be implemented by the third aircraft radio communication system 300.

Figure 4:
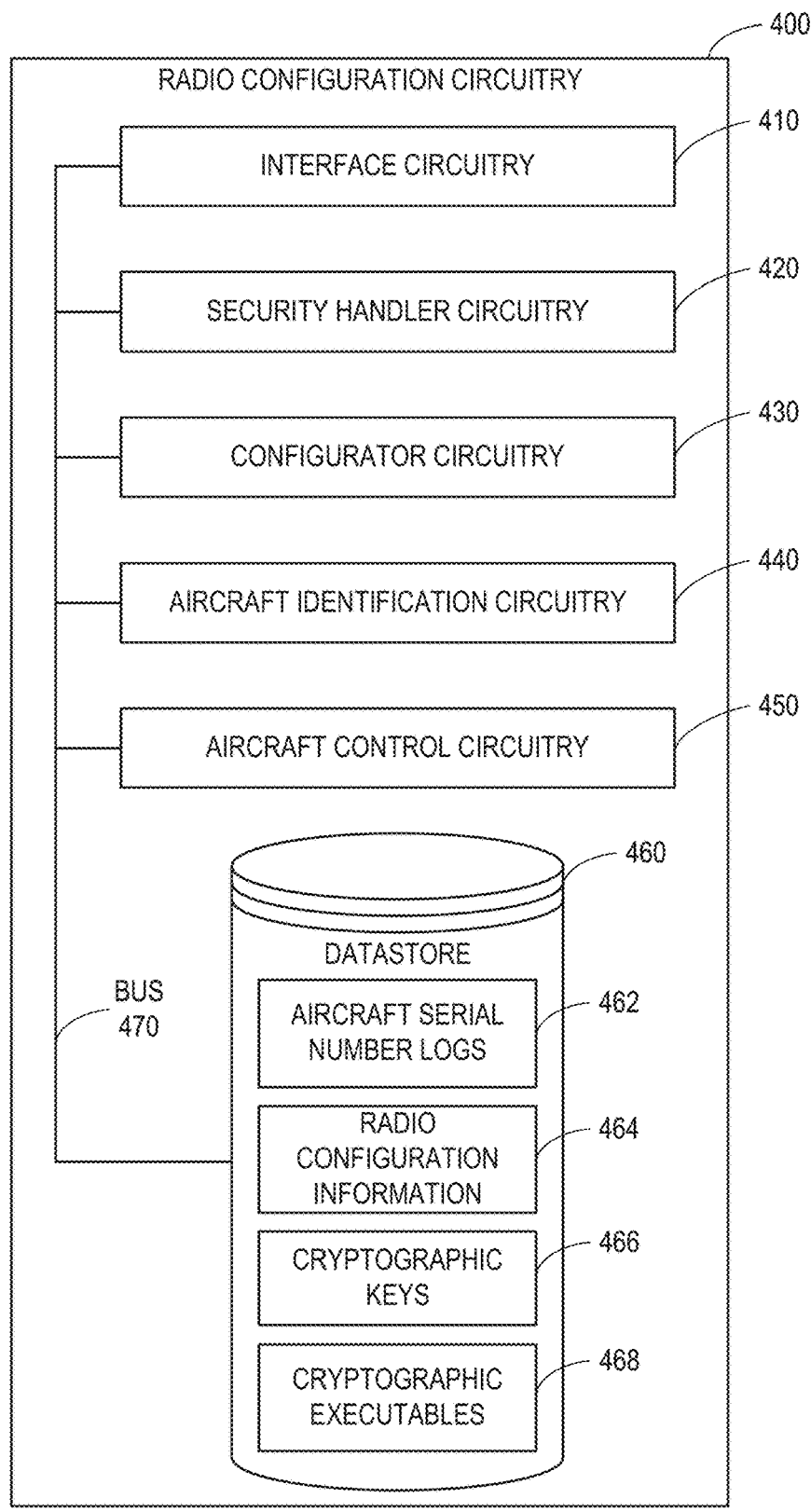
FIG. 4 depicts a block diagram of example radio configuration circuitry to configure the example radios associated with the example aircraft, the example control station, and/or the example operator workstation of FIGS. 1A and/or 1B.

FIG. 4 is a block diagram of radio configuration circuitry 400 to configure radios in the first aircraft radio communication system 100, the second aircraft radio communication system 200, and/or the third aircraft radio communication system 300 to facilitate control of the first aircraft 102 and/or the second aircraft 110. The radio configuration circuitry 400 can be instantiated (e.g., creating an instance of, bring into being for any length of time, materialize, implement, etc.) by processor circuitry such as a central processing unit executing instructions. Additionally or alternatively, the radio configuration circuitry 400 can be instantiated (e.g., creating an instance of, bring into being for any length of time, materialize, implement, etc.) by an ASIC or an FPGA structured to perform operations corresponding to the instructions. It should be understood that some or all of the circuitry of FIG. 4 may, thus, be instantiated at the same or different times. Some or all of the circuitry may be instantiated, for example, in one or more threads executing concurrently on hardware and/or in series on hardware. Moreover, in some examples, some or all of the circuitry of FIG. 4 may be implemented by one or more VMs and/or containers executing on the microprocessor.

In some examples, the radio configuration circuitry 400 can be included in the first aircraft 102 of FIGS. 1-3 (e.g., included in an avionics module, a mission computer, a payload computer, a network switch, the first radio 104, the second radio 106, the third radio 108, and/or the twelfth radio 202 of the first aircraft 102). In some examples, the radio configuration circuitry 400 can be included in the second aircraft 110 of FIGS. 1A and/or 1B (e.g., included in an avionics module, a mission computer, a payload computer, a network switch, the fourth radio 112, and/or the fifth radio 114 of the second aircraft 110). In some examples, the radio configuration circuitry 400 can be included in the sixth radio 116, the seventh radio 118, and/or first radio box 122 of FIGS. 1-3. In some examples, the radio configuration circuitry 400 can be included in the eighth radio 120 and/or the second radio box 124 of FIG. 1A. In some examples, the radio configuration circuitry 400 can be included in the third radio box 126 of FIGS. 1-3. In some examples, the radio configuration circuitry 400 can be included in the fourth radio box 140 of FIGS. 1A and/or 1B. In some examples, the radio configuration circuitry 400 can be included in the first control station 128 of FIGS. 1-3 (e.g., included in the first network switch 130 and/or the first computing system 132 of FIGS. 1-3). In some examples, the radio configuration circuitry 400 can be included in the second control station 134 of FIGS. 1A-1B (e.g., included in the second network switch 136, the fourth radio box 140, and/or the second computing system 138 of FIGS. 1A-1B). In some examples, the radio configuration circuitry 400 can be included in the satellite 204, the thirteenth radio 206, and/or the fourteenth radio 208 of FIGS. 2-3. In some examples, the radio configuration circuitry 400 can be included in the VSAT 210, the fifteenth radio 212, and/or the VIM 214 of FIG. 2. In some examples, the radio configuration circuitry 400 can be included in the satellite dish farm 302 of FIG. 3 (e.g., included in the sixteenth radio 306, the seventeenth radio 308, the first firewall 310, the teleport kit system 312, the hub/modem 314, and/or the teleport VHS 316 of FIG. 3). In some examples, the radio configuration circuitry 400 can be included in the BLOS control station 304 of FIG. 3 (e.g., included in the second firewall 318, the network router 320, the third network switch 322, the third computing system 324, the eighteenth radio 325, the fifth radio box 326, and/or the sixth radio box 328 of FIG. 3).

The radio configuration circuitry 400 of the illustrated example includes example interface circuitry 410, example security handler circuitry 420 (may also be referred to herein as security handling circuitry), example configurator circuitry 430 (may also be referred to herein as configuration circuitry), example aircraft identification circuitry 440, example aircraft control circuitry 450, an example datastore 460, and an example bus 470. In this example, the datastore 460 includes example aircraft serial number logs 462, example radio configuration information 464, example cryptographic keys 466, and example cryptographic executables. In the illustrated example of FIG. 4, the interface circuitry 410, the security handler circuitry 420, the configurator circuitry 430, the aircraft identification circuitry 440, the aircraft control circuitry 450, and the datastore 460 are in communication with one(s) of each other via the bus 470. For example, the bus 470 can be implemented by at least one of Ethernet, an Inter-Integrated Circuit (I2C) bus, a Serial Peripheral Interface (SPI) bus, or a Peripheral Component Interconnect (PCI) bus. Additionally or alternatively, the bus 470 cam implement any other type of computing or electrical bus.

The radio configuration circuitry 400 of the illustrated example includes the interface circuitry 410 to obtain information from and/or transmit information to a different device. In some examples, the interface circuitry 410 implements a web server that receives data from and/or transmits data to a network. For example, the data may be formatted as an HTTP message. However, any other message format and/or protocol may additionally or alternatively be used such as, for example, a file transfer protocol (FTP), a simple message transfer protocol (SMTP), an HTTP secure (HTTPS) protocol, etc. In some examples, the interface circuitry 410 implements a transmitter, a receiver, and/or a transceiver. For example, the interface circuitry 410 can include one or more communication devices such as a transmitter, a receiver, a transceiver, a modem, a gateway, a wireless access point, and/or a network interface to facilitate exchange of data with external machines (e.g., computing devices of any kind) by a network. The communication can be by, for example, an Ethernet connection, a DSL connection, a telephone line connection, a coaxial cable system, a satellite system, a line-of-sight wireless system, a cellular telephone system, an optical connection, etc.

In some examples, the interface circuitry 410 determines whether a communication is received by a secondary radio that uses a secondary communication protocol. For example, the interface circuitry 410 can determine that a communication such as a beacon (e.g., a broadcast beacon) is received by a primary radio, such as a private radio (e.g., the first radio 104, the second radio 106, the fourth radio 112, the sixth radio 116, the seventh radio 118, etc.). In some such examples, the interface circuitry 410 can determine that the communication is received by the primary radio using a primary communication protocol, such as a communication protocol utilizing S-Band, L-Band, Ka-Band, Ku-Band, etc., segments of the electromagnetic spectrum. In some examples, the interface circuitry 410 can determine that a beacon is received by a secondary radio, such as a public radio (e.g., the third radio 108, a public radio included in the first radio box 122, a public radio included in the third radio box 126, the fifth radio 114, etc.). In some such examples, the interface circuitry 410 can determine that the communication is received by the secondary radio using a secondary communication protocol, such as an IoT communication protocol (e.g., LTE/LTE-A, 5G, 6G, LoRaWan, Zigbee®, etc.). In some examples, the interface circuitry 410 determines whether to continue monitoring for aircraft in an aircraft environment (e.g., the first aircraft radio communication system 100, the second aircraft radio communication system 200, and/or the third aircraft radio communication system 300 of FIGS. 1A, 1B, 2, and/or 3). In some examples, the first or primary communication protocol, such as a satellite communication protocol based on L-, S-, C-, Ka-, Ku-Band, etc., electromagnetic frequencies, can have a greater bandwidth than the second or secondary communication protocol, such as an IoT communication protocol.

In some examples, the interface circuitry 410 determines whether an aircraft is physically accessible for communication coupling. For example, in response to a determination that the interface circuitry 410 is coupled to and/or otherwise in communication with the first aircraft 102 (or the second aircraft 110), the interface circuitry 410 can download radio configuration information from the first aircraft 102 (or the second aircraft 110) by the communication coupling. In some such examples, the radio configuration information can include radio configuration settings of the first radio 104, the second radio 106, the third radio 108, and/or the twelfth radio 202 of the first aircraft 102. In some examples, the radio configuration information can include cryptographic keys (e.g., symmetric and/or asymmetric encryption/decryption keys) or any other cryptographic information that may be used to facilitate the encryption/decryption of radio communications, messages, etc.

In some examples, the interface circuitry 410 can transmit messages to aircraft (e.g., the first aircraft 102 and/or the second aircraft 110) based on a combination of radio configuration settings and cryptographic keys. For example, in response to a determination that radio configuration information associated with a private radio of an aircraft is unknown or not readily accessible, the interface circuitry 410 can transmit messages to the aircraft using different combinations of radio configuration settings and/or cryptographic keys to establish communication with the aircraft. In some such examples, the interface circuitry 410 may transmit (e.g., iteratively transmit) messages based on different combinations of radio configuration settings and/or cryptographic keys until communication is established between the interface circuitry 410 (or different circuitry) and the aircraft.

In some examples, the interface circuitry 410 determines whether a beacon is received by an AIM and/or a radio box associated with a control station. For example, in response to a determination that the first radio box 122 and/or the third radio box 126 receives a beacon from the third radio 108 of the first aircraft 102, the interface circuitry 410 may deliver the beacon to a computing system associated with the control station, such as the first computing system 132 of the first control station 128.

In some examples, the interface circuitry 410 determines whether a beacon is received by an aircraft. For example, in response to a determination that the fifth radio 114 of the second aircraft 110 receives a beacon from the third radio 108 of the first aircraft 102, the interface circuitry 410 may deliver the beacon to a computing system associated with the aircraft, such as an avionics module, a mission computer, etc., of the second aircraft 110.

In some examples, the interface circuitry 410 determines whether a beacon is received by a satellite dish farm. For example, in response to a determination that the seventeenth radio 308 of the satellite dish farm 302 receives a beacon from the third radio 108 by way of the fourteenth radio 208, the interface circuitry 410 may deliver the beacon to the third computing system 324 of the BLOS control station 304 by way of the teleport kit system 312.

In some examples, the interface circuitry 410 determines whether a beacon is received by a BLOS control station. For example, in response to a determination that the sixth radio box 328 receives a beacon from the third radio 108 by way of the fourteenth radio 208, the interface circuitry 410 may provide the beacon to the third computing system 324.

The radio configuration circuitry 400 of the illustrated example includes the security handler circuitry 420 to encrypt and/or decrypt messages to be transmitted by a radio. In some examples, the security handler circuitry 420 can decrypt a first message received from a first radio of an aircraft. In some such examples, the first radio can use a first communication protocol, and the aircraft can include a second radio to be configured for a second communication protocol different from the first communication protocol. In some such examples, the first radio can be the third radio 108, the aircraft can be the first aircraft 102, the first communication protocol can be an IoT communication protocol, the second radio can be the first radio 104, the second radio 106, and/or the twelfth radio 202, and the second communication protocol can be a private communication protocol (e.g., a communication protocol to be utilized by an enterprise or other restricted entity).

In some examples, the security handler circuitry 420 issues digital certificate(s) to primary radio(s) of aircraft and control station(s) that use a first communication protocol in an aircraft environment. For example, the security handler circuitry 420 can generate an association of (i) a digital certificate for the first radio 104 and (ii) an issuer of the digital certificate, which can be the security handler circuitry 420, and/or, more generally, the radio configuration circuitry 400. In some examples, the security handler circuitry 420 can store the digital certificate(s) as the cryptographic keys 466. As used herein, a "digital certificate" can refer to electronic credentials and/or a type of file (e.g., electronic file) used to associate cryptographic key pairs with entities such as websites, personnel, or organizations (e.g., enterprises, aircraft operations organizations, organizations associated with government regulated activities, etc.). For example, a digital certificate can be used to encrypt data to be transmitted by radio communication and/or decrypt data to be received by radio communication.

In some examples, the security handler circuitry 420 decrypts communication(s) based on the digital certificate(s). For example, the security handler circuitry 420 can decrypt the communication(s) using symmetric and/or asymmetric cryptographic techniques based on information included in the digital certificate(s). In some examples, the security handler circuitry 420 can decrypt communication(s) by executing one(s) of the cryptographic executables 468. For example, the security handler circuitry 420 can process data in a received communication utilizing a hash algorithm by executing one(s) of the cryptographic executables 468 that, when executed, implement the hash algorithm. In some such examples, the cryptographic keys 466 may be provided as input(s) to the cryptographic executables 468 to generate output(s), which may include decryption(s) of the communication(s).

The radio configuration circuitry 400 of the illustrated example includes the configurator circuitry 430 to configure a radio to facilitate secure communications with an aircraft. In some examples, the configurator circuitry 430 determines whether a decrypted message includes radio configuration information associated with a private radio, LLA data associated with a source of a received beacon, etc. For example, in response to a determination that a decrypted message from the first aircraft 102 includes radio configuration settings, cryptographic key(s), LLA data, etc., associated with a configuration and/or operation of a private radio of the first aircraft 102 (e.g., the first radio 104, the second radio 106, and/or the twelfth radio 202), the configurator circuitry 430 can configure a private radio of a control station (e.g., the sixth radio 116, the seventh radio 118, the eighth radio 120, etc.) to transmit a message to the private radio of the first aircraft 102 based on the radio configuration settings, the cryptographic key(s), the LLA data, etc. In some such examples, the configurator circuitry 430 can configure the sixth radio 116 to utilize a radiofrequency, a type of encryption/decryption, etc., to communicate with the first radio 104 for enhanced communication security. In some such examples, the configurator circuitry 430 can control the sixth radio 116 to re-orient and/or otherwise adjust in position based on the LLA data included in a received beacon. For example, the configurator circuitry 430 can cause one or more actuators coupled to the sixth radio 116 to move such that the sixth radio 116 is pointing towards the first aircraft 102, the second aircraft 110, etc., based on LLA data included in a received beacon.

In some examples, the configurator circuitry 430 can store the radio configuration settings, the cryptographic key(s), the LLA data, etc., as the radio configuration information 464 in the datastore 460. For example, the radio configuration information 464 can include one or more radio settings, one or more decryption/encryption keys, etc., associated with a radio, such as the first radio 104, the second radio 106, etc., of the first aircraft 102, the sixth radio 116, the seventh radio 118, etc., associated with the first control station 128, etc.

In some examples, the configurator circuitry 430 determines a priori radio settings and encryption key settings for primary radio(s) based on digital certificate(s). For example, the configurator circuitry 430 can inspect data included in a digital certificate associated with the first radio 104. In some such examples, the configurator circuitry 430 can determine radio settings, encryption key settings, etc., for a public radio of the first aircraft 102 prior to the first aircraft 102 executing a flight operation (e.g., taking off from a ground surface).

In some examples, the configurator circuitry 430 determines whether a decrypted communication includes radio settings and encryption key settings to communicate with a source of a communication using a primary radio. For example, the configurator circuitry 430 can determine that a decrypted communication from the first aircraft 102 can include radio settings, encryption key settings, etc., that can be utilized by a private radio of a control station to communicate with a source of the communication, such as the first aircraft 102. In some such examples, the configurator circuitry 430 can configure the private radio of the control station, such as the sixth radio 116, the seventh radio 118, etc., associated with the first control station 128 based on the decrypted communication. For example, the configurator circuitry 430 can configure the private radio based on the radio configuration information 464.

In some examples, the configurator circuitry 430 configures a primary radio based on at least one of last known settings, physical access to an aircraft, or cycling through combinations of settings (e.g., radio configuration settings, encryption key settings, etc.). For example, the configurator circuitry 430 can determine whether last known or previously known radio configuration information of an aircraft is identified (or identifiable) in the aircraft serial number logs 462. For example, the aircraft serial number logs 462 can include a database of aircraft associated with an enterprise or other organization that manage and/or control the aircraft. In some such examples, the database may include aircraft tail numbers, aircraft serial numbers, versions of hardware, software, and/or firmware of the aircraft, cryptographic key information, radio configuration settings, longitude, latitudes, and altitudes (LLAs), etc., of the aircraft.

As used herein, the term "database" means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list or in any other form. In some examples, in response to determining that the last known settings of an aircraft, such as the first aircraft 102, is included in the aircraft serial number logs 462, the configurator circuitry 430 can configure primary radio(s) associated with a control station to match the identified radio configuration information.

In some examples, the configurator circuitry 430 can generate a combination of radio configuration settings and cryptographic keys. For example, in response to a determination that last known radio configuration information is not identified in the aircraft serial number logs 462, the configurator circuitry 430 can generate a first set of radio configuration settings and/or cryptographic keys. In some such examples, in response to the interface circuitry 410 being unable to establish communication with a primary radio based on the first set, the configurator circuitry 430 can generate a second set of radio configuration settings and/or cryptographic keys. In some such examples, the interface circuitry 410 can generate (e.g., iteratively generate) combinations of radio configuration settings and/or cryptographic keys until communication is established with the primary radio.

The radio configuration circuitry 400 of the illustrated example includes the aircraft identification circuitry 440 to identify aircraft based on radio configuration settings and/or encryption key settings based on digital certificate(s). For example, the radio configuration settings can include an aircraft tail number, an aircraft serial number, etc., that identify an aircraft, such as the first aircraft 102. In some examples, the aircraft identification circuitry 440 can identify an aircraft based on a beacon. For example, in response to receiving a beacon from the third radio 108 of the first aircraft 102, the aircraft identification circuitry 440 can identify the first aircraft 102 as the source and/or generator of the beacon based on data (e.g., an aircraft tail number, an aircraft serial number, an aircraft identifier, etc.) included in the beacon.

The radio configuration circuitry 400 of the illustrated example includes the aircraft control circuitry 450 to control an aircraft to perform a flight operation using configured primary radio(s). For example, the aircraft control circuitry 450 can generate a command, a direction, an instruction, etc., that can be transmitted by the interface circuitry 410 from a first primary radio of a control station to a second primary radio of an aircraft. In some such examples, the command, the direction, the instruction, etc., can invoke and/or otherwise cause an aircraft, such as the first aircraft 102, to take off from a ground surface (e.g., a runway, a landing strip, an aircraft carrier, etc.), land on the ground surface, move from a first position to a second position (e.g., from a first altitude to a second altitude, from a first set of coordinates to a second set of coordinates, etc.), change air speed, etc.

The radio configuration circuitry 400 of the illustrated example includes the datastore 460 to record data, such as the aircraft serial number logs 462, the radio configuration information 464, the cryptographic keys 466, the cryptographic executables 468, etc. The datastore 460 can be implemented by a volatile memory (e.g., a Synchronous Dynamic Random Access Memory (SDRAM), Dynamic Random Access Memory (DRAM), etc.) and/or a non-volatile memory (e.g., flash memory). The datastore 460 may additionally or alternatively be implemented by one or more double data rate (DDR) memories, such as DDR, DDR2, DDR3, DDR4, DDR5, mobile DDR (mDDR), DDR SDRAM, etc. The datastore 460 may additionally or alternatively be implemented by one or more mass storage devices such as hard disk drive(s) (HDD(s)), compact disk (CD) drive(s), digital versatile disk (DVD) drive(s), solid-state disk (SSD) drive(s), Secure Digital (SD) card(s), CompactFlash (CF) card(s), etc. While in the illustrated example the datastore 460 is illustrated as a single database, the datastore 460 may be implemented by any number and/or type(s) of databases. Furthermore, the data stored in the datastore 460 may be in any data format such as, for example, binary data, comma delimited data, tab delimited data, structured query language (SQL) structures, etc.

While an example manner of implementing one(s) of the radios 104, 106, 108, 112, 114, 116, 118, 120, 121, 123, 125, 202, 206, 208, 212, 306, 308, 325, the radio boxes 122, 124, 126, 140, 326, 328, the VSAT 210, the VIM 214, the first computing system 132, the second computing system 138, and/or the third computing system 324 of FIGS. 1A, 1B, 2, and/or 3 is illustrated in FIG. 4, one or more of the elements, processes, and/or devices illustrated in FIG. 4 may be combined, divided, re-arranged, omitted, eliminated, and/or implemented in any other way. Further, the interface circuitry 410, the security handler circuitry 420, the configurator circuitry 430, the aircraft identification circuitry 440, the aircraft control circuitry 450, the datastore 460, the bus 470, and/or, more generally, the radios 104, 106, 108, 112, 114, 116, 118, 120, 121, 123, 125, 202, 206, 208, 212, 306,

308, 325, the radio boxes 122, 124, 126, 140, 326, 328, the VSAT 210, the VIM 214, the first computing system 132, the second computing system 138, and/or the third computing system 324 of FIGS. 1A, 1B, 2, and/or 3, may be implemented by hardware alone or by hardware in combination with software and/or firmware. Thus, for example, any of the interface circuitry 410, the security handler circuitry 420, the configurator circuitry 430, the aircraft identification circuitry 440, the aircraft control circuitry 450, the datastore 460, the bus 470, and/or, more generally, the radios 104, 106, 108, 112, 114, 116, 118, 120, 121, 123, 125, 202, 206, 208, 212, 306, 308, 325, the radio boxes 122, 124, 126, 140, 326, 328, the VSAT 210, the VIM 214, the first computing system 132, the second computing system 138, and/or the third computing system 324 of FIGS. 1A, 1B, 2, and/or 3, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the radios 104, 106, 108, 112, 114, 116, 118, 120, 121, 123, 125, 202, 206, 208, 212, 306, 308, 325, the radio boxes 122, 124, 126, 140, 326, 328, the VSAT 210, the VIM 214, the first computing system 132, the second computing system 138, and/or the third computing system 324 of FIGS. 1A, 1B, 2, and/or 3 may include one or more elements, processes, and/or devices in addition to, or instead of, those illustrated in FIG. 4, and/or may include more than one of any or all of the illustrated elements, processes and devices.

Figure 5A:
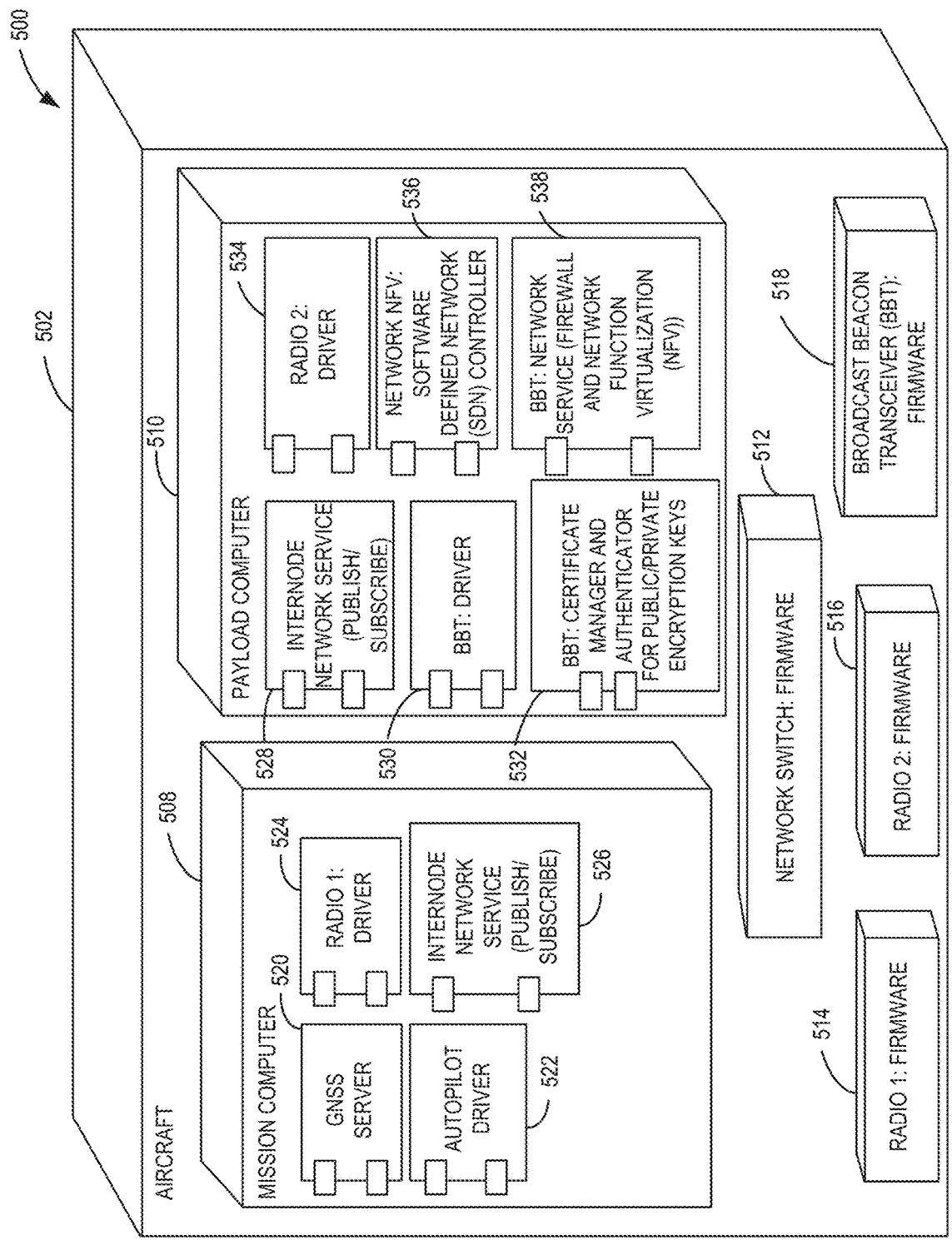
FIG. 5A depicts a block diagram of an example implementation of the example aircraft of FIGS. 1A, 1B, 2, and/or 3.
Figure 5B:
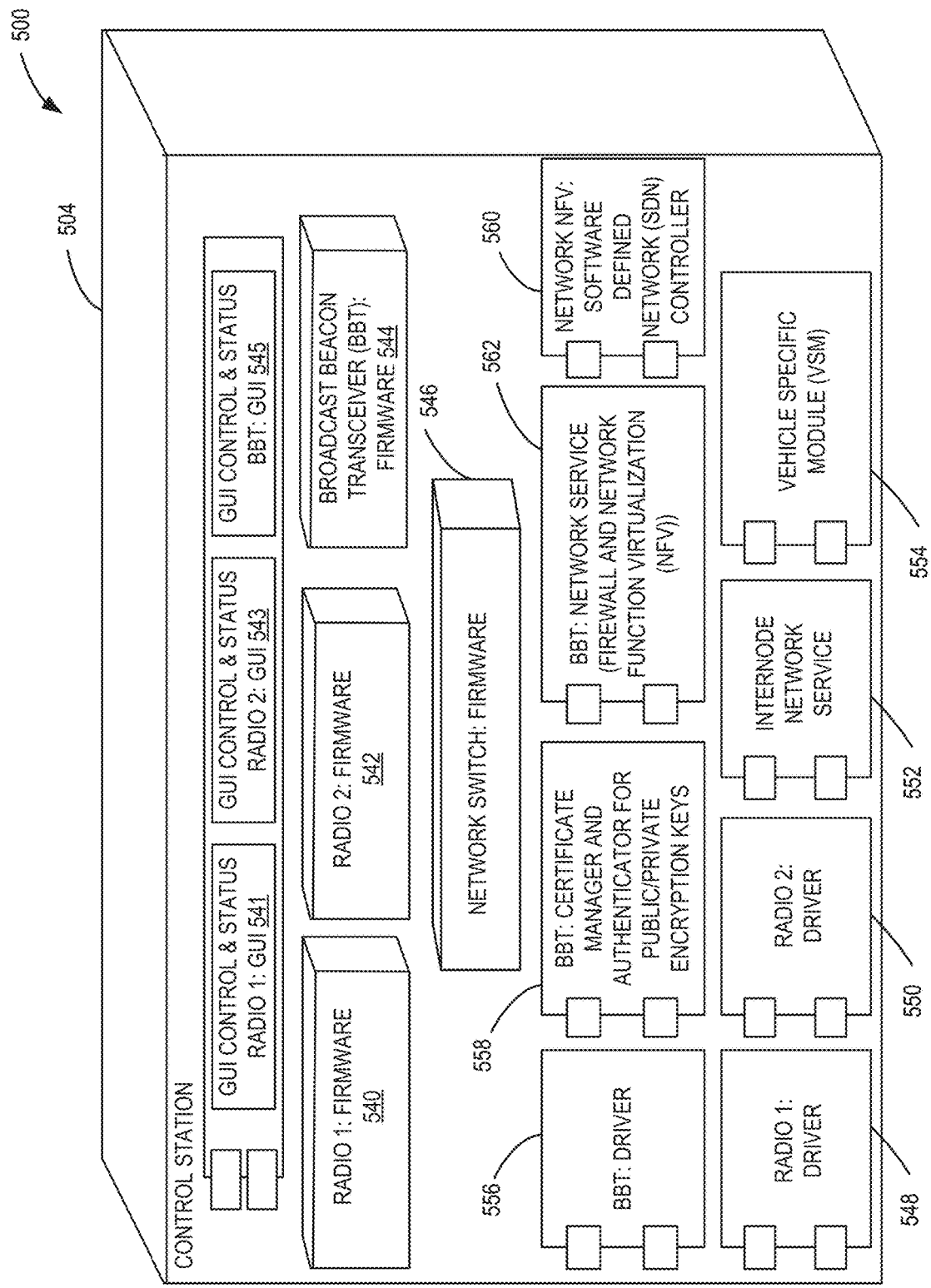
FIG. 5B depicts a block diagram of an example implementation of the example control station of FIGS. 1A, 1B, 2, and/or 3.
Figure 5C:
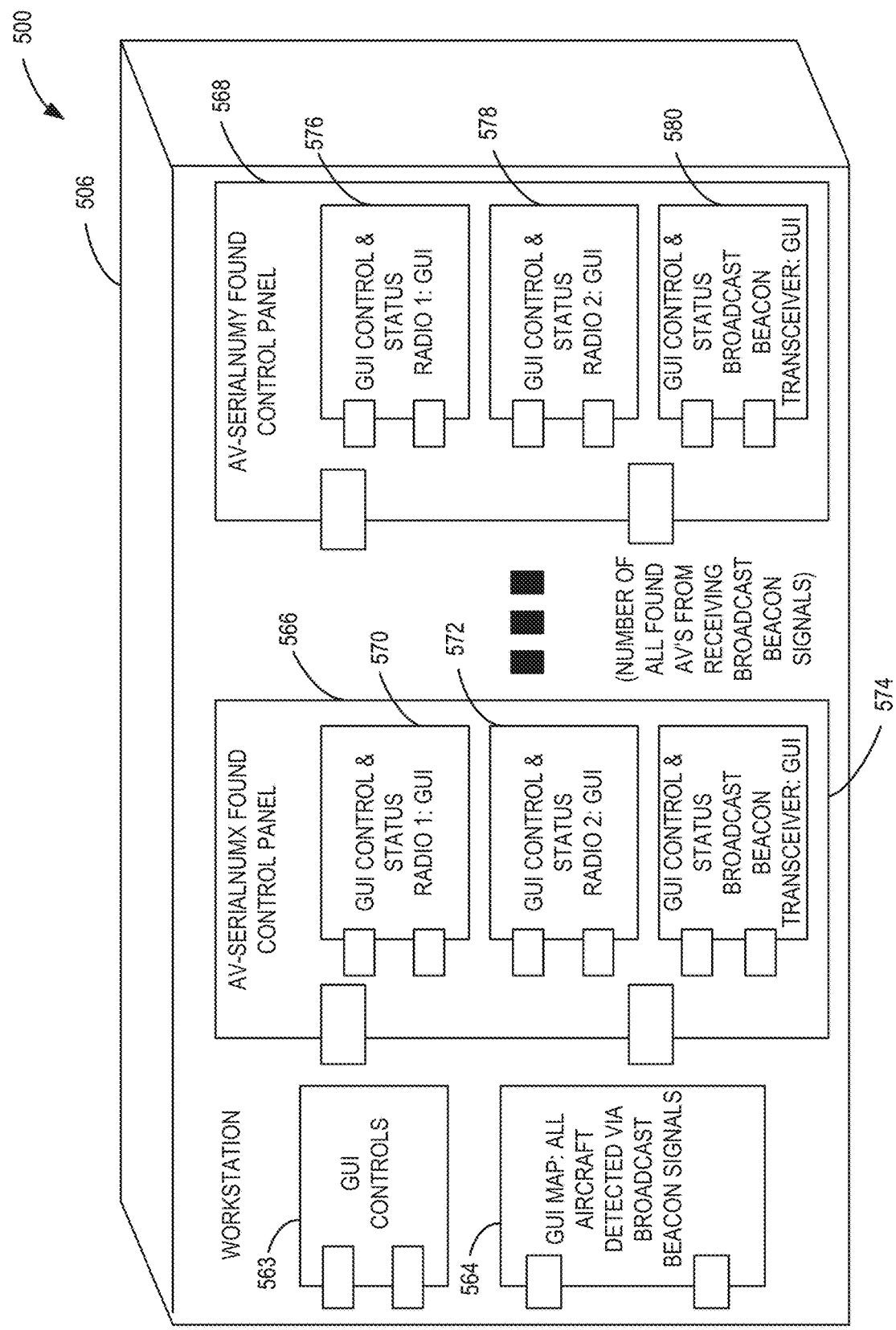
FIG. 5C depicts a block diagram of an example implementation of the example operator workstation of FIGS. 1A, 1B, 2, and/or 3.

FIGS. 5A-5C depict block diagrams of an example aircraft radio communication system architecture 500. The aircraft radio communication system architecture 500 may implement at least one of the first aircraft radio communication system 100, the second aircraft radio communication system 200, and/or the third aircraft radio communication system 300 of FIGS. 1A, 1B, 2, and/or 3. The aircraft radio communication system architecture 500 includes example implementations of an example aircraft 502 depicted in FIG. 5A, an example control station 504 depicted in FIG. 5B, and an example workstation 506 depicted in FIG. 5C. In some examples, the aircraft 502 may be an example implementation of hardware, software, and/or firmware of the first aircraft 102 of FIGS. 1-3 and/or the second aircraft 110 of FIGS. 1A-1B. In some examples, the control station 504 may be an example implementation of hardware, software, and/or firmware of the first control station 128 of FIGS. 1-3, the second control station 134 of FIGS. 1A-1B, and/or the BLOS control station 304 of FIG. 3. For example, the control station 504 can be a stationary control station or a mobile control station. In some examples, the workstation 506 may be an example implementation of hardware, software, and/or firmware of the first computing system 132 of FIGS. 1-3, the second computing system 138 of FIGS. 1A-1B, and/or the third computing system 324 of FIG. 3. In some examples, the radio configuration circuitry 400 of FIG. 4 may implement at least one of the aircraft 502, the control station 504, and/or the workstation 506, and/or portion(s) thereof.

The aircraft 502 of the illustrated example includes an example mission computer 508, an example payload computer 510, a first example network switch 512, a first example radio 514, a second example radio 516, and a first example transceiver 518. In some examples, the mission computer 508, the payload computer 510, the first network switch 512, the first radio 514, the second radio 516, and/or the first transceiver 518 may implement an avionics module.

In some examples, the first radio 514 can be implemented by the first radio 104 of FIGS. 1-3. For example, the first radio 514 can implement a private radio. In some examples, the second radio 516 can be implemented by the second radio 106 of FIGS. 1-3. For example, the second radio 516 can implement a private radio. In some examples, the first transceiver 518 can be implemented by the third radio 108 of FIGS. 1-3. For example, the first transceiver 518 can implement a public radio. In some such examples, the first transceiver 518 can implement a broadcast beacon transceiver (e.g., an IoT transceiver), or a transceiver that can receive/transmit radio messages based on an IoT communication protocol. In this example, the aircraft 502 can control operation of the first radio 514, the second radio 516, and the first transceiver 518 using firmware.

In some examples, the aircraft 502 includes the mission computer 508 to control an aircraft to execute one or more flight operations. In some examples, the mission computer 508 can be implemented by processor circuitry as described herein. In this example, the mission computer 508 instantiates and/or otherwise is configured to execute an example global navigation satellite system (GNSS) service 520, an example autopilot driver 522, a first example radio driver 524, and a first example internode network service 526. In some examples, the mission computer 508 executes the GNSS service 520 to execute, effectuate, and/or otherwise facilitate positioning, navigation, and timing (PNT) tasks for the aircraft 502. For example, the GNSS service 520 can implement a Global Position System (GPS) service or any other PNT service on a global or regional basis. In some examples, the mission computer 508 executes the autopilot driver 522 to control the aircraft 502 in an autopilot or autonomous mode of operation. In some examples, the mission computer 508 executes the first radio driver 524 to control the first radio 514 by transmitting and/or receiving radio messages using the first radio 514. In some examples, the mission computer 508 executes the first internode network service 526 to receive/transmit data to a different node, such as the payload computer 510. For example, the mission computer 508 can execute the first internode network service 526 based on a publish/subscribe model in which the mission computer 508 can publish and/or otherwise transmit data to data subscribers, such as the payload computer 510 or different hardware, software, and/or firmware.

In some examples, the aircraft 502 includes the payload computer 510 to control a payload of an aircraft to execute one or more payload operations. For example, the payload can be a camera array, a radar system, etc. In some examples, the payload computer 510 can be implemented by processor circuitry as described herein. In this example, the payload computer 510 instantiates and/or otherwise is configured to execute a second example internode network service 528, a first example transceiver driver 530, a first example transceiver certificate manager and authenticator for public/private encryption keys 532, a second example radio driver 534, a first example network functions virtualization (NFV) 536, and a first example transceiver network service 538.

In some examples, the payload computer 510 executes the second internode network service 528 to receive/transmit data to a different node, such as the mission computer 508. For example, the payload computer 510 can execute the second internode network service 528 based on a publish/subscribe model in which the payload computer 510 can publish and/or otherwise transmit data to data subscribers, such as the mission computer 508 or different hardware, software, and/or firmware. In some examples, the payload computer 510 executes the first transceiver driver 530 to control the first transceiver 518 by transmitting and/or receiving radio messages using the first transceiver 518. In some examples, the payload computer 510 executes the first transceiver certificate manager and authenticator for public/private encryption keys 532 to encrypt/decrypt radio message data based on digital certificate(s), which may include public or private encryption keys. In some examples, the payload computer 510 executes the first transceiver certificate manager and authenticator for public/private encryption keys 532 to authenticate, verify, validate, etc., radio configuration information based on cryptographic information included in the radio configuration information. For example, the first transceiver 518 can receive a message including the radio configuration information from a different aircraft, the control station 504, etc. In some such examples, the first transceiver 518 can deliver the message to the first network switch 512. The first network switch 512 can deliver to the payload computer 510 at which the radio configuration information can be authenticated by the first transceiver certificate manager and authenticator for public/private encryption keys 532. In some such examples, in response to authenticating (e.g., an authentication, a verification, a validation, etc.) the radio configuration information, the first radio driver 524 can configure a private radio of the aircraft 502, such as the first radio 514, based on the radio configuration information (e.g., the authenticated radio configuration information).

In some examples, the payload computer 510 executes the second radio driver 534 to control the second radio 516 by transmitting and/or receiving radio messages using the second radio 516. In some examples, the payload computer 510 executes the first NFV 536 to instantiate a software defined network (SDN) controller to control virtualized resources (e.g., virtualizations of network resources such as switches, gateways, routers, modems, etc.). For example, the first NFV 536 can control the first transceiver network service 538. In some examples, the payload computer 510 executes the first transceiver network service 538 to instantiate a firewall and/or NFVs. For example, the first transceiver network service 538 can deliver data to and/or receive data from the first network switch 512.

In some examples, the aircraft 502 includes the first network switch 512 to communicatively couple the mission computer 508, the payload computer 510, the first radio 514, the second radio 516, and/or the first transceiver 518. For example, the first network switch 512 can receive data from and/or transmit data to one(s) of the mission computer 508, the payload computer 510, the first radio 514, the second radio 516, and/or the first transceiver 518. In some examples, the first network switch 512 can be implemented by interface circuitry as described herein.

The control station 504 of the illustrated example includes a third example radio 540, a fourth example radio 542, a second example transceiver 544, a second example network switch 546, a third example radio driver 548, a fourth example radio driver 550, a third example internode network service 552, an example vehicle specific module (VSM) 554, a second example transceiver driver 556, a second example transceiver certificate manager and authenticator for public/private encryption keys 558, a second example NFV 560, and a second example transceiver network service 562. The control station 504 includes a first example graphic user interface (GUI) 541 for control and status of the third radio 540, a second example GUI 543 for control and status of the fourth radio 542, and a third example GUI 545 for control and status of the second transceiver 544. For example, an operator can control the third radio 540 and/or request a status of the third radio 540 via the first GUI 541.

In some examples, the third radio 540 can be implemented by the sixth radio 116 of FIGS. 1-3. For example, the third radio 540 can implement a private radio. In some examples, the fourth radio 542 can be implemented by the seventh radio 118 of FIGS. 1-3. For example, the fourth radio 542 can implement a private radio. In some examples, the second transceiver 544 can be implemented by the ninth radio 121, the tenth radio 123, the eleventh radio 125, the seventeenth radio 308, and/or the eighteenth radio 325 of FIGS. 1A, 1B, 2, and/or 3. For example, the second transceiver 544 can implement a public radio. In some examples, the second transceiver 544 can implement a broadcast beacon transceiver (e.g., an IoT transceiver), or a transceiver that can receive/transmit radio messages based on a public communication protocol (e.g., an IoT communication protocol). In this example, the control station 504 can control operation of the third radio 540, the fourth radio 542, and the second transceiver 544 using firmware.

In some examples, the control station 504 executes the third radio driver 548 to control the third radio 540 by transmitting and/or receiving radio messages using the third radio 540. In some examples, the control station 504 executes the fourth radio driver 550 to control the fourth radio 542 by transmitting and/or receiving radio messages using the fourth radio 542. In some examples, the control station 504 executes the third internode network service 552 to receive/transmit data to a different node of the control station 504. In some examples, the control station 504 executes the VSM 554 to control a specific vehicle, such as the aircraft 502. For example, the VSM 554 can include commands, instructions, etc., that can be used to cause the aircraft 502 to execute one or more flight operations.

In some examples, the control station 504 executes the second transceiver driver 556 to control the second transceiver 544 by transmitting and/or receiving radio messages using the second transceiver 544. In some examples, the control station 504 executes the second transceiver certificate manager and authenticator for public/private encryption keys 558 to encrypt/decrypt radio message data based on digital certificate(s), which may include public or private encryption keys. In some examples, the control station 504 executes the second transceiver certificate manager and authenticator for public/private encryption keys 558 to authenticate, verify, validate, etc., radio configuration information based on cryptographic information included in the radio configuration information. For example, the second transceiver 544 can receive a message including the radio configuration information from the aircraft 502, a different control station, etc. In some such examples, the second transceiver 544 can deliver the message to the second network switch 546. The second network switch 546 can deliver to the second transceiver certificate manager and authenticator for public/private encryption keys 558 at which the radio configuration information can be authenticated. In some such examples, in response to authenticating the radio configuration information, the second transceiver driver 556 can supply the information, through the second network switch 546 and the third internode network service 552, to (i) the third radio driver 548 to configure a private radio of the control station 504, such as the third radio 540, and/or to (ii) the fourth radio driver 550 to configure a private radio of the control station 504, such as the fourth radio 542, based on the radio configuration information (e.g., the authenticated radio configuration information).

In some examples, the control station 504 executes the second NFV 560 to instantiate an SDN controller to control virtualized resources. For example, the second NFV 560 can control the second transceiver network service 562. In some examples, the control station 504 executes the second transceiver network service 562 to instantiate a firewall and/or NFVs. For example, the second transceiver network service 562 can deliver data to and/or receive data from the second network switch 546.

In some examples, the control station 504 includes the second network switch 546 to communicatively couple the third radio 540, a fourth example radio 542, the second transceiver 544, the second network switch 546, the third radio driver 548, the fourth radio driver 550, the third internode network service 552, the VSM 554, the second transceiver driver 556, the second transceiver certificate manager and authenticator for public/private encryption keys 558, the second NFV 560, and the second transceiver network service 562. In some examples, the second network switch 546 can be implemented by interface circuitry as described herein.

The workstation 506 of the illustrated example includes example graphic user interface (GUI) controls 563, an example GUI map 564, and a plurality of example GUI control panels 566, 568 that include a first example GUI control panel 566 and a second example GUI control panel 568. The first GUI control panel 566 includes a first example radio control GUI 570, a second example radio control GUI 572, and a first example transceiver control GUI 574. The second GUI control panel 568 includes a third example radio control GUI 576, a fourth example radio control GUI 578, and a second example transceiver control GUI 580.

In some examples, the workstation 506 can execute the GUI controls 563 to control one or more GUIs instantiated by the workstation 506. In some examples, the workstation 506 can execute the GUI map 564 to map one or more aircraft detected via broadcast beacon signals to a respective one of the GUI control panels 566, 568. For example, the workstation 506 can execute the GUI map 564 to populate and/or otherwise provide data associated with an aircraft to one of the GUI control panels 566, 568 that corresponds to the aircraft.

In some examples, the workstation 506 executes the first GUI control panel 566 to instantiate and/or otherwise launch one or more GUIs that correspond to a first aircraft, such as the first aircraft 102 of FIGS. 1-3. In this example, the first aircraft has a serial number of SERIALNUMX and the first aircraft is found and/or otherwise identified based on a beacon broadcast by a public radio (e.g., a broadcast beacon transceiver, an IoT transceiver, etc.) of the first aircraft.

In some examples, the workstation 506 can execute the first radio control GUI 570 to control the first aircraft 102 by way of the first radio 104 of FIGS. 1-3. In some such examples, the workstation 506 can execute the first radio control GUI 570 to transmit a command to the first aircraft 102 to execute a flight operation, determine a status associated with the first aircraft 102, etc. In some such examples, the first radio control GUI 570 can include display buttons, switches, dials, sliders, input fields, keypads, etc., or any other type of input function of a GUI.

In some examples, the workstation 506 can execute the second radio control GUI 572 to control the first aircraft 102 by way of the second radio 106 of FIGS. 1-3. In some such examples, the workstation 506 can execute the second radio control GUI 572 to transmit a command to the first aircraft 102 to execute a flight operation, determine a status associated with the first aircraft 102, etc. In some such examples, the second radio control GUI 572 can include display buttons, switches, dials, sliders, input fields, keypads, etc., or any other type of input function of a GUI.

In some examples, the workstation 506 can execute the first transceiver control GUI 574 to receive data from the first aircraft 102 by way of the third radio 108 of FIGS. 1-3. In some such examples, the workstation 506 can execute the first transceiver control GUI 574 to identify data included in a beacon transmitted by the third radio 108, determine a status associated with the first aircraft 102, etc. In some such examples, the first transceiver control GUI 574 can include displays, gauges, dials, or any other type of display function of a GUI that can be used to display data, statuses, etc., associated with the first aircraft 102.

In some examples, the workstation 506 executes the second GUI control panel 568 to instantiate and/or otherwise launch one or more GUIs that correspond to a second aircraft, such as the second aircraft 110 of FIGS. 1A-1B. In this example, the second aircraft has a serial number of SERIALNUMY and the second aircraft is found and/or otherwise identified based on a beacon broadcast by a public radio (e.g., a broadcast beacon transceiver, an IoT transceiver, etc.) of the second aircraft.

In some examples, the workstation 506 can execute the third radio control GUI 576 and/or the fourth radio control GUI 578 to control the second aircraft 110 by way of the fourth radio 112 of FIGS. 1A-1B or a different private radio of the second aircraft 110. In some such examples, the workstation 506 can execute the third radio control GUI 576 and/or the fourth radio control GUI 578 to transmit a command to the second aircraft 110 to execute a flight operation, determine a status associated with the second aircraft 110, etc. In some such examples, the third radio control GUI 576 and/or the fourth radio control GUI 578 can include display buttons, switches, dials, sliders, input fields, keypads, etc., or any other type of input function of a GUI.

In some examples, the workstation 506 can execute the second transceiver control GUI 580 to receive data from the second aircraft 110 by way of the fifth radio 114 of FIGS. 1A-1B. In some such examples, the workstation 506 can execute the second transceiver control GUI 580 to identify data included in a beacon transmitted by the fifth radio 114, determine a status associated with the second aircraft 110, etc. In some such examples, the second transceiver control GUI 580 can include displays, gauges, dials, or any other type of display function of a GUI that can be used to display data, statuses, etc., associated with the second aircraft 110.

Figure 6:
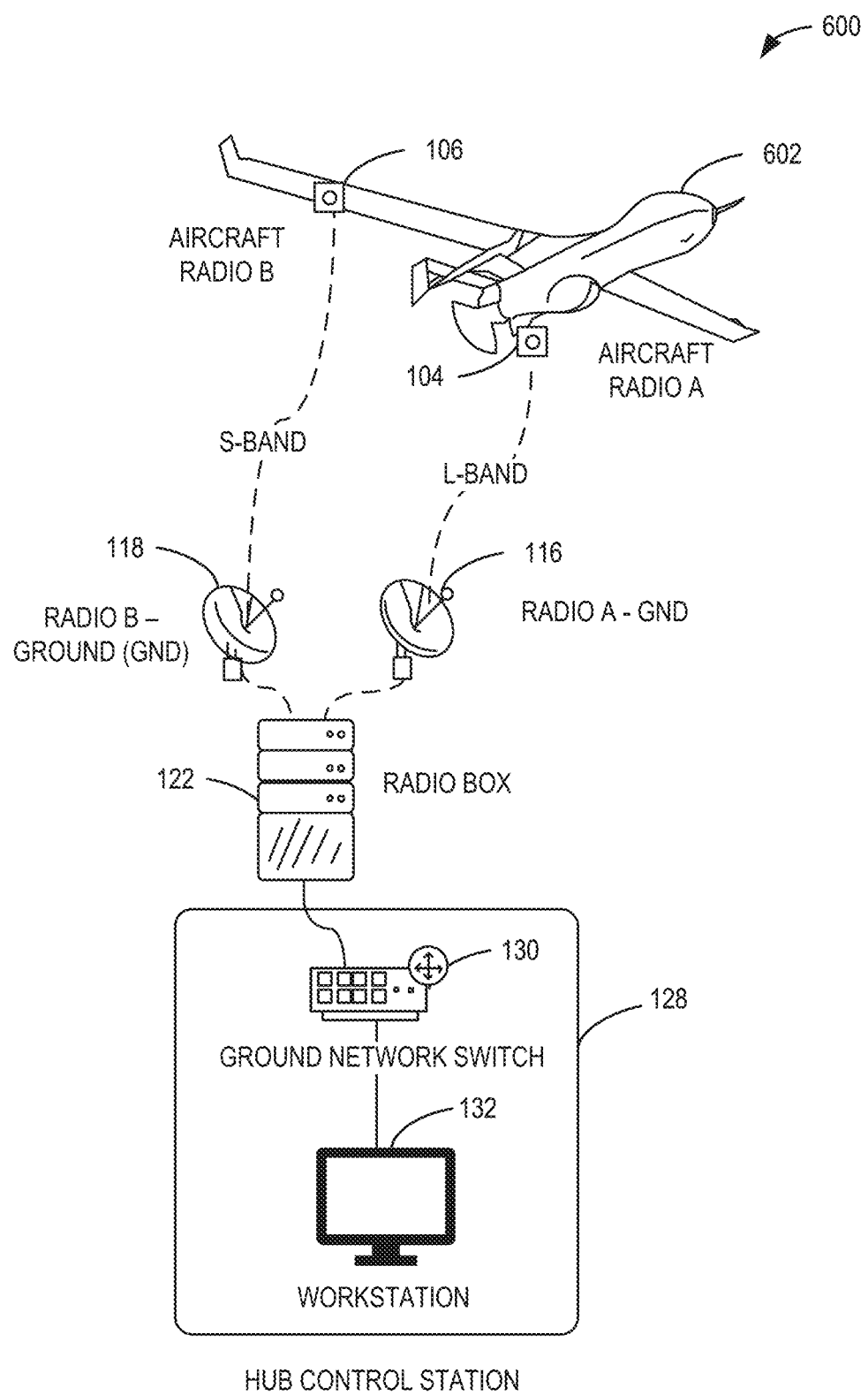
FIG. 6 is another example implementation of the first aircraft communication system of FIGS. 1A and/or 1B.

FIG. 6 illustrates a fourth example aircraft radio communication system 600 including a third example aircraft 602, which includes the first radio 104 and the second radio 106 of FIGS. 1-3. The fourth aircraft radio communication system 600 includes the sixth radio 116, the seventh radio 118, the first radio box 122, the first control station 128, the first network switch 130, and the first computing system 132 of FIGS. 1-3.

In the illustrated example of FIG. 6, the first control station 128 may be unable to communicate with the third aircraft 602 unless the control station 128 has a priori knowledge of radio configuration settings of at least one of the first radio 104 or the second radio 106. For example, the sixth radio 116 and/or the seventh radio 118 may be unable to communicate with the first radio 104 and/or the second radio 106 without advance knowledge of radio configuration information of the first radio 104 and/or the second radio 106. Advantageously, the first aircraft radio communication system 100, the second aircraft radio communication system 200, and the third aircraft radio communication system 300 of FIGS. 1-3 overcome this limitation by identifying radio configuration information of at least one of the first radio 104 or the second radio 106 by utilizing data included in a broadcast beacon by a public radio of an aircraft, such as the third radio 108 of FIGS. 1-3.

Figure 7:
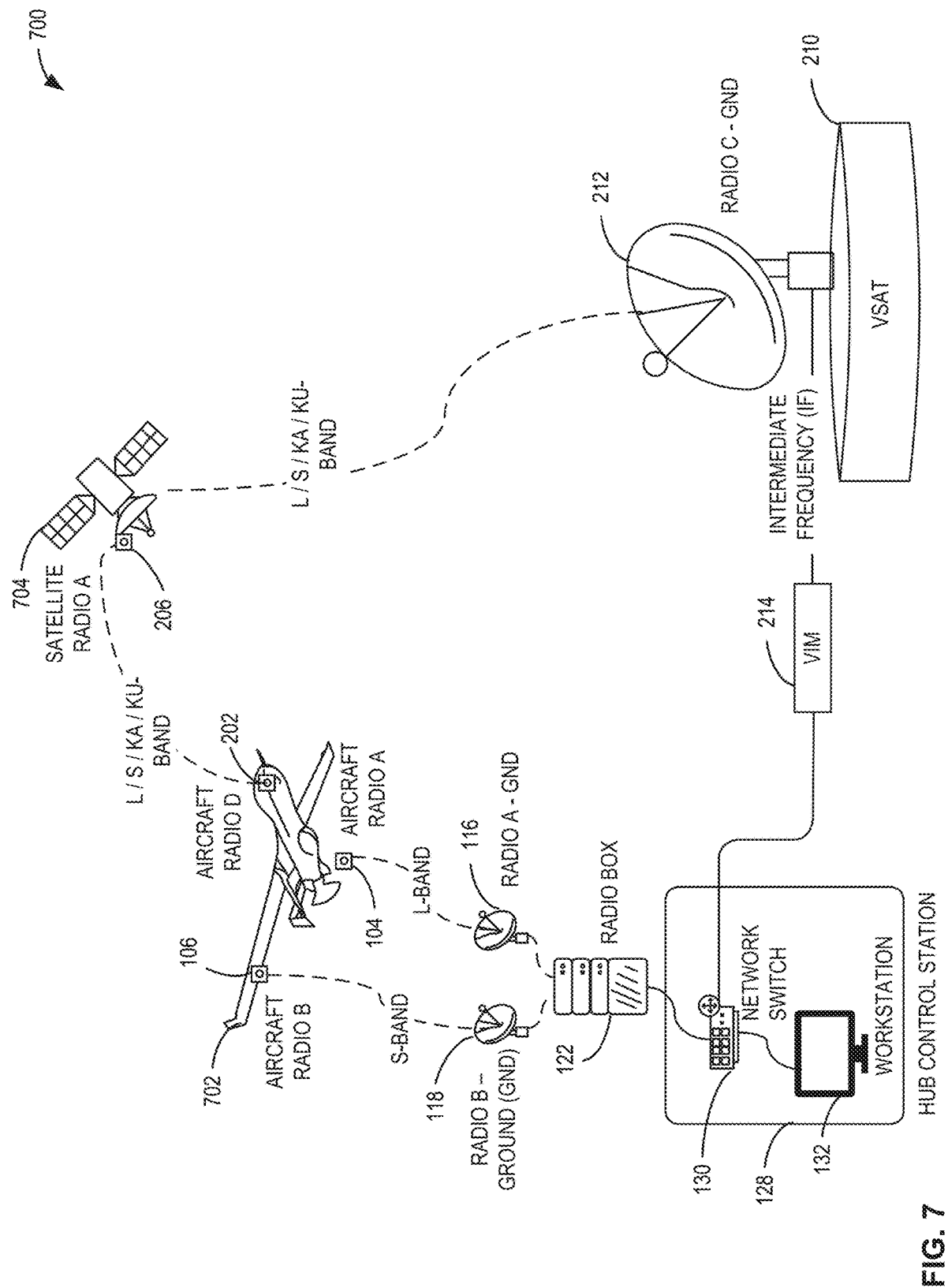
FIG. 7 is another example implementation of the second aircraft radio communication system of FIG. 2.

FIG. 7 illustrates a fifth example aircraft radio communication system 700 including a fourth example aircraft 702, which includes the first radio 104 and the second radio 106 of FIGS. 1-3 and the twelfth radio 202 of FIGS. 2-3. The fifth aircraft radio communication system 700 includes the sixth radio 116, the seventh radio 118, the first radio box 122, the first control station 128, the first network switch 130, and the first computing system 132 of FIGS. 1-3. The fifth aircraft radio communication system 700 includes the VSAT 210, the fifteenth radio 212, and the VIM 214 of FIG. 2. The fifth aircraft radio communication system 700 includes a second example satellite 704, which includes the thirteenth radio 206 of FIGS. 2-3.

In the illustrated example of FIG. 7, the first control station 128 may be unable to communicate with the fourth aircraft 702 by LOS and/or BLOS unless the control station 128 has a priori knowledge of radio configuration settings of at least one of the first radio 104, the second radio 106, and/or the twelfth radio 202. For example, the sixth radio 116 and/or the seventh radio 118 may be unable to communicate with the first radio 104 and/or the second radio 106 without advance knowledge of radio configuration information of the first radio 104 and/or the second radio 106. In some examples, the fifteenth radio 212 may be unable to communicate with the twelfth radio 202 by way of the second satellite 704 without advance knowledge of radio configuration information of the twelfth radio 202. Advantageously, the second aircraft radio communication system 200 and the third aircraft radio communication system 300 of FIGS. 2-3 overcome this limitation by identifying radio configuration information of at least one of the first radio 104, the second radio 106, or the twelfth radio 202 by utilizing data included in a broadcast beacon by a public radio of an aircraft, such as the third radio 108 of FIGS. 1-3.

Figure 8:
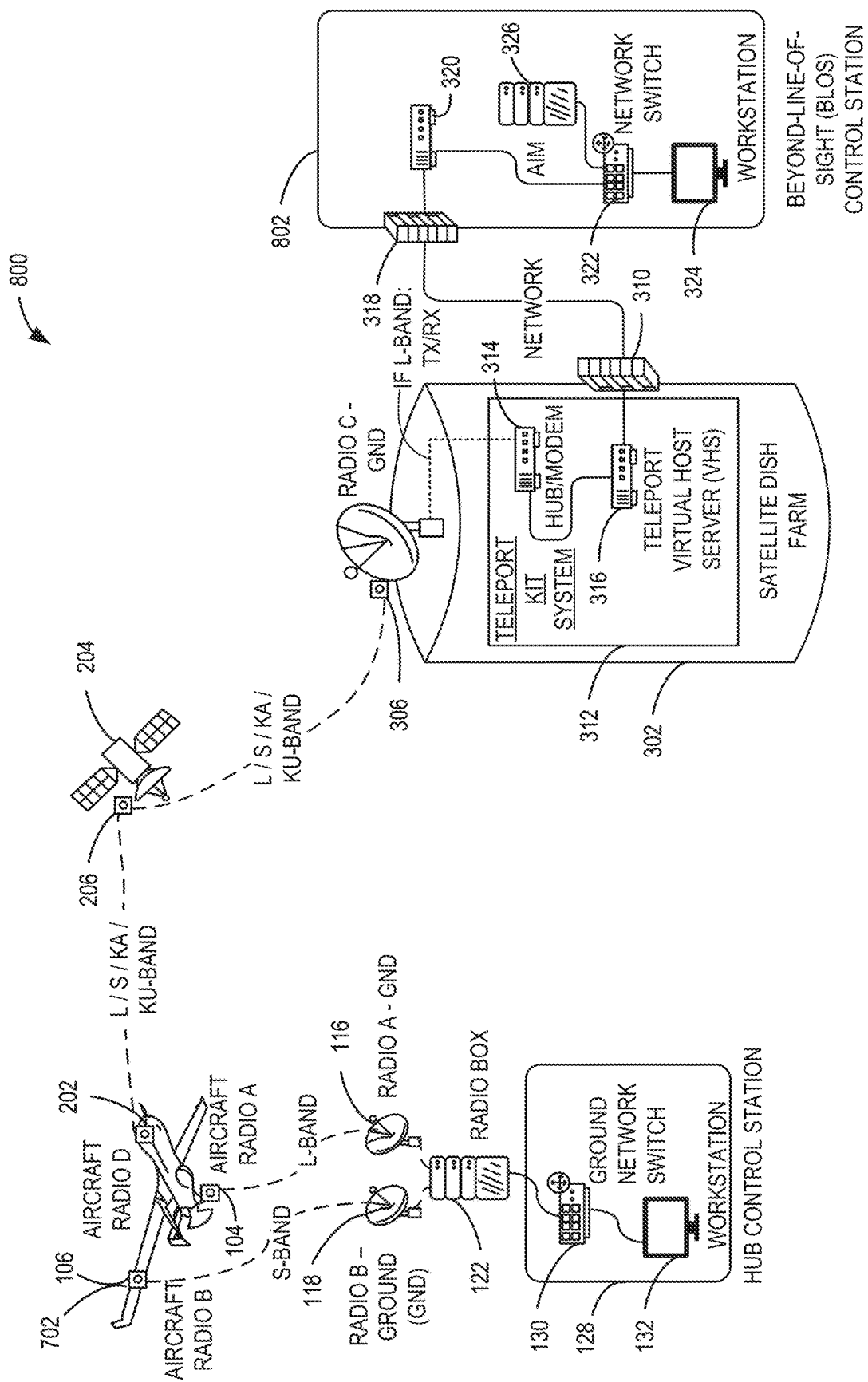
FIG. 8 is another example implementation of the third aircraft radio communication system of FIG. 3.

FIG. 8 illustrates a sixth example aircraft radio communication system 800 including the fourth aircraft 702 of FIG. 7, the first radio 104 and the second radio 106 of FIGS. 1-3 and the twelfth radio 202 of FIGS. 2-3. The sixth aircraft radio communication system 800 includes the sixth radio 116, the seventh radio 118, the first radio box 122, the first control station 128, the first network switch 130, and the first computing system 132 of FIGS. 1-3. The sixth aircraft radio communication system 800 includes the second satellite 704 of FIG. 7 and the thirteenth radio 206 of FIGS. 2-3. The sixth aircraft radio communication system 800 includes the satellite dish farm 302, the sixteenth radio 306, the teleport kit system 312, the hub/modem 314, the teleport VHS 316, and the first firewall 310. The sixth aircraft radio communication system 800 includes another example BLOS control station 802, which includes the second firewall 318, the network router 320, the third network switch 322, the third computing system 324, and the fifth radio box of FIG. 3.

In the illustrated example of FIG. 8, the first control station 128 may be unable to communicate with the fourth aircraft 702 by LOS and/or BLOS unless the control station 128 has a priori knowledge of radio configuration settings of at least one of the first radio 104, the second radio 106, and/or the twelfth radio 202. For example, the sixth radio 116 and/or the seventh radio 118 may be unable to communicate with the first radio 104 and/or the second radio 106 without advance knowledge of radio configuration information of the first radio 104 and/or the second radio 106. In some examples, the sixteenth radio 306 may be unable to communicate with the twelfth radio 202 by way of the second satellite 704 without advance knowledge of radio configuration information of the twelfth radio 202. Advantageously, the second aircraft radio communication system 200 and the third aircraft radio communication system 300 of FIGS. 2-3 overcome this limitation by identifying radio configuration information of at least one of the first radio 104, the second radio 106, or the twelfth radio 202 by utilizing data included in a broadcast beacon by a public radio of an aircraft, such as the third radio 108 of FIGS. 1-3.

Figure 9A:
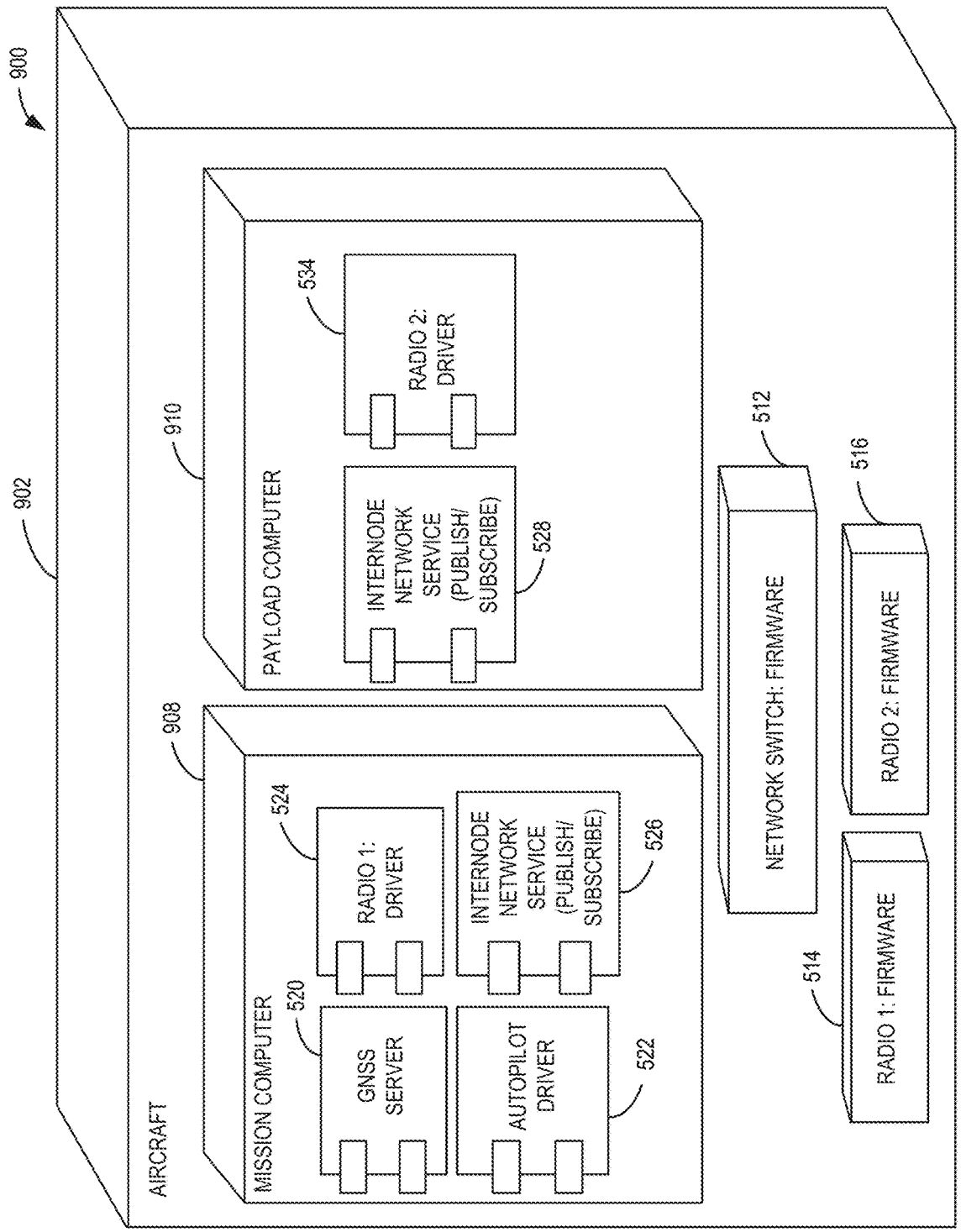
FIG. 9A depicts a block diagram of another example implementation of the example aircraft of FIGS. 1A, 1B, 2, and/or 3.
Figure 9B:
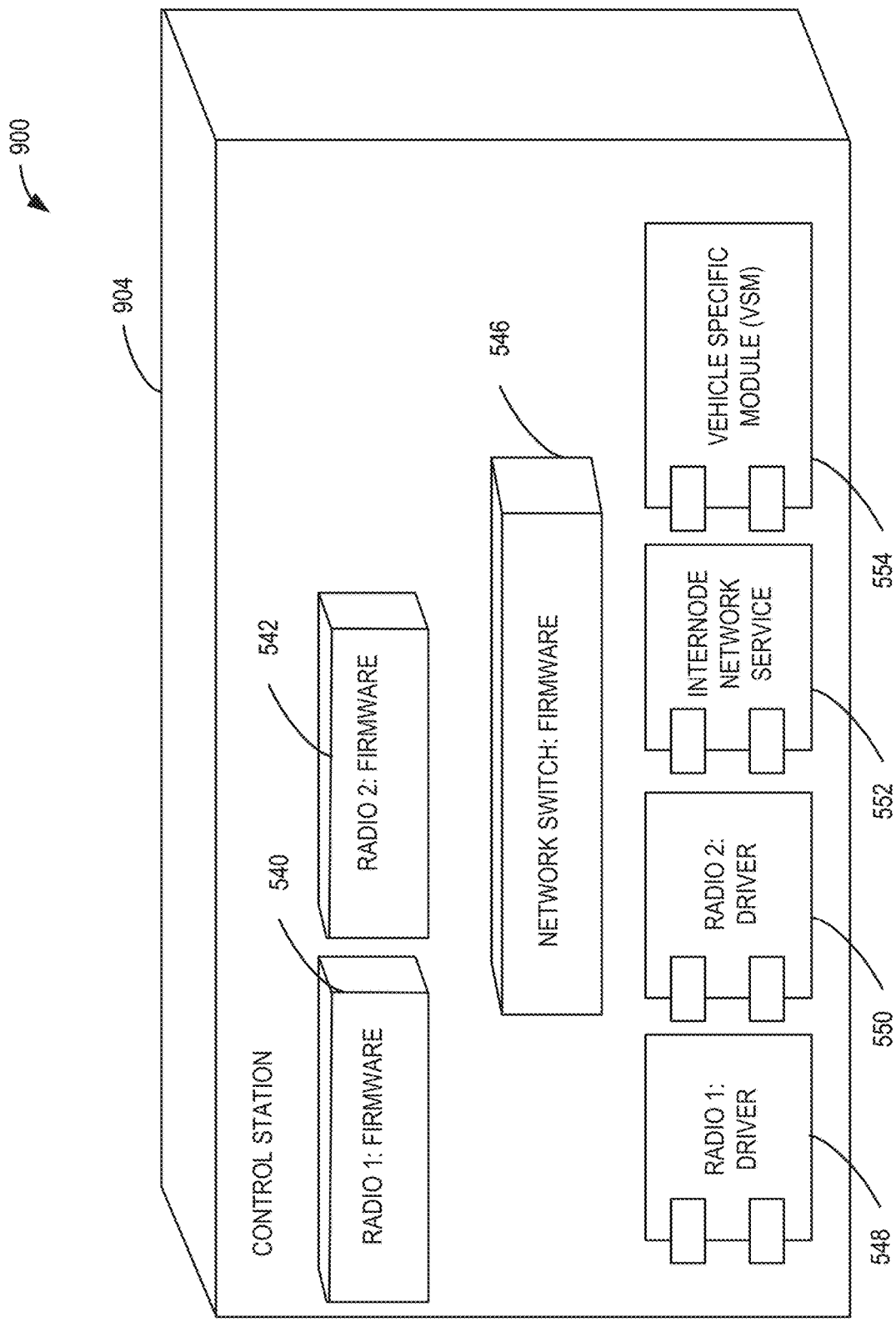
FIG. 9B depicts a block diagram of another example implementation of the example control station of FIGS. 1A, 1B, 2, and/or 3.
Figure 9C:
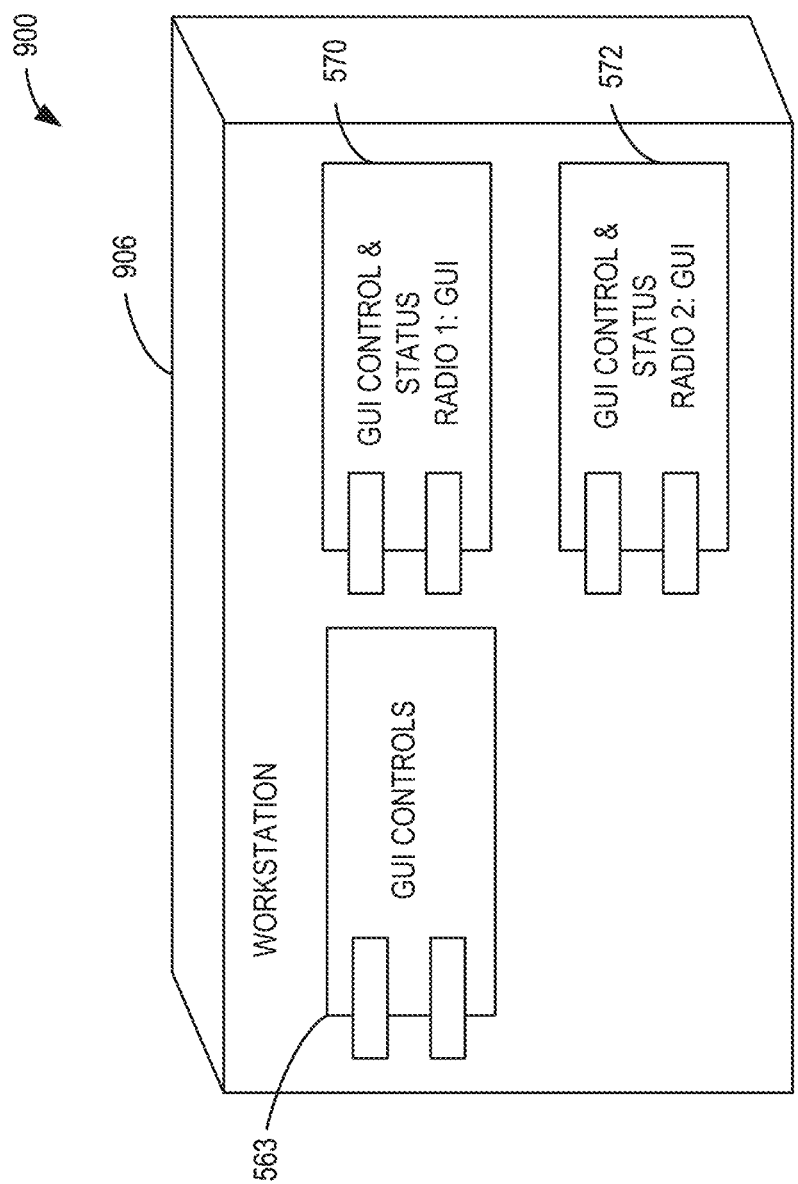
FIG. 9C depicts a block diagram of another example implementation of the example operator workstation of FIGS. 1A, 1B, 2, and/or 3.

FIGS. 9A-9C depicts block diagrams of another example aircraft radio communication system architecture 900. The aircraft radio communication system architecture 900 of the illustrated example of FIGS. 9A-9C may implement at least one of the fourth aircraft radio communication system 600, the fifth aircraft radio communication system 700, and/or the sixth aircraft radio communication system 800 of FIGS. 6, 7, and/or 8. The aircraft radio communication system architecture 900 includes example implementations of an example aircraft 902 depicted in FIG. 9A, an example control station 904 depicted in FIG. 9B, and an example workstation 906 depicted in FIG. 9C. In some examples, the aircraft 902 may be an example implementation of hardware, software, and/or firmware of the third aircraft 602 of FIG. 6 and/or the fourth aircraft 702 of FIGS. 7 and/or 8. In some examples, the control station 904 may be an example implementation of hardware, software, and/or firmware of the BLOS control station 802 of FIG. 8. In some examples, the workstation 506 may be an example implementation of hardware, software, and/or firmware of the third computing system 324 of FIG. 8.

The aircraft 902 of the illustrated example of FIG. 9A includes another example mission computer 908, which includes the GNSS service 520, the autopilot driver 522, the first radio driver 524, and the first internode network service 526 of FIG. 5A. The aircraft 902 includes another example payload computer 910, which includes the second internode network service 528 and the second radio driver 534 of FIG. 5A. The aircraft 902 includes the first network switch 512, the first radio 514, and the second radio 516 of FIG. 5A. The control station 904 of the illustrated example of FIG. 9B includes the third radio 540, the fourth radio 542, the second network switch 546, the third radio driver 548, the fourth radio driver 550, the third internode network service 552, and the VSM 554 of FIG. 5B. The workstation 906 of the illustrated example of FIG. 9C includes the GUI controls 563, the first radio control GUI 570, and the second radio control GUI 572 of FIG. 5C.

The control station 904 and/or the workstation 906 (e.g., by way of the control station 904) may be unable to communicate with the aircraft 902 by LOS and/or BLOS unless the control station 904 and/or the workstation 906 have a priori knowledge of radio configuration settings of at least one of the first radio 514 or the second radio 516. For example, the third radio 540 and/or the fourth radio 542 may be unable to communicate with the first radio 514 and/or the second radio 516 without advance knowledge of radio configuration information of the first radio 514 and/or the second radio 516. Advantageously, the aircraft radio communication system architecture 500 of FIGS. 5A-5C overcomes this limitation by identifying radio configuration information of at least one of the first radio 514 or the second radio 516 by utilizing data included in a broadcast beacon by a public radio of the aircraft 502, such as the first transceiver 518 of FIG. 5A.

Data flow diagrams and/or flowcharts representative of example hardware logic circuitry, machine readable instructions, hardware implemented state machines, and/or any combination thereof for implementing the radio configuration circuitry 400 of FIG. 4 is shown in FIGS. 10A-10B, 11, 12A-12B, 13, 14, 15, 16, and/or 17. The machine readable instructions may be one or more executable programs or portion(s) of an executable program for execution by processor circuitry, such as the processor circuitry 1812 shown in the example processor platform 1800 discussed below in connection with FIG. 18, the processor circuitry 1912 shown in the example processor platform 1900 discussed below in connection with FIG. 19, and/or the example processor circuitry discussed below in connection with FIGS. 20 and/or 21. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the data flow diagrams and/or the flowcharts illustrated in FIGS. 10A-10B, 11, 12A-12B, 13, 14, 15, 16, and/or 17, many other methods of implementing the example radio configuration circuitry 400 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 10A-10B, 11, 12A-12B, 13, 14, 15, 16, and/or 17 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 10A:
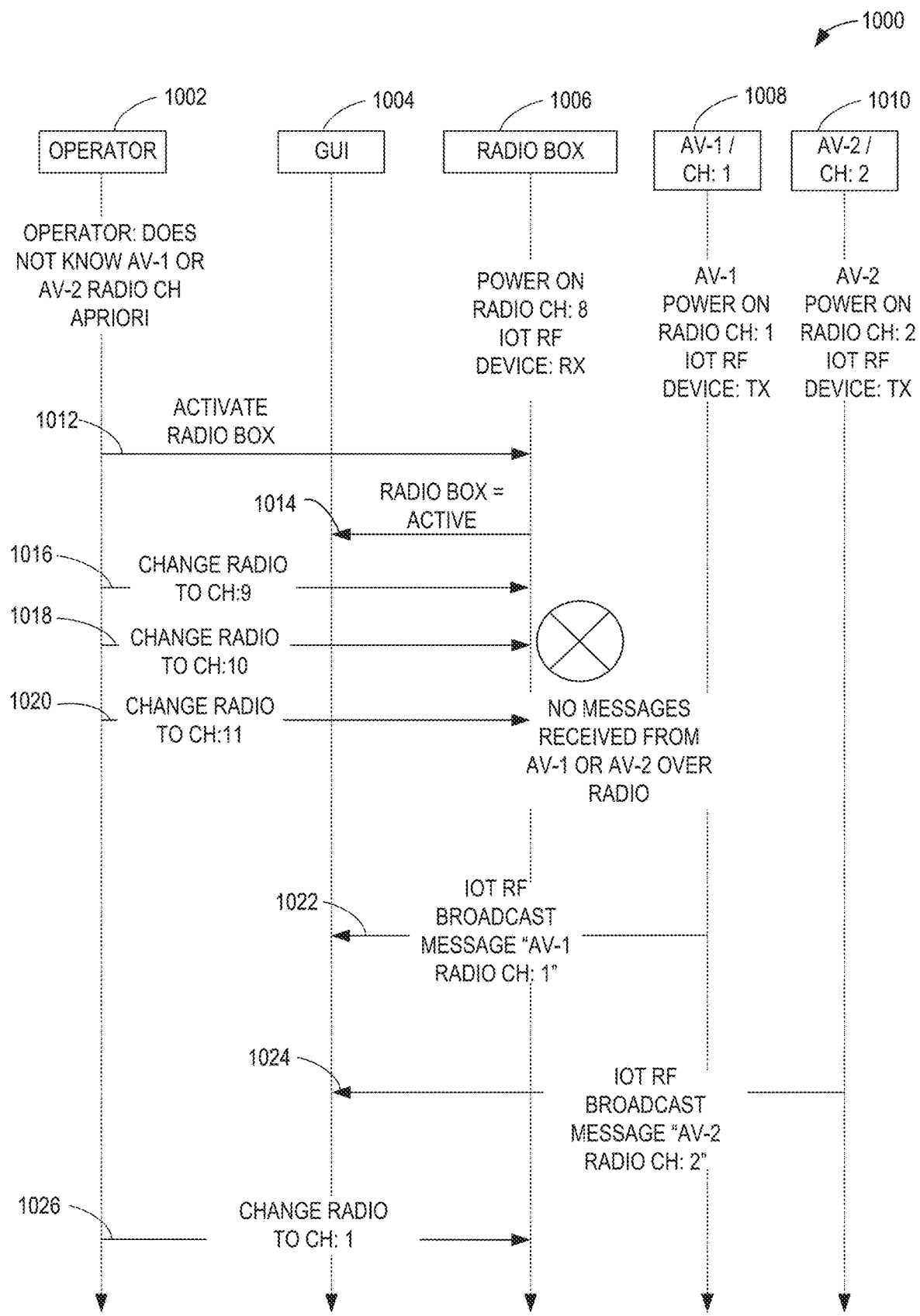
FIGS. 10A-10B depict a first data flow diagram of example operations that may be executed by processor circuitry to implement the example radio configuration circuitry of FIG. 4 to configure example radios associated with the example aircraft, the example control station, and/or the example operator workstation of FIGS. 1A and/or 1B.
Figure 10B:
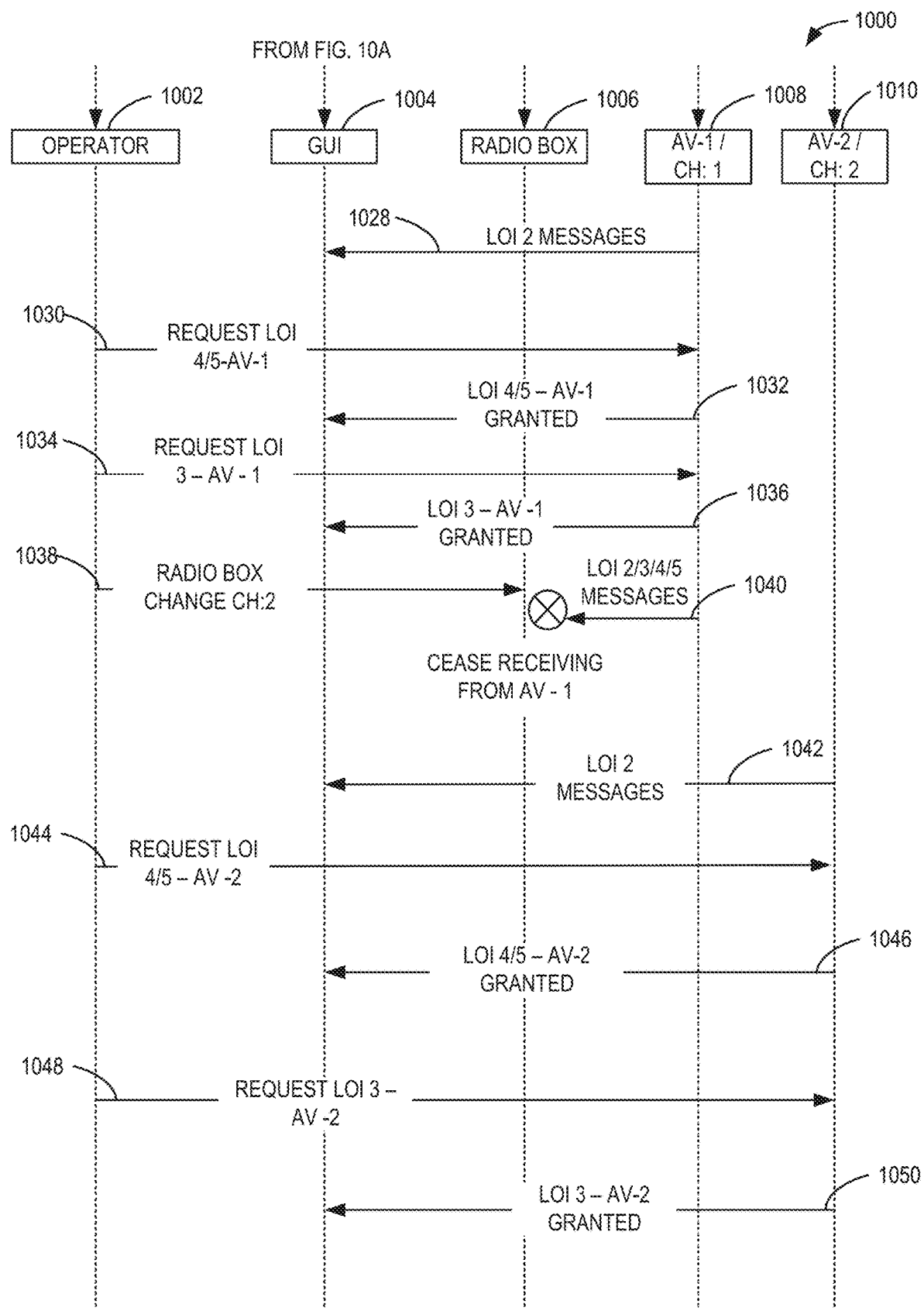

FIGS. 10A-10B depict a data flow diagram representative of example machine readable instructions and/or example operations 1000 that may be executed and/or instantiated by processor circuitry to configure example radios associated with the first aircraft 102, the second aircraft 110, the first control station 128, the second control station 134, the satellite 204, the VSAT 210, the satellite dish farm 302, and/or the BLOS control station 304 of FIGS. 1A, 1B, 2, and/or 3. The data flow diagram can be carried out and/or otherwise performed by an example operator 1002, an example GUI 1004, an example radio box 1006, a first example aircraft 1008, and a second example aircraft 1010. In some examples, the operator 1002 can be an aircraft personnel, ground crew member, site lead, mission commander, etc., associated with the first control station 128, the second control station 134, and/or the BLOS control station 304. In some examples, the GUI 1004 can be implemented by the GUI controls 563, the GUI map 564, the first GUI control panel 566, the second GUI control panel 568, and/or, more generally, the workstation 506 of FIG. 5C. For example, the GUI 1004 can be implemented by the first computing system 132, the second computing system 138, and/or the third computing system 324. In some examples, the radio box 1006 can be implemented by the first radio box 122, the second radio box 124, the third radio box 126, the fourth radio box 140, the fifth radio box 326, and/or the sixth radio box 328.

In some examples, the first aircraft 1008 can be implemented by the first aircraft 102 of FIGS. 1-3. In some examples, the second aircraft 1010 can be implemented by the second aircraft 110 of FIGS. 1A-1B. In this example, the first aircraft 1008 is identified by autonomous vehicle 1 (AV-1) and includes one or more radios that can communicate on a first radio channel (CH: 1). In this example, the second aircraft 1010 is identified by AV-2 and includes one or more radios that can communicate on a second radio channel (CH: 2).

Prior to a first time 1012, the operator 1002 does not know radio configuration information (e.g., a priori radio configuration settings or information) for a private radio of the first aircraft 1008 or a private radio of the second aircraft 1010. For example, the operator 1002 may be unaware of a radiofrequency at which the private radios of the first aircraft 1008 and the second aircraft 1010 are utilizing. At the first time 1012, the operator 1002 activates and/or otherwise powers on the radio box 1006. In this example, the radio box 1006 includes a first radio configured to communicate on an eighth radio channel (CH: 8) and an IoT radio configured to receive broadcast beacons (e.g., RF broadcast beacons, RF messages configured as broadcast beacons, etc.). In this example, the first radio of and/or otherwise associated with the radio box 1006 is configured to operate as a private radio (e.g., a radio with security measures in place to restrict access to the radio) and the IoT radio of the radio box 1006 is configured to operate as a public radio (e.g., a radio that is unrestricted from who the radio can receive communications).

At a second time 1014, the radio box 1006 provides a status to the GUI 1004 that indicates that the radio box 1006 is active and/or otherwise powered on. At a third time 1016, the operator 1002 instructs the radio box 1006 to change to a ninth radio channel (CH: 9). At the third time 1016, the radio box 1006 does not receive any messages from the first aircraft 1008 and the second aircraft 1010 on the ninth radio channel.

At a fourth time 1018, the operator 1002 instructs the radio box 1006 to change to a tenth radio channel (CH: 10). At the fourth time 1018, the radio box 1006 does not receive any messages from the first aircraft 1008 and the second aircraft 1010 on the tenth radio channel. At a fifth time 1020, the operator 1002 instructs the radio box 1006 to change to an eleventh radio channel (CH: 11). At the fifth time 1020, the radio box 1006 does not receive any messages from the first aircraft 1008 and the second aircraft 1010 on the eleventh radio channel.

At a sixth time 1022, the GUI 1004 receives an indication that an IoT RF broadcast message has been received from the first aircraft 1008. In this example, the IoT RF broadcast message is a broadcast beacon that includes radio configuration information for a private radio of the first aircraft 1008. In this example, the radio configuration information indicates that the private radio of the first aircraft 1008 (e.g., the first radio 104 of FIGS. 1-3) is operating on a first radio channel (CH: 1).

At a seventh time 1024, the GUI 1004 receives an indication that an IoT RF broadcast message has been received from the second aircraft 1010. In this example, the IoT RF broadcast message is a broadcast beacon that includes radio configuration information for a private radio of the second aircraft 1010. In this example, the radio configuration information indicates that the private radio of the second aircraft 1010 (e.g., the fourth radio 112 of FIGS. 1A-1B) is operating on a second radio channel (CH: 2).

Advantageously, prior to an eighth time 1026, the operator 1002 is aware of the radio configuration information for the first aircraft 1008 by inspecting the GUI 1004. At the eighth time 1026, the operator 1002 instructs the radio box 1006 to change the radio configuration information of the public radio of the radio box 1006 from the eleventh radio channel (e.g., a first radiofrequency) to the first radio channel (e.g., a second radiofrequency different from the first radiofrequency). In response to the change, at a ninth time 1028, the GUI 1004 receives indications that messages are received from the first aircraft 1008 on the first radio channel. For example, the GUI 1004 can receive Level of Interoperability (LOI) data or messages (e.g., data or messages based on LOI Levels 1, 2, 3, 4, 5, etc., of an aircraft communication standard such as STANAG 4586). In some examples, LOI 1 or LOI Level 1 messages can correspond to indirect receipt/transmission of UAV related data and metadata. In some examples, LOI 2 or LOI Level 2 messages can correspond to direct receipt/transmission of UAV related data and metadata. For example, UAV related data and metadata can include physical location latitude, longitude, and altitude (LLA), heading, velocity, payload station available, etc. In some examples, LOI 3 or LOI Level 3 messages can correspond to control and monitoring of a UAV payload (e.g., the UAV payload and not the UAV itself). In some examples, LOI 4 or LOI Level 4 messages can correspond to control and monitoring of the UAV without launch (e.g., takeoff) and recovery (e.g., landing). In some examples, LOI 5 or LOI Level 5 messages can correspond to control and monitoring of the UAV including launch and recovery.

At a tenth time 1030, the operator 1002 initiates a security handshake with the first aircraft 1008 by requesting permission to communicate with the first aircraft 1008. For example, the request may include a cryptographic key that the first aircraft 1008 can use to authenticate the operator 1002. At an eleventh time 1032, the first aircraft 1008 grants the operator 1002 access to the first aircraft 1008, which may include access to data, measurements, etc., associated with the first aircraft 1008, capability to control the first aircraft 1008, etc. At a twelfth time 1034, the operator 1002 initiates another request for access to the first aircraft 1008 and the first aircraft 1008 grants the access at a thirteenth time 1036. For example, the operator 1002 can request LOI 3 from the first aircraft 1008. In some such examples, requesting LOI 3 can include requesting command/control of payload stations on the first aircraft 1008.

Advantageously, prior to a fourteenth time 1038, the operator 1002 is aware of the radio configuration information for the second aircraft 1010 by inspecting the GUI 1004. At the fourteenth time 1038, the operator 1002 instructs the radio box 1006 to change the radio configuration information of the public radio of the radio box 1006 from the first radio channel to the second radio channel. In response to the change, at a fifteenth time 1040, the radio box 1006 no longer receives communications from the first aircraft 1008 in preparation for switching over to receive communications from the second aircraft 1010. At a sixteenth time 1042, the GUI 1004 receives indications that messages are received from the second aircraft 1010 on the second radio channel.

At a seventeenth time 1044, the operator 1002 initiates a security handshake with the second aircraft 1010 by requesting permission to communicate with the second aircraft 1010. For example, the request may include a cryptographic key that the second aircraft 1010 can use to authenticate the operator 1002. At an eighteenth time 1046, the second aircraft 1010 grants the operator 1002 access to data and/or control of the second aircraft 1010. At a nineteenth time 1048, the operator 1002 initiates another request for access to the second aircraft 1010 and the second aircraft 1010 grants the access at a twentieth time 1050 after the nineteenth time 1048. For example, the operator 1002 can request LOI 3 of the second aircraft 1010. Advantageously, the operator 1002 is able to communicate with restricted radios of the first aircraft 1008 and the second aircraft 1010 without a priori knowledge of the radio configuration information of the restricted radios by utilizing data included in IoT broadcast beacons to identify the radio configuration information of the restricted radios.

Figure 11:
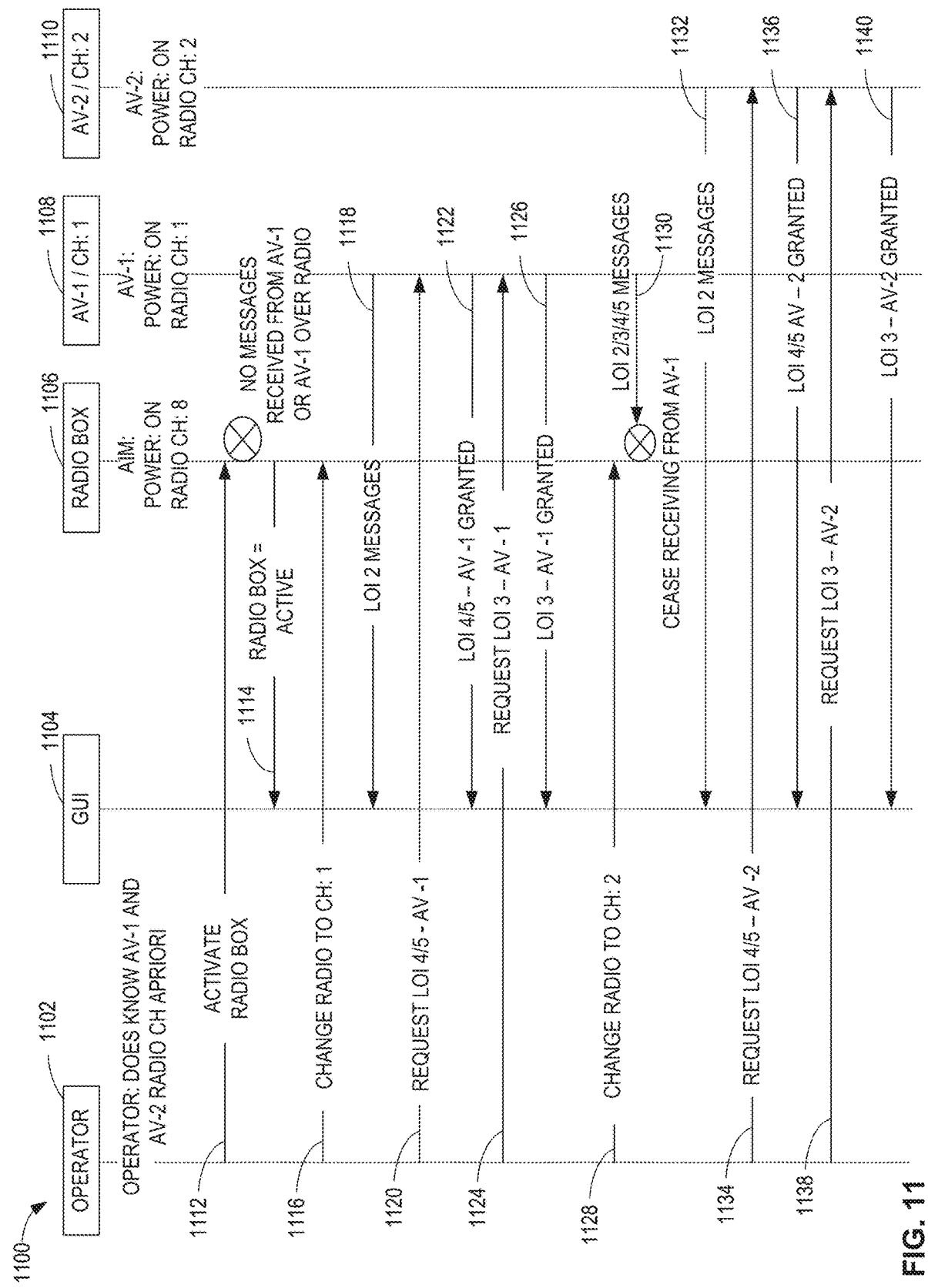
FIG. 11 is a second data flow diagram of example operations that may be executed by example processor circuitry to configure example radios associated with the example aircraft, the example control station, and/or the example operator workstation of FIGS. 1A and/or 1B.

FIG. 11 is a data flow diagram representative of example machine readable instructions and/or example operations 1100 that may be executed and/or instantiated by processor circuitry to configure example radios associated with the third aircraft 602 of FIG. 6 and the first control station 128 of FIG. 6. The data flow diagram of the illustrated example of FIG. 11 can be carried out and/or otherwise performed by an example operator 1102, an example GUI 1104, an example radio box 1106, a first example aircraft 1108, and a second example aircraft 1110.

In some examples, the operator 1102 can be an aircraft personnel, ground crew member, site lead, mission commander, etc., associated with the first control station 128 of FIG. 6. In some examples, the GUI 1104 can be implemented by the GUI controls 563 of FIG. 6, the first GUI control panel 566 of FIG. 6, the second GUI control panel 568 of FIG. 6, and/or, more generally, the workstation 906 of FIG. 9. For example, the GUI 1104 can be implemented by the first computing system 132 of FIG. 6. In some examples, the radio box 1106 can be implemented by the first radio box 122 of FIG. 6.

In some examples, the first aircraft 1108 can be implemented by a first instance of the third aircraft 602 of FIG. 6. In some examples, the second aircraft 1110 can be implemented by a second instance of the third aircraft 602 of FIG. 6. In this example, the first aircraft 1108 is identified by autonomous vehicle 1 (AV-1) and includes one or more radios that can communicate on a first radio channel (CH: 1). In this example, the second aircraft 1110 is identified by AV-2 and includes one or more radios that can communicate on a second radio channel (CH: 2).

In the data flow diagram of FIG. 11, prior to a first time 1112, the operator 1102 does know radio configuration information (e.g., a priori radio configuration settings or information) for a private radio of the first aircraft 1108 or a private radio of the second aircraft 1110. For example, the operator 1102 may have identified a respective radiofrequency at which the private radios of the first aircraft 1108 and the second aircraft 1110 are to utilize prior to takeoff of the first aircraft 1108 and the second aircraft 1110. At the first time 1112, the operator 1102 activates and/or otherwise powers on the radio box 1106. In this example, the radio box 1106 includes a radio configured to communicate on an eighth radio channel (CH: 8). In this example, the radio of the radio box 1106 is configured to operate as a private radio (e.g., a radio with security measures in place to restrict access to the radio).

At a second time 1114, the radio box 1106 provides a status to the GUI 1104 indicative of the radio box 1106 being active and/or otherwise powered on. Prior to a third time 1116, no messages are received from the first aircraft 1108 and the second aircraft 1110 because the radio box 1106 is not configured to communicate with the first aircraft 1108 or the second aircraft 1110. At the third time 1116, the operator 1102 instructs the radio box 1106 to change to a first radio channel (CH: 1) based on the a priori radio configuration information.

At a fourth time 1118, the GUI 1004 receives indications that messages are received from the first aircraft 1008 on the first radio channel. At a fifth time 1120, the operator 1102 initiates a security handshake with the first aircraft 1108 by requesting permission to communicate with the first aircraft 1108. For example, the request may include a cryptographic key that the first aircraft 1108 can use to authenticate the operator 1102. At sixth time 1122, the first aircraft 1108 grants the operator 1102 access to the first aircraft 1108, which may include access to data, measurements, etc., associated with the first aircraft 1108, capability to control the first aircraft 1108, etc. At a seventh time 1124, the operator 1102 initiates another request for access to the first aircraft 1108 and the first aircraft 1108 grants the access at an eighth time 1126.

At a ninth time 1128, the operator 1102 instructs the radio box 1106 to change the radio configuration information of the public radio of the radio box 1106 from the first radio channel to the second radio channel based on the a priori radio configuration information. In response to the change, at a tenth time 1130, the radio box 1106 no longer receives communications from the first aircraft 1108 in preparation of a switchover to the second aircraft 1110. At an eleventh time 1132, the GUI 1104 receives indications that messages are received from the second aircraft 1110 on the second radio channel.

At a twelfth time 1134, the operator 1102 initiates a security handshake with the second aircraft 1110 by requesting permission to communicate with the second aircraft 1110. For example, the request may include a cryptographic key that the second aircraft 1110 can use to authenticate the operator 1102. At a thirteenth time 1136, the second aircraft 1110 grants the operator 1102 access to data and/or control of the second aircraft 1110. At a fourteenth time 1138, the operator 1102 initiates another request for access to the second aircraft 1110 and the second aircraft 1110 grants the access at a fifteenth time 1140 after the fourteenth time 1138. In some examples, the operator 1102 of the illustrated example of FIG. 11 may be unable to communicate with restricted radios of the first aircraft 1108 and the second aircraft 1110 without a priori knowledge of the radio configuration information of the restricted radios. Advantageously, the operator 1002 of the illustrated example of FIGS. 10A-10B overcomes this limitation and is able to communicate with restricted radios of the first aircraft 1008 and the second aircraft 1010 without a priori knowledge of the radio configuration information of the restricted radios. For example, the operator 1002 of the illustrated example of FIGS. 10A-10B can utilize data included in IoT broadcast beacons to identify the radio configuration information of the restricted radios.

Figure 12A:
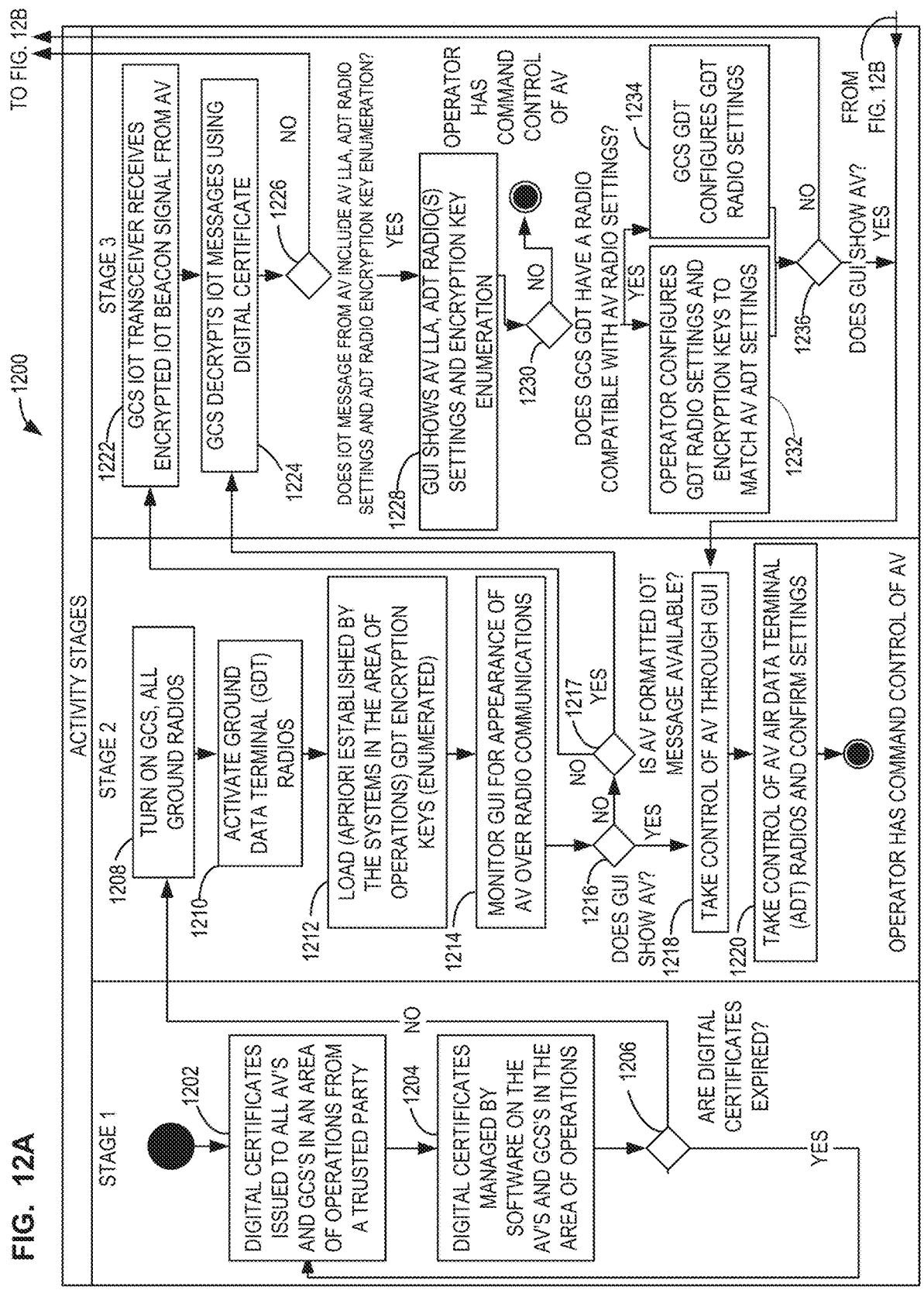
FIGS. 12A-12B depict a flowchart representative of example machine readable instructions and/or example operations that may be executed by example processor circuitry to implement the example radio configuration circuitry of FIG. 4 to configure example radios associated with the example aircraft, the example control station, and/or the example operator workstation of FIGS. 1A and/or 1B.
Figure 12B:
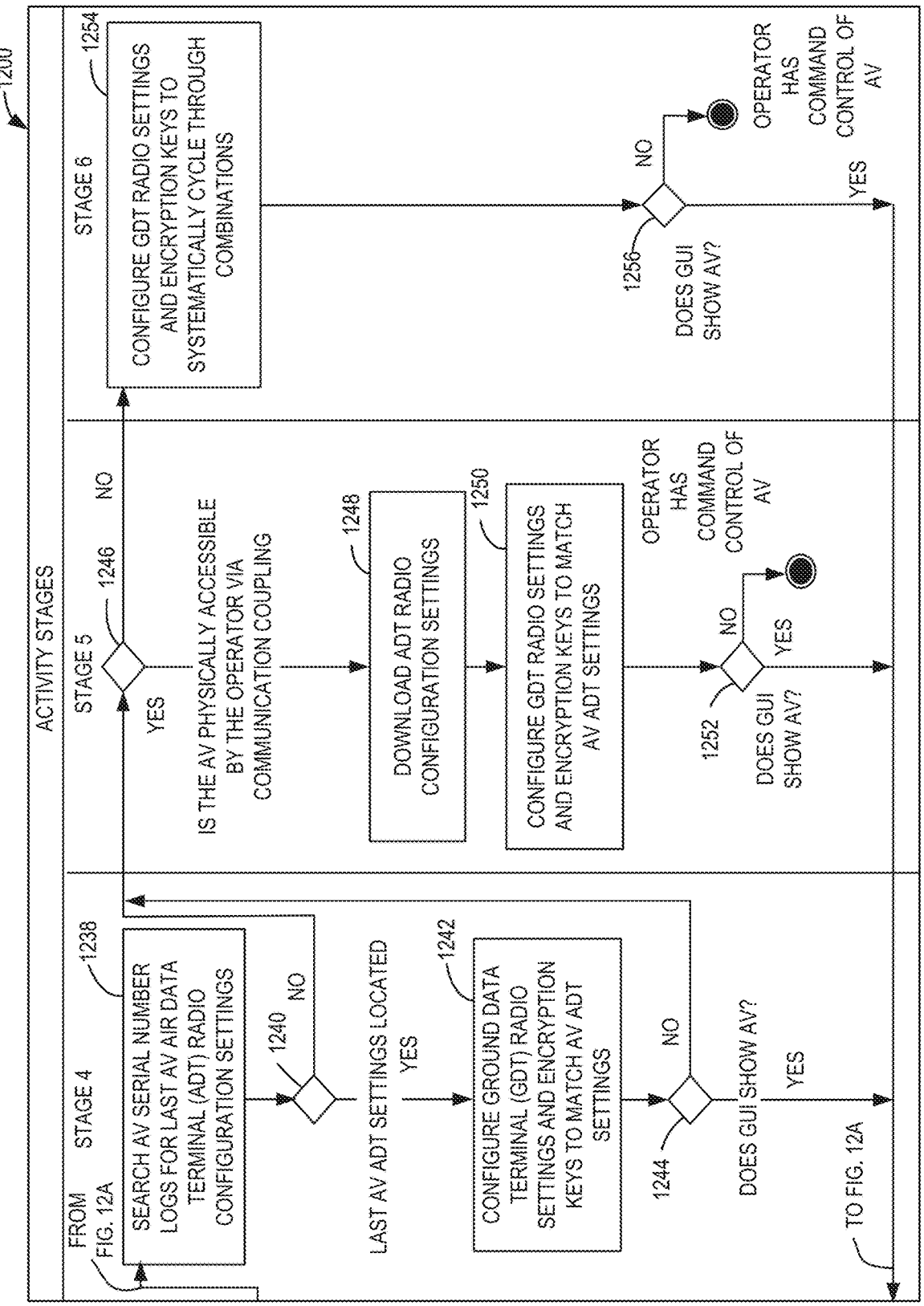

FIGS. 12A-12B depict a flowchart representative of example machine readable instructions and/or example operations 1200 that may be executed and/or instantiated by processor circuitry to configure example radios associated with the first aircraft 102, the second aircraft 110, the first control station 128, the second control station 134, the satellite 204, the VSAT 210, the satellite dish farm 302, and/or the BLOS control station 304 of FIGS. 1A, 1B, 2, and/or 3. The machine readable instructions and/or the operations 1200 of FIGS. 12A-12B begin at block 1202, at which the radio configuration circuitry 400 of FIG. 4 issues digital certificates to all autonomous vehicles (AVs) (e.g., autonomous UAVs, drones, etc.) and ground control stations (GCS) in an area of operation from a trusted party. For example, the security handler circuitry 420 (FIG. 4) can issue digital certificates to the first aircraft 102, the second aircraft 110, the first control station 128, the second control station 134, the satellite 204, the VSAT 210, the satellite dish farm 302, and/or the BLOS control station 304.

At block 1204, the radio configuration circuitry 400 manages the digital certificates by software on the AVs and GCSs in an area of operations. For example, the security handler circuitry 420 can manage the digital certificates of the first aircraft 102, the second aircraft 110, the first control station 128, the second control station 134, the satellite 204, the VSAT 210, the satellite dish farm 302, and/or the BLOS control station 304.

At block 1206, the radio configuration circuitry 400 determines whether the digital certificates are expired. For example, the security handler circuitry 420 can determine whether one(s) of the digital certificates of the first aircraft 102, the second aircraft 110, the first control station 128, the second control station 134, the satellite 204, the VSAT 210, the satellite dish farm 302, and/or the BLOS control station 304 are expired. If, at block 1206, the radio configuration circuitry 400 determines that one(s) of the digital certificates are expired, control returns to block 1202 to issue new one(s) of the digital certificates, otherwise control proceeds to block 1208.

At block 1208, the radio configuration circuitry 400 turns on GCS and all ground radios. For example, the interface circuitry 410 (FIG. 4) can turn on the first control station 128, the second control station 134, the BLOS control station 304 and/or radios of the first radio box 122, the second radio box 124, the third radio box 126, and the fourth radio box 140 of FIGS. 1A-1B.

At block 1210, the radio configuration circuitry 400 activates ground data terminal (GDT) radios. For example, the interface circuitry 410 can turn on the sixth radio 116, the seventh radio 118, and the eighth radio 120 of FIGS. 1A-1B.

At block 1212, the radio configuration circuitry 400 loads GDT encryption keys. The GDT encryption keys can be a priori established by the systems in the area of operations. The GDT encryption keys can be enumerated. For example, the security handler circuitry 420 can load encryption keys for GDTs, such as the sixth radio 116, the seventh radio 118, and the eighth radio 120 of FIGS. 1A-1B.

At block 1214, the radio configuration circuitry 400 monitors a graphical user interface (GUI) for appearance of an AV over radio communications. For example, the aircraft identification circuitry 440 (FIG. 4) can identify whether the first aircraft 102 and/or the second aircraft 110 are identified based on radio communications received from the first aircraft 102 and/or the second aircraft 110. In some such examples, the aircraft identification circuitry 440 can load the identifications of the first aircraft 102 and/or the second aircraft on a GUI, such as the first radio control GUI 570 of FIG. 5C.

At block 1216, the radio configuration circuitry 400 determines whether the GUI shows an AV. For example, the aircraft identification circuitry 440 can determine whether the first GUI control panel 566 of FIG. 5C is launched in response to an identification of the first aircraft 102.

If, at block 1216, the radio configuration circuitry 400 determines that the GUI does shows an AV, then, at block 1218, the radio configuration circuitry 400 takes control of the AV through the GUI. For example, the aircraft control circuitry 450 (FIG. 4) can control the first aircraft 102 by invoking controls of the first radio control GUI 570. In response to taking control of the AV through the GUI at block 1218, the radio configuration circuitry 400 takes control of AV air data terminal (ADT) radios and confirms settings at block 1220. For example, the aircraft control circuitry 450 can control the first radio 104 and/or the second radio 106 by invoking controls of a respective one of the first radio control GUI 570 and/or the second radio control GUI 572 of FIG. 5C. In response to taking control of the AV ADT radios and confirming the settings at block 1220, the machine readable instructions and/or the operations 1200 of FIGS. 12A-12B conclude.

If, at block 1216, the radio configuration circuitry 400 determines that the GUI does not show an AV, control proceeds to block 1217 at which the radio configuration circuitry 400 determines whether an AV formatted IoT message is available (e.g., available on a network, a ground control station network, etc.). For example, the configurator circuitry 430 can query the datastore 460, a server, the first computing system 132, the second computing system 138, or any other ground control station related hardware, software, and/or firmware for the presence of an AV formatted IoT message (e.g., an IoT message, data packet, etc., that is formatted in connection with a beacon transmitted by an AV), such as a broadcast beacon from the first aircraft 102, the second aircraft 110, etc. In some such examples, the configurator circuitry 430 can determine that the eleventh radio 125 received a broadcast beacon from the second aircraft 110 via the extended ground IoT network 150 of FIG. 1B.

If, at block 1217, the radio configuration circuitry 400 determines that an AV formatted IoT message is available, control proceeds to block 1224. If, at block 1217, the radio configuration circuitry 400 determines that an AV formatted IoT message is not available, control proceeds to block 1222, at which the radio configuration circuitry 400 receives an encrypted IoT beacon signal from an AV using a GCS IoT transceiver. For example, the interface circuitry 410 can receive an IoT broadcast beacon transmitted by the third radio 108 of the first aircraft 102.

At block 1224, the radio configuration circuitry 400 decrypts one or more IoT messages from the AV using a digital certificate. For example, the security handler circuitry 420 can map an identifier (e.g., an aircraft tail number, an aircraft serial number, etc.) in the IoT broadcast beacon to one(s) of the cryptographic keys 466 (FIG. 4). In some such examples, the security handler circuitry 420 can decrypt one or more IoT messages from the IoT broadcast beacon by utilizing the one(s) of the cryptographic keys 466. In some examples, the security handler circuitry 420 can decrypt one or more IoT messages from the IoT broadcast beacon, which can be received via the extended ground IoT network 150, by utilizing the one(s) of the cryptographic keys 466

At block 1226, the radio configuration circuitry 400 determines whether an IoT message from an AV includes AV LLA, ADT radio settings and ADT radio encryption key enumeration. For example, the configurator circuitry 430 (FIG. 4) can determine whether a decrypted IoT message includes at least one of LLA data, ADT radio settings, or ADT radio encryption key enumeration.

If, at block 1226, the radio configuration circuitry 400 determines that the IoT message from the AV includes AV LLA, ADT radio settings, and ADT radio encryption key enumeration, then, at block 1228, the radio configuration circuitry 400 loads AV LLA, ADT radio(s) settings, and encryption key enumeration on a GUI. For example, the configurator circuitry 430 can load AV LLA data, ADT radio settings, encryption key enumeration, etc., on the first radio control GUI 570, and/or, more generally, the first GUI control panel 566, in response to a determination that the IoT message includes AV LLA, ADT radio settings, encryption key enumeration, etc., corresponding to the first aircraft 102.

At block 1230, the radio configuration circuitry 400 determines whether the GCS GDT has a radio compatible with the AV radio settings. For example, the radio configuration circuitry 400 can inspect the radio configuration information 464 (FIG. 4) to determine whether at least one of theسسxth radio 116, the seventh radio 118, or the eighth radio 120 is compatible and/or otherwise is capable of being configured to communicate based on the identified AV ADT radio settings, encryption key enumeration, etc.

If, at block 1230, the radio configuration circuitry 400 determines that the GCS GDT does not have a radio compatible with the AV radio settings, then an operator will not have communications with the AV and the machine readable instructions and/or the operations 1200 conclude. If, at block 1230, the radio configuration circuitry 400 determines that the GCS GDT has a radio compatible with the AV radio settings, control can proceed to block 1232 or block 1234 based on operator intervention. If the operator intervenes, then, at block 1232, the radio configuration circuitry 400 receives instructions from the operator to configure GDT radio settings and encryption keys to match the AV ADT settings. For example, the configurator circuitry 430 can configure the sixth radio 116, the seventh radio 118, or the eighth radio 120 using the identified AV ADT settings, encryption keys, etc. In some such examples, the configurator circuitry 430 can cause a radio to be pointed towards the reported AV LLA. If the operator does not intervene, then, at block 1234, the GCS GDT can be programmed to automatically configure GDT radio settings. For example, the first radio box 122 can configure the sixth radio 116 based on the identified AV ADT settings, encryption keys, etc. In some such examples, the first radio box 122 can control one or more actuators to cause an associated radio to be pointed towards the reported AV LLA.

At block 1236, the radio configuration circuitry 400 determines whether the GUI shows the AV. For example, the aircraft identification circuitry 440 can determine whether communication is established with the first aircraft 102 and/or the second aircraft 110 based on the configuring of the sixth radio 116, the seventh radio 118, etc., based on the identified radio configuration information. In some such examples, if communication is established, the first GUI control panel 566 can populate with data, statuses, etc., associated with the first aircraft 102 in response to establishing communication with the first aircraft 102. If, at block 1236, the GUI shows the AV, control proceeds to block 1218, otherwise control proceeds to block 1238.

If, at block 1226, the radio configuration circuitry 400 determines that the IoT message from the AV does not include AV ADT radio settings and ADT radio encryption key enumeration, then, at block 1238, the radio configuration circuitry 400 searches AV serial number logs for last AV ADT radio configuration settings. For example, the configurator circuitry 430 can inspect the aircraft serial number logs 462 (FIG. 4) to identify whether there are previously known radio configuration settings for the first radio 104 stored in the aircraft serial number logs 462.

At block 1240, the radio configuration circuitry 400 determines whether the last AV ADT settings are located. For example, the configurator circuitry 430 can determine whether the last known radio configurations settings for the first radio 104 are located in the aircraft serial number logs 462. If, at block 1240, the radio configuration circuitry 400 determines that the last AV ADT settings are located, control proceeds to block 1242 to configure GDT radio settings and encryption keys to match the AV ADT settings. For example, the configurator circuitry 430 can configure the sixth radio 116 based on the radio configuration settings located in the aircraft serial number logs 462 that correspond to the first radio 104 of the first aircraft 102.

At block 1244, the radio configuration circuitry 400 determines whether the GUI shows the AV. For example, the aircraft identification circuitry 440 can determine whether communication is established with the first aircraft 102 and/or the second aircraft 110 based on the configuring of the sixth radio 116, the seventh radio 118, etc., based on the identified radio configuration information from the aircraft serial number logs 462. In some such examples, if communication is established, the first GUI control panel 566 can populate with data, statuses, etc., associated with the first aircraft 102 in response to establishing communication with the first aircraft 102. If, at block 1236, the GUI shows the AV, control proceeds to block 1218, otherwise control proceeds to block 1246.

If, at block 1240, the radio configuration circuitry 400 determines that the last AV ADT settings are not located, control proceeds to block 1246 to determine whether the AV is physically accessible by the operator via a communication coupling. For example, the interface circuitry 410 can determine whether the first aircraft 102 is coupled to the interface circuitry 410 on a ground surface (e.g., coupled via a connector, cable, etc.).

If, at 1246, the radio configuration circuitry 400 determines that the AV is physically accessible by the operator via a communication coupling, then, at block 1248, the radio configuration circuitry 400 downloads ADT radio configuration settings. For example, the interface circuitry 410 can download and/or otherwise obtain radio configuration information from the first aircraft 102 by way of the communication coupling.

At block 1250, the radio configuration circuitry 400 configures GDT radio settings and encryption keys to match AV ADT settings. For example, the configurator circuitry 430 can configure the sixth radio 116 based on the radio configuration settings downloaded from the first aircraft 102.

At block 1252, the radio configuration circuitry 400 determines whether the GUI shows the AV. For example, the aircraft identification circuitry 440 can determine whether communication is established with the first aircraft 102 based on the configuring of the sixth radio 116, the seventh radio 118, etc., based on the identified radio configuration information downloaded from the first aircraft 102. In some such examples, if communication is established, the first GUI control panel 566 can populate with data, statuses, etc., associated with the first aircraft 102 in response to establishing communication with the first aircraft 102. If, at block 1252, the GUI shows the AV, control proceeds to block 1218, otherwise the machine readable instructions and/or the operations 1200 conclude and the operator will not have communication with the first aircraft 102.

If, at 1246, the radio configuration circuitry 400 determines that the AV is not physically accessible by the operator via a communication coupling, control proceeds to block 1254 to configure GDT radio settings and encryption keys to systematically cycle through combinations. For example, the configurator circuitry 430 can generate (e.g., iteratively generate) combinations of radio settings and encryption keys to establish communication with the first aircraft 102.

At block 1256, the radio configuration circuitry 400 determines whether the GUI shows the AV. For example, the aircraft identification circuitry 440 can determine whether communication is established with the first aircraft 102 based on the configuring of the sixth radio 116, the seventh radio 118, etc., based on a successful combination of radio configuration information. In some such examples, if communication is established, the first GUI control panel 566 can populate with data, statuses, etc., associated with the first aircraft 102 in response to establishing communication with the first aircraft 102. If, at block 1256, the GUI shows the AV, control proceeds to block 1218, otherwise the machine readable instructions and/or the operations 1200 conclude and the operator will not have communication with the first aircraft 102.

Figure 13:
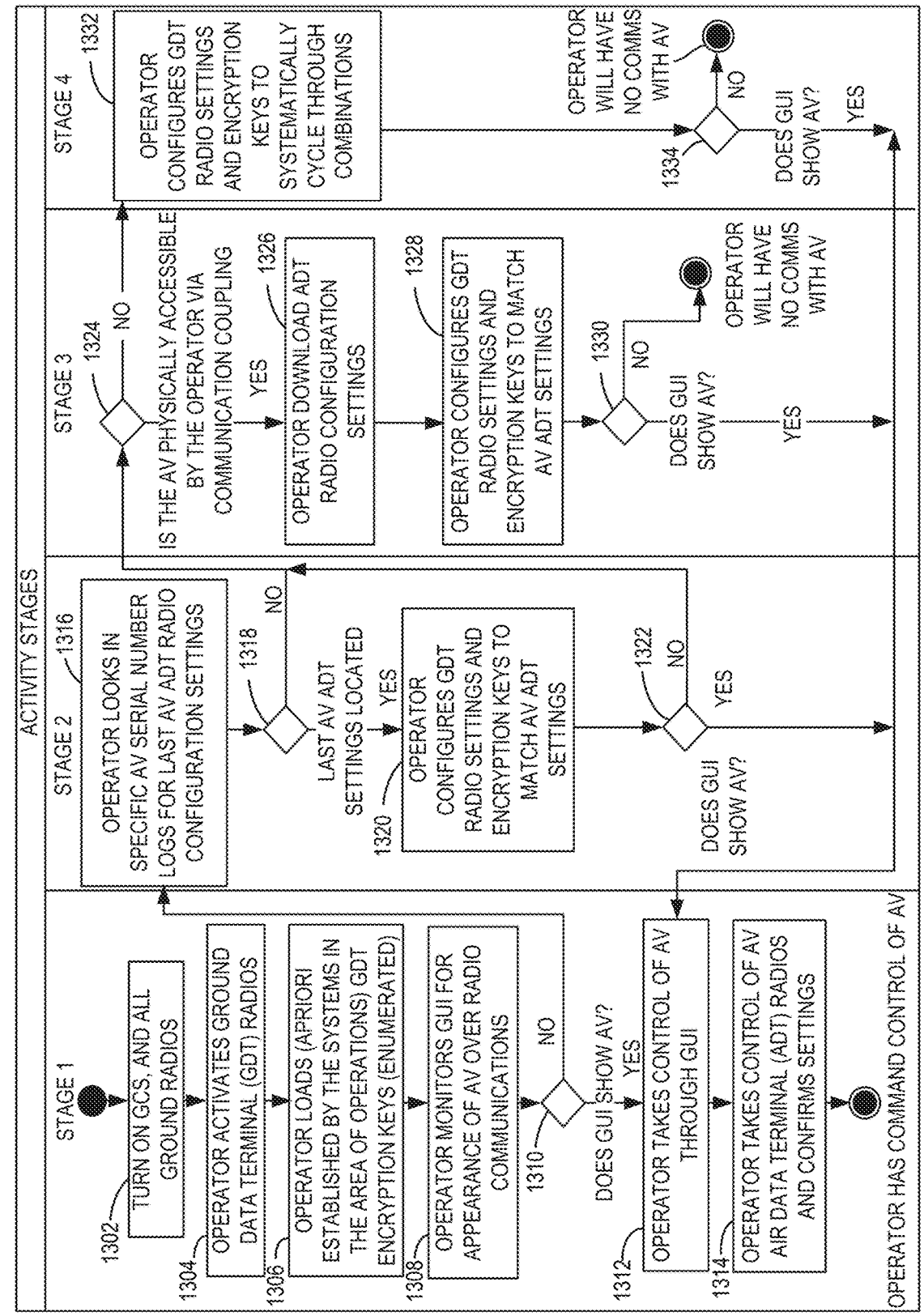
FIG. 13 is a flowchart representative of example machine readable instructions and/or example operations that may be executed by example processor circuitry to configure example radios associated with the example aircraft, the example control station, and/or the example operator workstation of FIGS. 1A and/or 1B.

FIG. 13 is a flowchart representative of example machine readable instructions and/or example operations 1300 that may be executed and/or instantiated by processor circuitry to configure example radios associated with the third aircraft 602 of FIG. 6, the fourth aircraft 702 of FIG. 7, the first control station 128 of FIGS. 6-8, the VSAT of FIG. 7, the satellite dish farm 302 of FIG. 8, and/or the BLOS control station 802 of FIG. 8 based on a priori knowledge of radio configuration information. The machine readable instructions and/or the operations 1300 of FIG. 13 begin at block 1302, at which processor circuitry turns on ground control station(s) (GCS(s)) and all ground radios. At block 1304, an operator activates ground data terminal (GDT) radios. At block 1306, the operator loads GDT encryption keys. At block 1308, the operator monitors a GUI for an appearance of an AV over radio communications. At block 1310, the operator determines whether the GUI shows an AV. If, at block 1310, the operator determines that the GUI shows the AV, control proceeds to block 1312, at which the operator takes control of the AV through GUI. At block 1314, the operator takes control of AV air data terminal (ADT) radios and confirms the settings of the AV ADT radios. In response to taking control at block 1314, the operator has command control of the AV.

If, at block 1310, the operator determines that the GUI does not show the AV, control proceeds to block 1316 at which the operator looks in specific AV serial number logs for last AV ADT radio configuration settings. At block 1318, the operator determines whether last AV ADT settings are located. If, at block 1318, last AV ADT settings are located, control proceeds to block 1320 at which the operator configures GDT radio settings and encryption keys to match AV ADT settings. At block 1322, the operator determines whether the GUI shows the AV. If, at block 1322, the operator determines that the GUI shows the AV, control proceeds to block 1312, otherwise control proceeds to block 1324.

If, at block 1318, last AV ADT settings are not located, control proceeds to block 1324 to determine whether the AV is physically accessible by the operator via a communication coupling. If, at block 1324, the AV is physically accessible by the operator via a communication coupling, control proceeds to block 1326, at which the operator downloads the ADT radio configuration settings. At block 1328, the operator configures GDT radio settings and encryption keys to match AV ADT settings. At block 1330, the operator determines whether the GUI shows the AV. If, at block 1330, the operator determines that the GUI shows the AV, control proceeds to block 1312, otherwise the machine readable instructions and/or the operations 1300 conclude and the operator will not have communication with the AV.

If, at block 1324, if the operator determines that the AV is not physically accessible by the operator via the communication coupling, then, at block 1332, the operator configures GDT radio settings and encryption keys to systematically cycle through combinations. At block 1334, the operator determines whether the GUI shows the AV. If, at block 1334, the operator determines that the GUI shows the AV, control proceeds to block 1312, otherwise the machine readable instructions and/or the operations 1300 conclude and the operator will not have communication with the AV.

Figure 14:
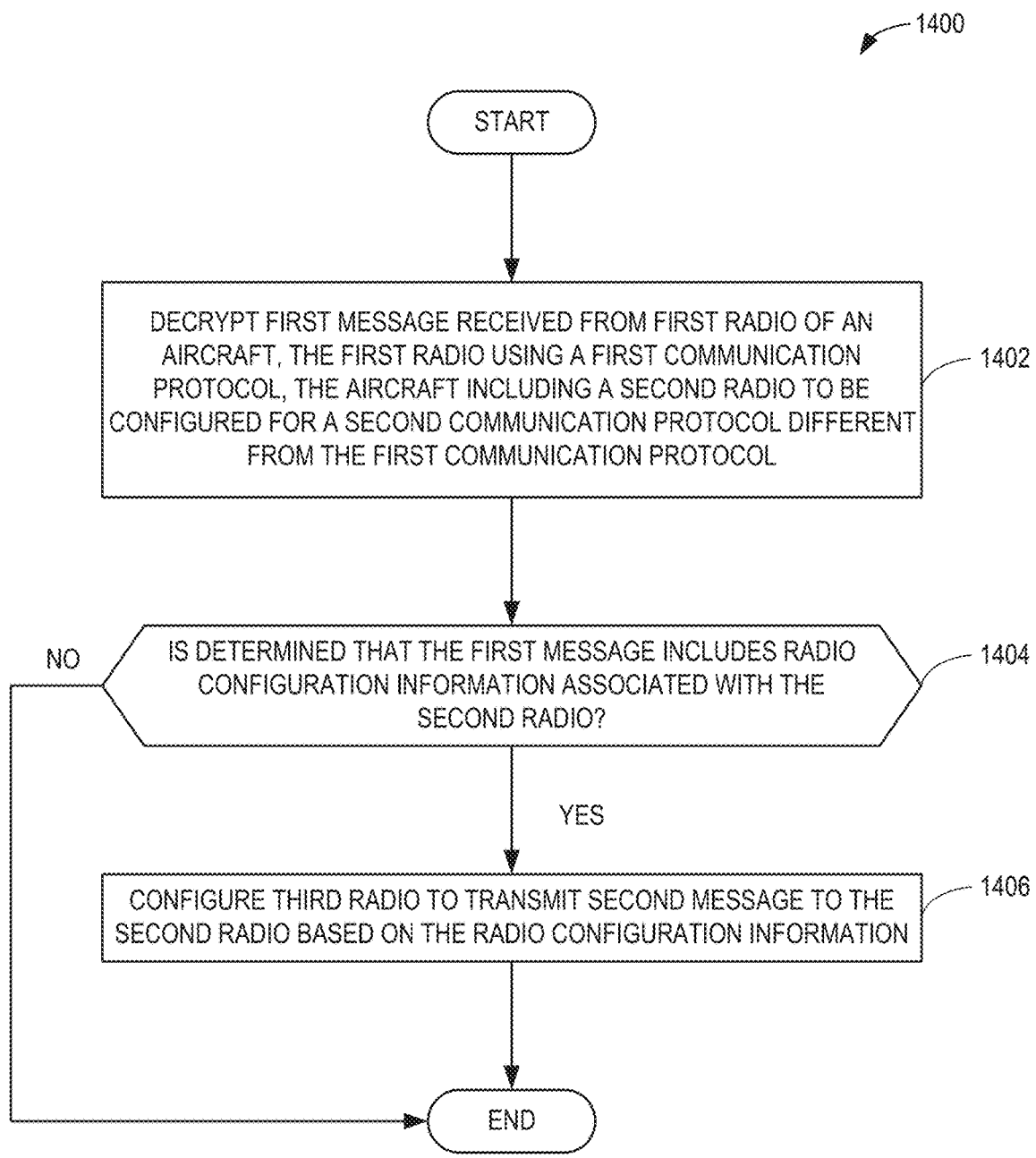
FIG. 14 is a flowchart representative of example machine readable instructions and/or example operations that may be executed by example processor circuitry to implement the example radio configuration circuitry of FIG. 4 to control the example aircraft of FIGS. 1A and/or 1B based on radio configuration settings obtained using a secondary communication protocol.

FIG. 14 is a flowchart representative of example machine readable instructions and/or example operations 1400 that may be executed and/or instantiated by processor circuitry to control an aircraft based on radio configuration settings obtained using a secondary communication protocol. The machine readable instructions and/or the operations 1400 of FIG. 14 begin at block 1402, at which the radio configuration circuitry 400 of FIG. 4 decrypts a first message received from a first radio of an aircraft, the first radio using a first communication protocol, the aircraft including a second radio to be configured for a second communication protocol different from the first communication protocol. For example, the security handler circuitry 420 (FIG. 4) can decrypt a broadcast beacon received from the third radio 108 of the first aircraft 102. In some such examples, the third radio 108 can use and/or otherwise transmit messages based on an IoT communication protocol. In some such examples, the first aircraft 102 includes the first radio 104 and the second radio 106 that can use and/or otherwise transmit/receive messages based on a private communication protocol. In some examples, the IoT communication protocol can have a lower bandwidth than a communication protocol associated with the first radio 104 and/or the second radio 106 of the first aircraft 102.

At block 1404, the radio configuration circuitry 400 determines whether the first message includes radio configuration information associated with the second radio. For example, the configurator circuitry 430 (FIG. 4) can determine that the broadcast beacon includes radio configuration information associated with the first radio 104 and/or the second radio 106, such as radio configuration settings, encryption key settings, etc., and/or combination(s) thereof.

If, at block 1404, the radio configuration circuitry 400 determines that the first message does not include radio configuration information associated with the second radio, the machine readable instructions and/or the operations 1400 of FIG. 14 conclude. If, at block 1404, the radio configuration circuitry 400 determines that the first message includes radio configuration information associated with the second radio, then, at block 1406, the radio configuration circuitry 400 configures a third radio to transmit a second message to the second radio based on the radio configuration information. For example, the configurator circuitry 430 can configure the sixth radio 116 to transmit a radio message to the first radio 104 (or the second radio 106) based on the radio configuration information of the decrypted broadcast beacon. In some such examples, the radio message can implement a command, an instruction, etc., to control the first aircraft 102. In response to configuring the third radio at block 1406, the machine readable instructions and/or the operations 1400 of FIG. 14 conclude.

Figure 15:
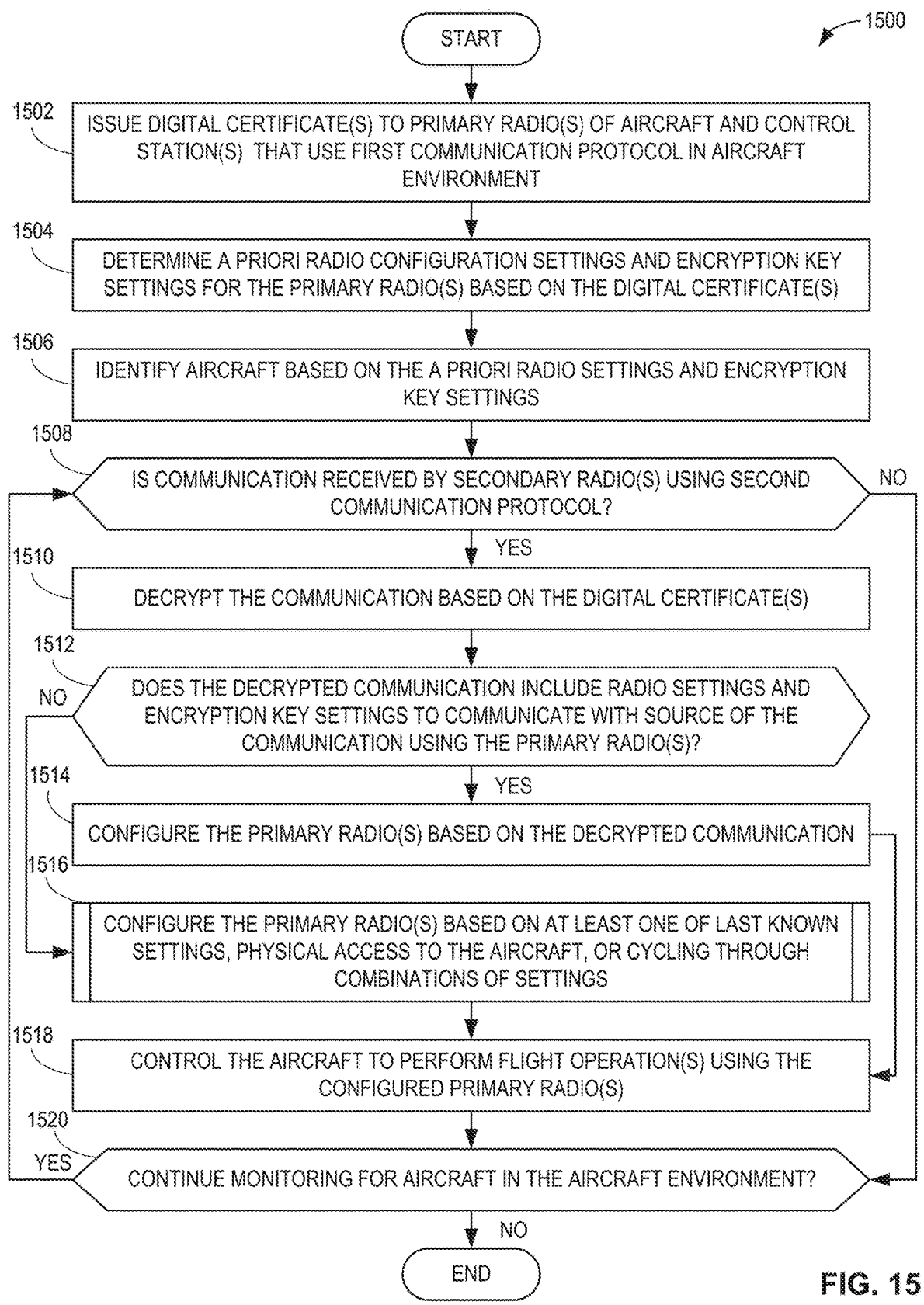
FIG. 15 is another flowchart representative of example machine readable instructions and/or example operations that may be executed by example processor circuitry to implement the example radio configuration circuitry of FIG. 4 to control the example aircraft of FIGS. 1A and/or 1B based on radio configuration settings obtained using a secondary communication protocol.

FIG. 15 is a flowchart representative of example machine readable instructions and/or example operations 1500 that may be executed and/or instantiated by processor circuitry to control an aircraft based on radio configuration settings obtained using a secondary communication protocol. The machine readable instructions and/or the operations 1500 of FIG. 15 begin at block 1502, at which the radio configuration circuitry 400 of FIG. 4 issues digital certificate(s) to primary radio(s) of aircraft and control station(s) that use a first communication protocol in an aircraft environment. For example, the security handler circuitry 420 (FIG. 4) can issue digital certificate(s) to respective one(s) of the first aircraft 102, the second aircraft 110, the first control station 128, the second control station 134, and/or the BLOS control station 304. In some such examples, the primary radios can correspond to private radios, such as the first radio 104, the second radio 106, the fourth radio 112, the sixth radio 116, the seventh radio 118, the eighth radio 120, the sixteenth radio 306, etc. In some such examples, the security handler circuitry 420 can store the digital certificate(s) in the datastore 460 (FIG. 4) as one(s) of the cryptographic keys 466 (FIG. 4).

At block 1504, the radio configuration circuitry 400 determines a priori radio configuration settings and encryption key settings for the primary radio(s) based on the digital certificate(s). For example, the configurator circuitry 430 (FIG. 4) can determine radio configuration settings and encryption key settings for one(s) of the private radios based on corresponding one(s) of the digital certificate(s).

At block 1506, the radio configuration circuitry 400 identifies aircraft based on the a priori radio settings and encryption key settings. For example, the aircraft identification circuitry 440 (FIG. 4) can identify the first aircraft 102 and/or the second aircraft 110 based on data (e.g., an aircraft tail number, an aircraft serial number, etc.) included in the radio configuration settings and encryption key settings.

At block 1508, the radio configuration circuitry 400 determines whether a communication is received by secondary radio(s) using a secondary communication protocol. For example, the interface circuitry 410 (FIG. 4) can determine that a beacon (e.g., a broadcast beacon, an IoT broadcast beacon, etc.) is received by a secondary radio using a secondary communication protocol. In some such examples, the secondary radio can correspond to a public radio, such as the ninth radio 121, the tenth radio 123, the eleventh radio 125, etc. In some such examples, the secondary communication protocol can correspond to a publicly available communication protocol, such as an IoT communication protocol as described herein.

If, at block 1508, the radio configuration circuitry 400 determines that a communication is not received by the secondary radio(s) using the second communication protocol, control proceeds to block 1520, otherwise radio configuration circuitry 400 decrypts the communication based on the digital certificate(s) at block 1510. For example, the security handler circuitry 420 can decrypt data of the beacon using a symmetric and/or asymmetric cryptographic key included in a digital certificate that corresponds to a source of the beacon, such as the first aircraft 102.

At block 1512, the radio configuration circuitry 400 determines whether the decrypted communication include radio settings and encryption key settings to communicate with a source of the communication using the primary radio(s). For example, the configurator circuitry 430 can determine that the decrypted data of the beacon includes radio settings (e.g., radio configuration settings) and encryption key settings that correspond to a primary radio of the first aircraft 102, such as the first radio 104 and/or the second radio 106. If, at block 1512, the radio configuration circuitry 400 determines that the decrypted communication includes radio settings and encryption key settings to communicate with a source of the communication using the primary radio(s), then, at block 1514, the radio configuration circuitry 400 configures the primary radio(s) based on the decrypted communication. For example, the configurator circuitry 430 can configure a public radio of a control station, such as the sixth radio 116 of the first control station 128, to communicate with the first radio 104 using the radio settings and the encryption key settings defined and/or otherwise indicated by the beacon. In response to configuring the primary radio(s) based on the decrypted communication at block 1514, the radio configuration circuitry 400 controls the aircraft to perform flight operation(s) using the configured primary radio(s) at block 1518.

If, at block 1512, the radio configuration circuitry 400 determines that the decrypted communication does not include radio settings and encryption key settings to communicate with a source of the communication using the primary radio(s), control proceeds to block 1516 to configure the primary radio(s) based on at least one of last known settings, physical access to the aircraft, or cycling through combinations of settings. An example process that may be executed to implement block 1516 is described below in connection with FIG. 16.

In response to configuring the primary radio(s) based on at least one of last known settings, physical access to the aircraft, or cycling through combinations of settings at block 1516, the radio configuration circuitry 400 controls the aircraft to perform flight operation(s) using the configured primary radio(s) at block 1518. For example, the aircraft control circuitry 450 (FIG. 4) can generate and transmit commands from the first control station 128 to the first aircraft 102 by way of radio communication from the sixth radio 116 (or the seventh radio 118) to the first radio 104 (or the second radio 106). In some such examples, the commands, when executed by the first aircraft 102, can cause the first aircraft 102 to takeoff from or land on a ground surface, adjust altitude, change airspeed, control a payload of the first aircraft 102, etc., and/or combination(s) thereof. In some examples, the commands, when executed by the first aircraft 102, can cause the first aircraft 102 to change a radio configuration of at least one of the first radio 104 or the second radio 106 of the first aircraft 102.

At block 1520, the radio configuration circuitry 400 determines whether to continue monitoring for aircraft in the aircraft environment. For example, the interface circuitry 410 can determine whether additional beacons from previously non-identified aircraft have been received. If, at block 1520, the radio configuration circuitry 400 determines to continue monitoring for aircraft in the aircraft environment, control returns to block 1508, otherwise the machine readable instructions and/or the operations 1500 of FIG. 15 conclude.

Figure 16:
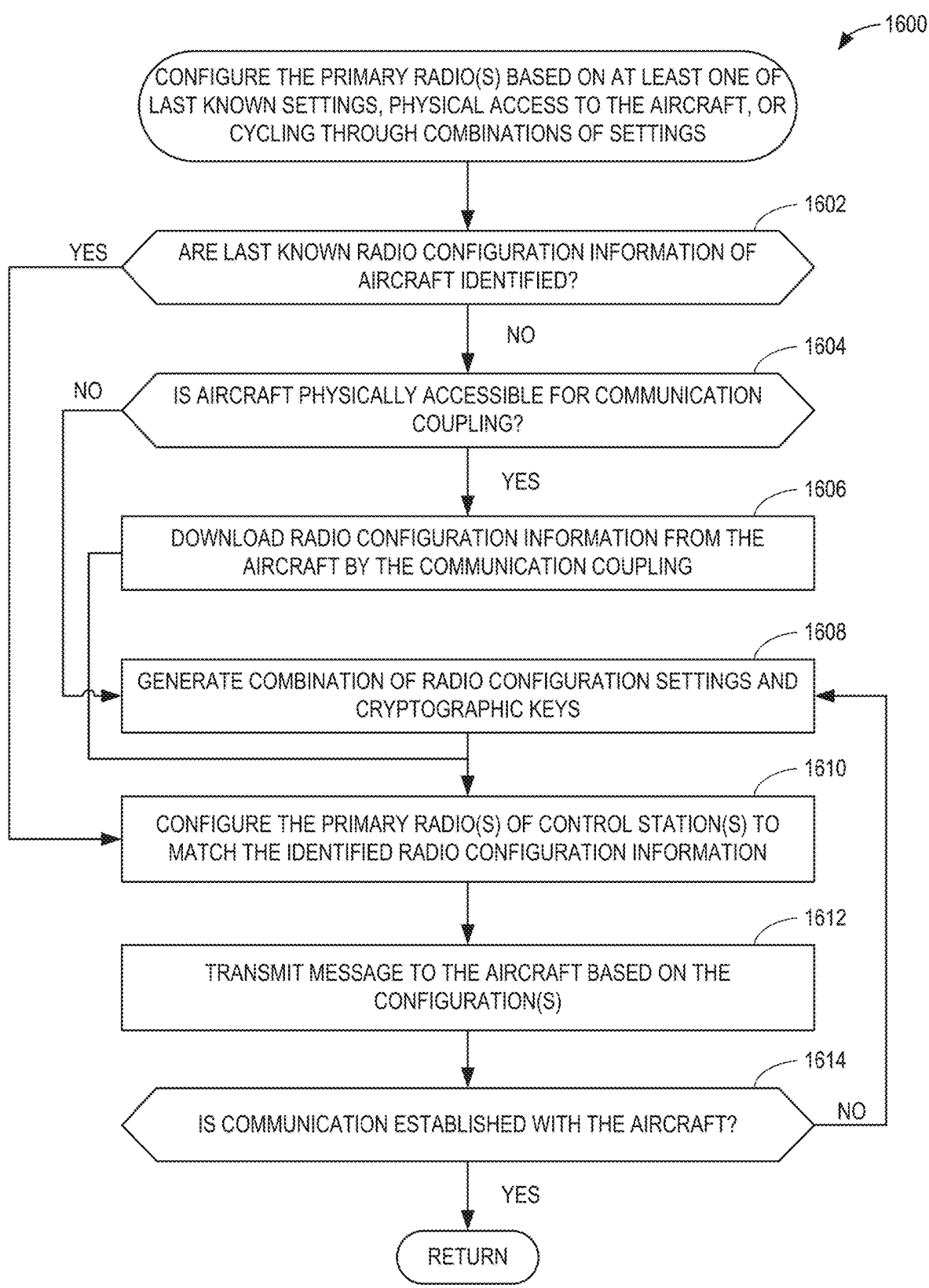
FIG. 16 is a flowchart representative of example machine readable instructions and/or example operations that may be executed by example processor circuitry to implement the example radio configuration circuitry of FIG. 4 to configure primary radio(s) based on at least one of last known settings, physical access to aircraft, or cycling through combinations of settings.

FIG. 16 is a flowchart representative of example machine readable instructions and/or example operations 1600 that may be executed and/or instantiated by processor circuitry to configure the primary radio(s) based on at least one of last known settings, physical access to the aircraft, or cycling through combinations of settings. The machine readable instructions and/or the operations 1600 of FIG. 16 begin at block 1602, at which the radio configuration circuitry 400 of FIG. 4 determines whether last known radio configuration information of aircraft are identified. For example, in absence of receiving a beacon with radio configuration information of interest for the first aircraft 102, the configurator circuitry 430 (FIG. 4) can determine whether the radio configuration information 464 (FIG. 4) include last known radio configuration information for the first aircraft 102.

If, at block 1602, the radio configuration circuitry 400 determines that last known radio configuration information of aircraft are identified, control proceeds to block 1610, otherwise the radio configuration circuitry 400 determines whether the aircraft is physically accessible for communication coupling at block 1604. For example, the interface circuitry 410 (FIG. 4) can determine that the interface circuitry 410 is communicatively and/or physically coupled to the first aircraft 102.

If, at block 1604, the radio configuration circuitry 400 determines that the aircraft is physically accessible for communication coupling, then, at block 1606, the radio configuration circuitry 400 downloads radio configuration information from the aircraft by the communication coupling. For example, the interface circuitry 410 can download radio configuration settings, encryption key settings, etc., from the first aircraft 102 by way of any interface standard or communication protocol. In response to downloading the radio configuration information from the aircraft by the communication coupling at block 1606, control proceeds to block 1610.

If, at block 1604, the radio configuration circuitry 400 determines that the aircraft is not physically accessible for communication coupling, control proceeds to block 1608 to generate a combination of radio configuration settings and cryptographic keys. For example, the configurator circuitry 430 can generate a first set of radio configuration settings and encryption key settings that may be utilized to communicate with the first radio 104 (or the second radio 106) of the first aircraft 102.

At block 1610, the radio configuration circuitry 400 configures the primary radio(s) of control station(s) to match the identified radio configuration information. For example, the configurator circuitry 430 can configure the sixth radio 116, the seventh radio 118, the eighth radio 120, etc., associated with the first control station 128 based on the identified radio configuration settings, encryption key settings, etc., to communicate with the first aircraft 102 by way of private radios for enhanced security.

At block 1612, the radio configuration circuitry 400 transmits a message to the aircraft based on the configuration(s). For example, the interface circuitry 410 can transmit a radio message from the sixth radio 116 to the first radio 104 in an attempt to establish communication between the first control station 128 and the first aircraft 102. In some such examples, the radio message can be generated and transmitted based on the combination of radio configuration settings and cryptographic keys generated at block 1608.

At block 1614, the radio configuration circuitry 400 determines whether communication is established with the aircraft. For example, the interface circuitry 410 can determine that communication is established with the first aircraft 102 in response to receiving a message (e.g., an acknowledgement message) from the first aircraft 102.

If, at block 1614, the radio configuration circuitry 400 determines that communication is not established with the aircraft, control returns to block 1608 to generate another combination of radio configuration settings and cryptographic keys. If, at block 1614, the radio configuration circuitry 400 determines that communication is established with the aircraft, the machine readable instructions and/or the operations 1600 conclude. For example, the machine readable instructions and/or the operations 1600 can return to block 1518 of the machine readable instructions and/or the operations 1500 of FIG. 15 to control the aircraft to perform flight operation(s) using the configured primary radio(s).

Figure 17:
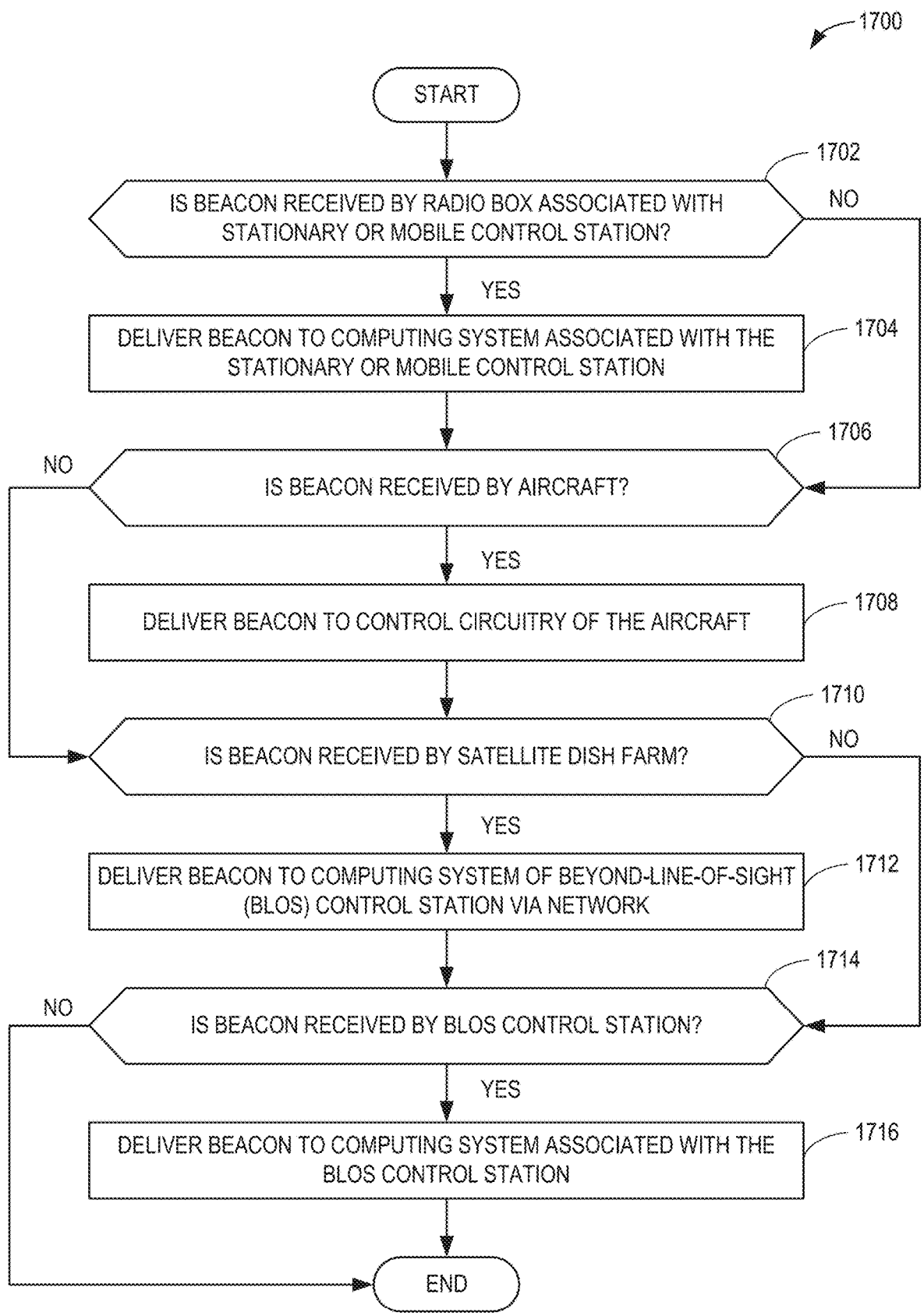
FIG. 17 is a flowchart representative of example machine readable instructions and/or example operations that may be executed by example processor circuitry to implement the example radio configuration circuitry of FIG. 4 to deliver beacons to processor circuitry.

FIG. 17 is a flowchart representative of example machine readable instructions and/or example operations 1700 that may be executed and/or instantiated by processor circuitry to deliver beacons to the processor circuitry or different processor circuitry. The machine readable instructions and/or the operations 1700 of FIG. 17 begin at block 1702, at which the radio configuration circuitry 400 of FIG. 4 determines whether a beacon is received by a radio box associated with a stationary or mobile control station. For example, the interface circuitry 410 (FIG. 4) can determine that the first radio box 122 and/or the third radio box 126 a beacon from the third radio 108 of the first aircraft 102. In some such examples, the interface circuitry 410 can be included in the first radio box 122, the third radio box 126, the first network switch 130, the first computing system 132, and/or, more generally, the first control station 128.

If, at block 1702, the radio configuration circuitry 400 determines that the beacon is not received by the radio box associated with the stationary or mobile control station, control proceeds to block 1706, otherwise the radio configuration circuitry 400 delivers the beacon to a computing system associated with the stationary or mobile control station at block 1704. For example, the interface circuitry 410 can cause the beacon to be delivered from the first radio box 122, the second radio box 124, and/or the third radio box 126 to the first computing system 132 via the first network switch 130.

At block 1706, the radio configuration circuitry 400 determines whether a beacon is received by an aircraft. For example, the interface circuitry 410 can determine that the second aircraft 110 received a beacon from the third radio 108. In some such examples, the interface circuitry 410 can be included in the second aircraft 110.

If, at block 1706, the radio configuration circuitry 400 determines that the beacon is not received by the aircraft, control proceeds to block 1710, otherwise the radio configuration circuitry 400 delivers the beacon to control circuitry of the aircraft at block 1708. For example, the interface circuitry 410, when implemented by the first transceiver 518 of FIG. 5A, can deliver the beacon to the payload computer 510 of FIG. 5A.

At block 1710, the radio configuration circuitry 400 determines whether a beacon is received by a satellite dish farm. For example, the interface circuitry 410 can determine that the seventeenth radio 308 received a beacon from the third radio 108. In some such examples, the interface circuitry 410 can be included in a ground data terminal of the satellite dish farm 302, which can be implemented by the seventeenth radio 308 or associated circuitry.

If, at block 1710, the radio configuration circuitry 400 determines that the beacon is not received by the satellite dish farm, control proceeds to block 1714, otherwise the radio configuration circuitry 400 delivers the beacon to a computing system of a beyond-line-of-sight (BLOS) control station via a network at block 1712. For example, the interface circuitry 410 can deliver the beacon to the third computing system 324 of FIG. 3 by way of the teleport kit system 312 of FIG. 3.

At block 1714, the radio configuration circuitry 400 determines whether a beacon is received by a BLOS control station. For example, the interface circuitry 410 can determine that the sixth radio box 328 received a beacon from the third radio 108 by way of the satellite 204. In some such examples, the interface circuitry 410 can be included in the sixth radio box 328.

If, at block 1714, the radio configuration circuitry 400 determines that the beacon is not received by the BLOS control station, the machine readable instructions and/or the operations 1700 of FIG. 17 conclude. If, at block 1714, the radio configuration circuitry 400 determines that the beacon is received by the BLOS control station, then, at block 1716, the radio configuration circuitry 400 delivers the beacon to a computing system associated with the BLOS control station. For example, the interface circuitry 410 can deliver the beacon to the third computing system 324 of FIG. 3 by way of the sixth radio box 328 and the third network switch 322 of FIG. 3. In response to delivering the beacon to the computing system associated with the BLOS control station at block 1716, the machine readable instructions and/or the operations 1700 of FIG. 17 conclude.

Figure 18:
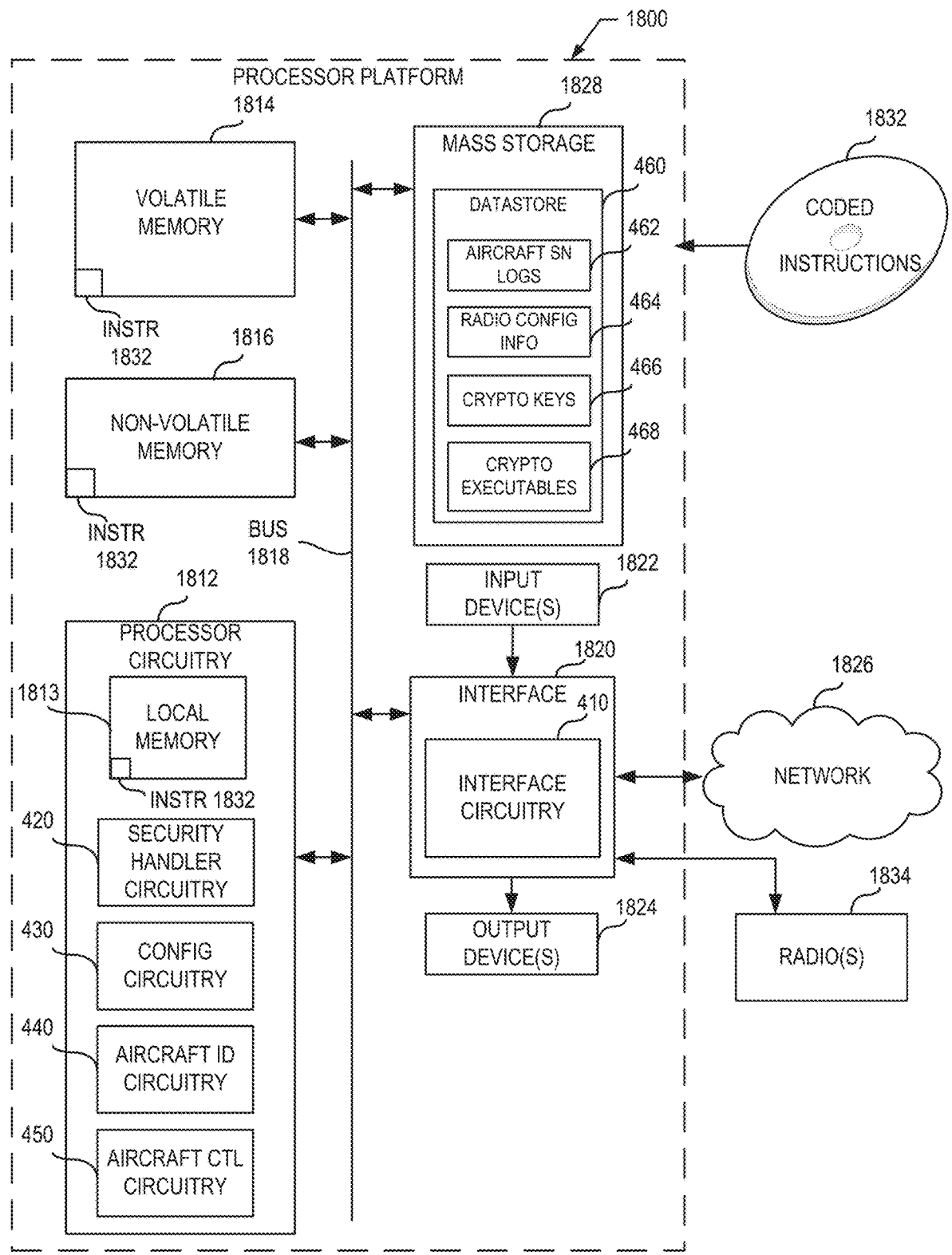
FIG. 18 is a block diagram of an example processing platform including processor circuitry structured to execute the example machine readable instructions and/or the example operations of FIGS. 10A-10B, 12A-12B, 14, 15, 16, and/or 17 to implement the example radio configuration circuitry of FIG. 4 that may be included in the example aircraft of FIGS. 1A and/or 1B.

FIG. 18 is a block diagram of an example processor platform 1800 structured to execute and/or instantiate the machine readable instructions and/or the operations of FIGS. 10A-10B, 12A-12B, 14, 15, 16, and/or 17 to implement the radio configuration circuitry 400 of FIG. 4. In some examples, the processor platform 1800 can implement the first aircraft 102 of FIGS. 1-3 and/or the second aircraft 110 of FIGS. 1A-1B. The processor platform 1800 can be, for example, a server, a personal computer, a workstation, a self-learning machine (e.g., a neural network), a mobile device (e.g., a cell phone, a smart phone, a tablet such as an iPad™), a headset (e.g., an augmented reality (AR) headset, a virtual reality (VR) headset, etc.) or other wearable device, or any other type of computing device. In some examples, the processor platform 1800 can implement one or more VMs, one or more containers, etc., etc. For example, the processor platform 1800 can instantiate a hypervisor to virtualize hardware of the processor platform 1800. In some such examples, the processor platform 1800 can instantiate one or more VMs on top of the hypervisor to implement a hardware abstraction layer to execute the machine readable instructions and/or the operations as described herein.

The processor platform 1800 of the illustrated example includes processor circuitry 1812. The processor circuitry 1812 of the illustrated example is hardware. For example, the processor circuitry 1812 can be implemented by one or more integrated circuits, logic circuits, FPGAs microprocessors, CPUs, GPUs, DSPs, and/or microcontrollers from any desired family or manufacturer. The processor circuitry 1812 may be implemented by one or more semiconductor based (e.g., silicon based) devices. In this example, the processor circuitry 1812 implements the security handler circuitry 420, the configurator circuitry 430 (identified by CONFIG CIRCUITRY), the aircraft identification circuitry 440 (identified by AIRCRAFT ID CIRCUITRY), and the aircraft control circuitry 450 (identified by AIRCRAFT CTL CIRCUITRY) of FIG. 4.

The processor circuitry 1812 of the illustrated example includes a local memory 1813 (e.g., a cache, registers, etc.). The processor circuitry 1812 of the illustrated example is in communication with a main memory including a volatile memory 1814 and a non-volatile memory 1816 by a bus 1818. In this example, the bus 1818 implements the bus 470 of FIG. 4. The volatile memory 1814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1816 may be implemented by flash memory and/or any other desired type of memory device. Access to the main memory 1814, 1816 of the illustrated example is controlled by a memory controller 1817.

The processor platform 1800 of the illustrated example also includes interface circuitry 1820. In this example, the interface circuitry 1820 implements the interface circuitry 410 of FIG. 4. In this example, example radio(s) 1834 are coupled to the interface circuitry 1820. In some examples, the radio(s) 1834 implement(s) the first radio 104 of FIGS. 1-3, the second radio 106 of FIGS. 1-3, the third radio 108 of FIGS. 1-3, and/or the twelfth radio 202 of FIGS. 2-3.

The interface circuitry 1820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1822 are connected to the interface circuitry 1820. The input device(s) 1822 permit(s) a user to enter data and/or commands into the processor circuitry 1812. The input device(s) 1822 can be implemented by, for example, an audio sensor, a microphone, a camera (still or video), a keyboard, a button, a mouse, a touchscreen, a track-pad, a trackball, an isopoint device, a joystick, and/or a voice recognition system.

One or more output devices 1824 are also connected to the interface circuitry 1820 of the illustrated example. The output device(s) 1824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a heads-up display (HUD), and/or speaker. The interface circuitry 1820 of the illustrated example, thus, typically includes a graphics driver card, a graphics driver chip, and/or graphics processor circuitry such as a GPU.

The interface circuitry 1820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1826. The communication can be by, for example, an Ethernet connection, a digital subscriber line (DSL) connection, a telephone line connection, a coaxial cable system, a satellite system, a line-of-sight wireless system, a beyond-line-of-sight wireless system, a cellular telephone system, an optical connection, etc.

The processor platform 1800 of the illustrated example also includes one or more mass storage devices 1828 to store software and/or data. Examples of such mass storage devices 1828 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the one or more mass storage devices 1828 implement the datastore 460, the aircraft serial number logs 462 (identified by AIRCRAFT SN LOGS), the radio configuration information 464 (identified by RADIO CONFIG INFO), the cryptographic keys 466 (identified by CRYPTO KEYS), and the cryptographic executables 468 (identified by CRYPTO EXECUTABLES) of FIG. 4.

The machine executable instructions 1832, which may be implemented by the machine readable instructions of FIGS. 10A-10B, 12A-12B, 14, 15, 16, and/or 17, may be stored in the mass storage device 1828, in the volatile memory 1814, in the non-volatile memory 1816, in the network 1826, in the radio(s) 1834, and/or on a removable non-transitory computer readable storage medium such as a CD or DVD.

Figure 19:
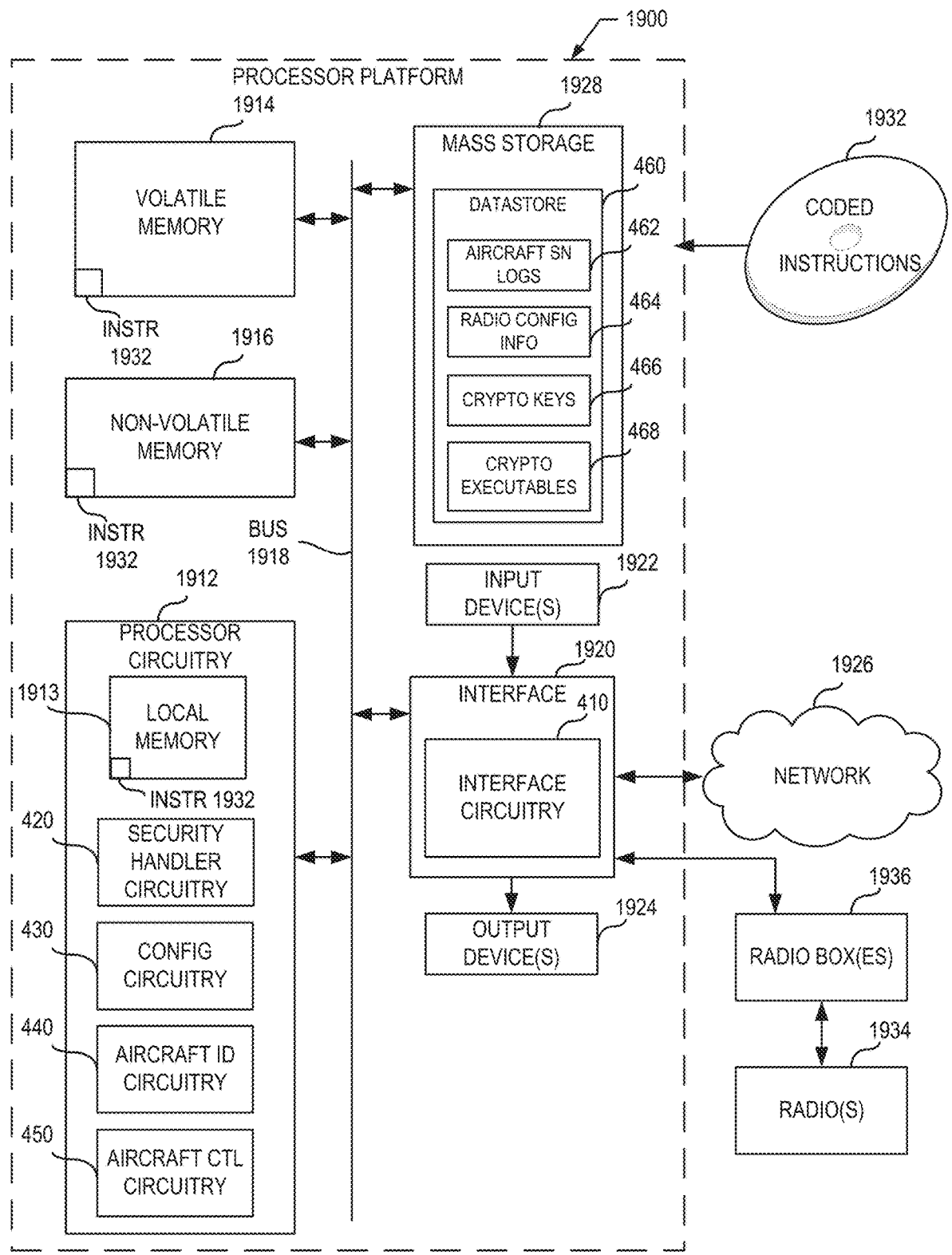
FIG. 19 is a block diagram of an example processing platform including processor circuitry structured to execute the example machine readable instructions and/or the example operations of FIGS. 10A-10B, 12A-12B, 14, 15, 16, and/or 17 to implement the example radio configuration circuitry of FIG. 4 that may be included in the example control station and/or the example operator workstation of FIGS. 1A and/or 1B.

FIG. 19 is a block diagram of an example processor platform 1900 structured to execute and/or instantiate the machine readable instructions and/or the operations of FIGS. 10A-10B, 12A-12B, 14, 15, 16, and/or 17 to implement the radio configuration circuitry 400 of FIG. 4. In some examples, the processor platform 1900 can implement the first control station 128 of FIGS. 1-3, the second control station 134 of FIGS. 1A-1B, and/or the BLOS control station 304 of FIG. 3. The processor platform 1900 can be, for example, a server, a personal computer, a workstation, a self-learning machine (e.g., a neural network), a mobile device (e.g., a cell phone, a smart phone, a tablet such as an iPad™), a headset (e.g., an AR headset, a VR headset, etc.) or other wearable device, or any other type of computing device. In some examples, the processor platform 1900 can implement one or more VMs, one or more containers, etc., etc. For example, the processor platform 1900 can instantiate a hypervisor to virtualize hardware of the processor platform 1900. In some such examples, the processor platform 1900 can instantiate one or more VMs on top of the hypervisor to implement a hardware abstraction layer to execute the machine readable instructions and/or the operations as described herein.

The processor platform 1900 of the illustrated example includes processor circuitry 1912. The processor circuitry 1912 of the illustrated example is hardware. For example, the processor circuitry 1912 can be implemented by one or more integrated circuits, logic circuits, FPGAs microprocessors, CPUs, GPUs, DSPs, and/or microcontrollers from any desired family or manufacturer. The processor circuitry 1912 may be implemented by one or more semiconductor based (e.g., silicon based) devices. In this example, the processor circuitry 1912 implements the security handler circuitry 420, the configurator circuitry 430 (identified by CONFIG CIRCUITRY), the aircraft identification circuitry 440 (identified by AIRCRAFT ID CIRCUITRY), and the aircraft control circuitry 450 (identified by AIRCRAFT CTL CIRCUITRY) of FIG. 4.

The processor circuitry 1912 of the illustrated example includes a local memory 1913 (e.g., a cache, registers, etc.). The processor circuitry 1912 of the illustrated example is in communication with a main memory including a volatile memory 1914 and a non-volatile memory 1916 by a bus 1918. In this example, the bus 1918 implements the bus 470 of FIG. 4. The volatile memory 1914 may be implemented by SDRAM, DRAM, RDRAM®, and/or any other type of RAM device. The non-volatile memory 1916 may be implemented by flash memory and/or any other desired type of memory device. Access to the main memory 1914, 1916 of the illustrated example is controlled by a memory controller 1917.

The processor platform 1900 of the illustrated example also includes interface circuitry 1920. In this example, the interface circuitry 1920 implements the interface circuitry 410 of FIG. 4. In this example, example radio box(es) 1936 are coupled to the interface circuitry 1920. In this example, example radio(s) 1934 is/are coupled to the radio box(es) 1936. In some examples, the radio(s) 1934 implement(s) the sixth radio 116, the seventh radio 118, the eighth radio 120, the ninth radio 121, the tenth radio 123, the eleventh radio 125, the fifteenth radio 212, the sixteenth radio 306, the seventeenth radio 308, and/or the eighteenth radio 325 of FIGS. 1A, 1B, 2, and/or 3. In some examples, the radio box(es) 1936 implement(s) the first radio box 122, the second radio box 124, the third radio box 126, the fourth radio box 140, the fifth radio box 326, and/or the sixth radio box 328 of FIGS. 1A, 1B, 2, and/or 3.

The interface circuitry 1920 may be implemented by hardware in accordance with any type of interface standard, such as an Ethernet interface, a USB interface, a Bluetooth® interface, an NFC interface, a PCI interface, and/or a PCIe interface.

In the illustrated example, one or more input devices 1922 are connected to the interface circuitry 1920. The input device(s) 1922 permit(s) a user to enter data and/or commands into the processor circuitry 1912. The input device(s) 1922 can be implemented by, for example, an audio sensor, a microphone, a camera (still or video), a keyboard, a button, a mouse, a touchscreen, a track-pad, a trackball, an isopoint device, a joystick, a printer, and/or a voice recognition system.

One or more output devices 1924 are also connected to the interface circuitry 1920 of the illustrated example. The output device(s) 1924 can be implemented, for example, by display devices (e.g., an LED, an OLED, an LCD, a CRT display, an IPS display, a touchscreen, etc.), a tactile output device, an HUD, and/or speaker. The interface circuitry 1920 of the illustrated example, thus, typically includes a graphics driver card, a graphics driver chip, and/or graphics processor circuitry such as a GPU.

The interface circuitry 1920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1926. The communication can be by, for example, an Ethernet connection, a DSL connection, a telephone line connection, a coaxial cable system, a satellite system, a line-of-sight wireless system, a beyond-line-of-sight wireless system, a cellular telephone system, an optical connection, etc.

The processor platform 1900 of the illustrated example also includes one or more mass storage devices 1928 to store software and/or data. Examples of such mass storage devices 1928 include magnetic storage devices, optical storage devices, floppy disk drives, HDDs, CDs, Blu-ray disk drives, RAID systems, solid state storage devices such as flash memory devices and/or SSDs, and DVD drives. In this example, the one or more mass storage devices 1928 implement the datastore 460, the aircraft serial number logs 462 (identified by AIRCRAFT SN LOGS), the radio configuration information 464 (identified by RADIO CONFIG INFO), the cryptographic keys 466 (identified by CRYPTO KEYS), and the cryptographic executables 468 (identified by CRYPTO EXECUTABLES) of FIG. 4.

The machine executable instructions 1932, which may be implemented by the machine readable instructions of FIGS. 10A-10B, 12A-12B, 14, 15, 16, and/or 17, may be stored in the mass storage device 1928, in the volatile memory 1914, in the non-volatile memory 1916, in the network 1926, in the radio(s) 1934, in the radio box(es) 1936, and/or on a removable non-transitory computer readable storage medium such as a CD or DVD.

Figure 20:
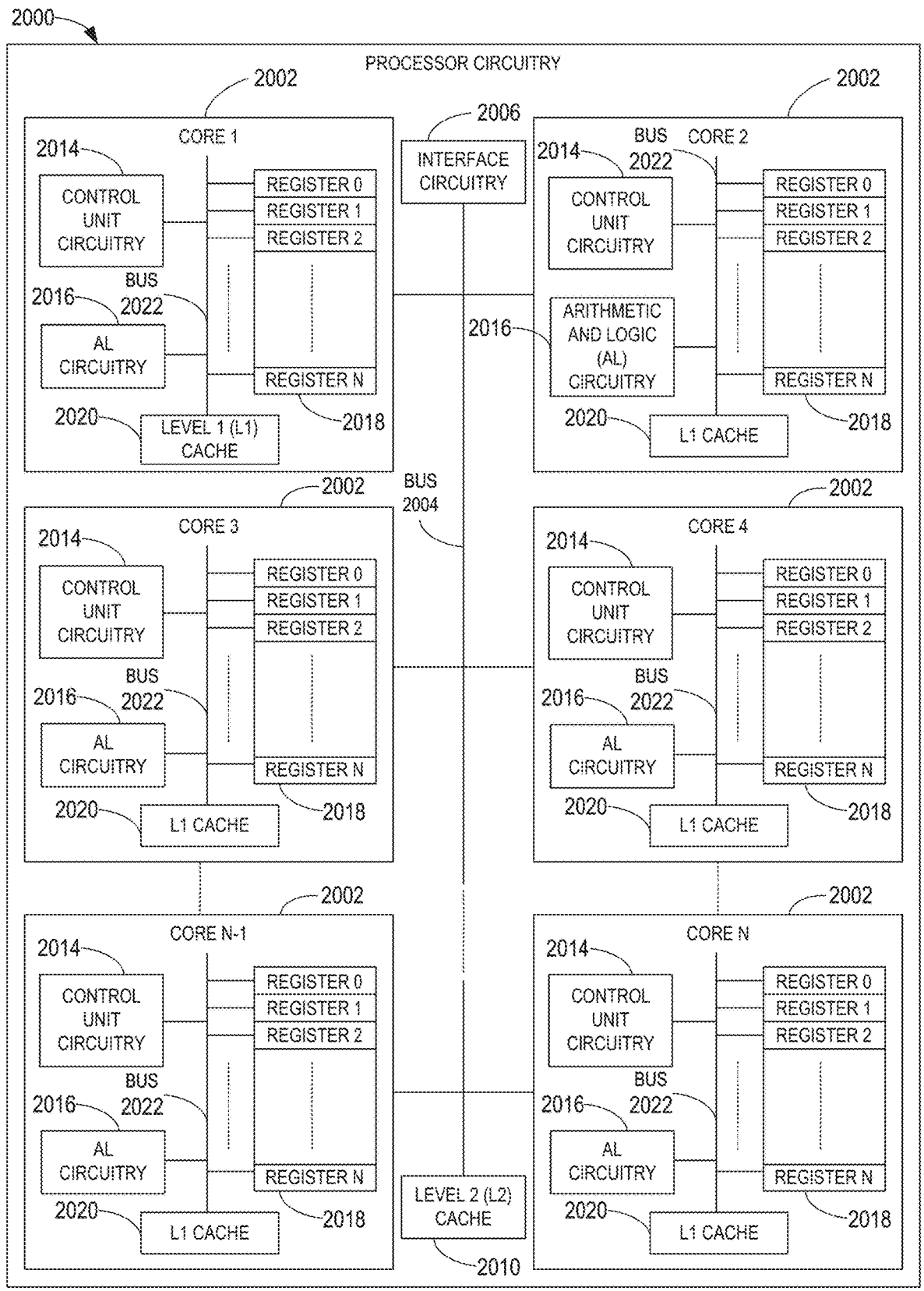
FIG. 20 is a block diagram of an example implementation of the processor circuitry of FIGS. 18 and/or 19.

FIG. 20 is a block diagram of an example implementation of the processor circuitry 1812 of FIG. 18 and/or the processor circuitry 1912 of FIG. 19. In this example, the processor circuitry 1812 of FIG. 18 and/or the processor circuitry 1912 of FIG. 19 is implemented by a general purpose microprocessor 2000. The general purpose microprocessor circuitry 2000 executes some or all of the machine readable instructions of the data flow diagrams and/or the flowcharts of FIGS. 10A-10B, 12A-12B, 14, 15, 16, and/or 17 to effectively instantiate the radio configuration circuitry 400 of FIG. 4 as logic circuits to perform the operations corresponding to those machine readable instructions. For example, the microprocessor 2000 may implement multi-core hardware circuitry such as a CPU, a DSP, a GPU, an XPU, etc. Although it may include any number of example cores 2002 (e.g., 1 core), the microprocessor 2000 of this example is a multi-core semiconductor device including N cores. The cores 2002 of the microprocessor 2000 may operate independently or may cooperate to execute machine readable instructions. For example, machine code corresponding to a firmware program, an embedded software program, or a software program may be executed by one of the cores 2002 or may be executed by multiple ones of the cores 2002 at the same or different times. In some examples, the machine code corresponding to the firmware program, the embedded software program, or the software program is split into threads and executed in parallel by two or more of the cores 2002. The software program may correspond to a portion or all of the machine readable instructions and/or operations represented by the data flow diagrams and/or the flowcharts of FIGS. 10A-10B, 12A-12B, 14, 15, 16, and/or 17.

The cores 2002 may communicate by a first example bus 2004. In some examples, the first bus 2004 may implement a communication bus to effectuate communication associated with one(s) of the cores 2002. For example, the first bus 2004 may implement at least one of an I2C bus, a SPI bus, a PCI bus, or a PCIe bus. Additionally or alternatively, the first bus 2004 may implement any other type of computing or electrical bus. The cores 2002 may obtain data, instructions, and/or signals from one or more external devices by example interface circuitry 2006. The cores 2002 may output data, instructions, and/or signals to the one or more external devices by the interface circuitry 2006. Although the cores 2002 of this example include example local memory 2020 (e.g., Level 1 (L1) cache that may be split into an L1 data cache and an L1 instruction cache), the microprocessor 2000 also includes example shared memory 2010 that may be shared by the cores (e.g., Level 2 (L2_cache)) for high-speed access to data and/or instructions. Data and/or instructions may be transferred (e.g., shared) by writing to and/or reading from the shared memory 2010. The local memory 2020 of each of the cores 2002 and the shared memory 2010 may be part of a hierarchy of storage devices including multiple levels of cache memory and the main memory (e.g., the main memory 1814, 1816 of FIG. 18, the main memory 1914, 1916 of FIG. 19, etc.). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2002 may be referred to as a CPU, DSP, GPU, etc., or any other type of hardware circuitry. Each core 2002 includes control unit circuitry 2014, arithmetic and logic (AL) circuitry (sometimes referred to as an ALU) 2016, a plurality of registers 2018, the L1 cache 2020, and a second example bus 2022. Other structures may be present. For example, each core 2002 may include vector unit circuitry, single instruction multiple data (SIMD) unit circuitry, load/store unit (LSU) circuitry, branch/jump unit circuitry, floating-point unit (FPU) circuitry, etc. The control unit circuitry 2014 includes semiconductor-based circuits structured to control (e.g., coordinate) data movement within the corresponding core 2002. The AL circuitry 2016 includes semiconductor-based circuits structured to perform one or more mathematic and/or logic operations on the data within the corresponding core 2002. The AL circuitry 2016 of some examples performs integer based operations. In other examples, the AL circuitry 2016 also performs floating point operations. In yet other examples, the AL circuitry 2016 may include first AL circuitry that performs integer based operations and second AL circuitry that performs floating point operations. In some examples, the AL circuitry 2016 may be referred to as an Arithmetic Logic Unit (ALU). The registers 2018 are semiconductor-based structures to store data and/or instructions such as results of one or more of the operations performed by the AL circuitry 2016 of the corresponding core 2002. For example, the registers 2018 may include vector register(s), SIMD register(s), general purpose register(s), flag register(s), segment register(s), machine specific register(s), instruction pointer register(s), control register(s), debug register(s), memory management register(s), machine check register(s), etc. The registers 2018 may be arranged in a bank as shown in FIG. 20. Alternatively, the registers 2018 may be organized in any other arrangement, format, or structure including distributed throughout the core 2002 to shorten access time. The second bus 2022 may implement at least one of an I2C bus, a SPI bus, a PCI bus, or a PCIe bus Each core 2002 and/or, more generally, the microprocessor 2000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 2000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 21:
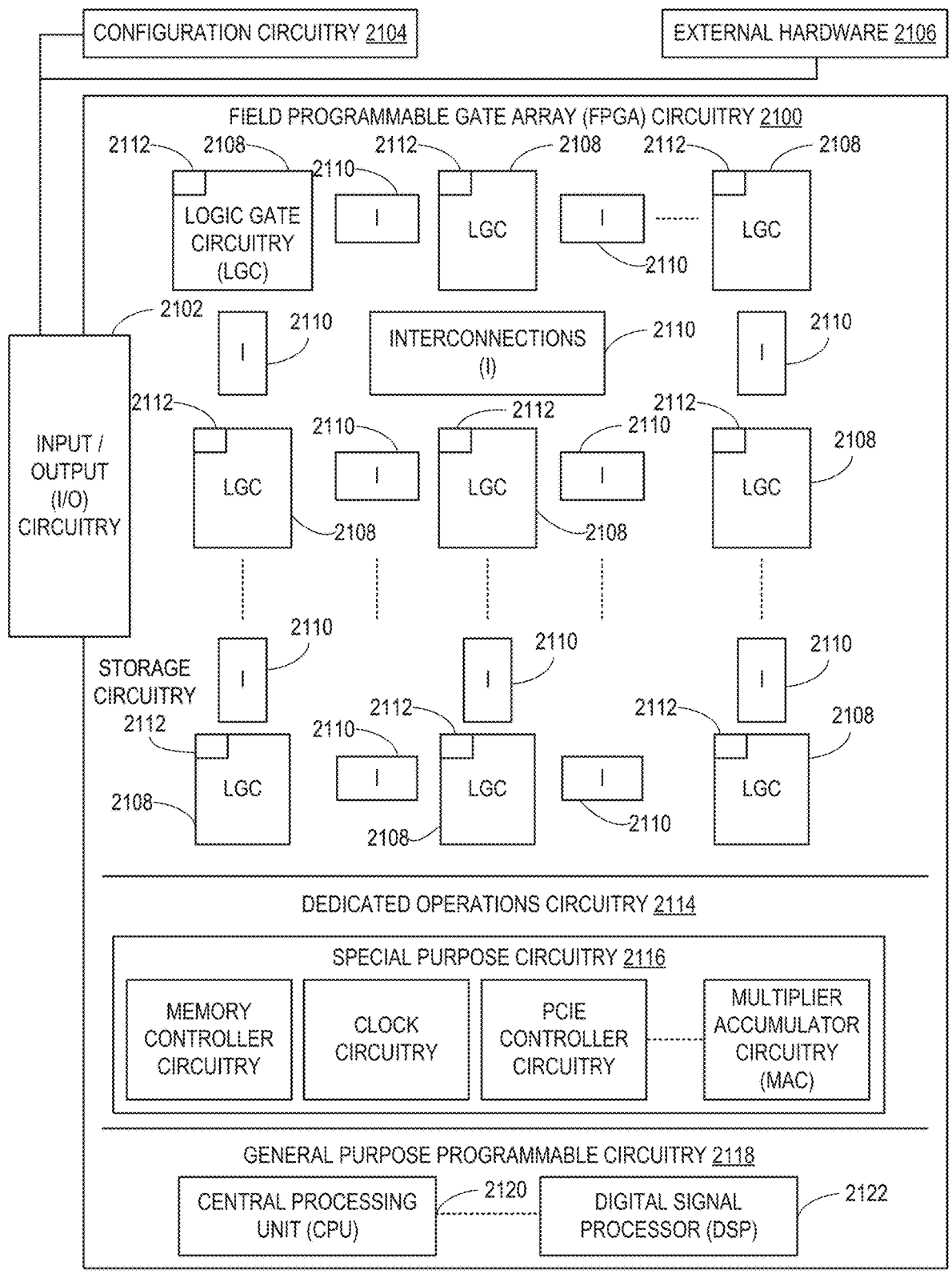
FIG. 21 is a block diagram of another example implementation of the processor circuitry of FIGS. 18 and/or 19.

FIG. 21 is a block diagram of another example implementation of the processor circuitry 1812 of FIG. 18 and/or the processor circuitry 1912 of FIG. 19. In this example, the processor circuitry 1812 of FIG. 18 and/or the processor circuitry 1912 of FIG. 19 is/are implemented by FPGA circuitry 2100. The FPGA circuitry 2100 can be used, for example, to perform operations that could otherwise be performed by the example microprocessor 2000 of FIG. 20 executing corresponding machine readable instructions. However, once configured, the FPGA circuitry 2100 instantiates the machine readable instructions in hardware and, thus, can often execute the operations faster than they could be performed by a general purpose microprocessor executing the corresponding software.

More specifically, in contrast to the microprocessor 2000 of FIG. 20 described above (which is a general purpose device that may be programmed to execute some or all of the machine readable instructions represented by the data flow diagrams and/or the flowcharts of FIGS. 10A-10B, 12A-12B, 14, 15, 16, and/or 17 but whose interconnections and logic circuitry are fixed once fabricated), the FPGA circuitry 2100 of the example of FIG. 21 includes interconnections and logic circuitry that may be configured and/or interconnected in different ways after fabrication to instantiate, for example, some or all of the machine readable instructions represented by the data flow diagrams and/or the flowcharts of FIGS. 10A-10B, 12A-12B, 14, 15, 16, and/or 17. In particular, the FPGA 2100 may be thought of as an array of logic gates, interconnections, and switches. The switches can be programmed to change how the logic gates are interconnected by the interconnections, effectively forming one or more dedicated logic circuits (unless and until the FPGA circuitry 2100 is reprogrammed). The configured logic circuits enable the logic gates to cooperate in different ways to perform different operations on data received by input circuitry. Those operations may correspond to some or all of the software represented by the data flow diagrams and/or the flowcharts of FIGS. 10A-10B, 12A-12B, 14, 15, 16, and/or 17. As such, the FPGA circuitry 2100 may be structured to effectively instantiate some or all of the machine readable instructions of the data flow diagrams and/or the flowcharts of FIGS. 10A-10B, 12A-12B, 14, 15, 16, and/or 17 as dedicated logic circuits to perform the operations corresponding to those software instructions in a dedicated manner analogous to an ASIC. Therefore, the FPGA circuitry 2100 may perform the operations corresponding to the some or all of the machine readable instructions of FIGS. 10A-10B, 12A-12B, 14, 15, 16, and/or 17 faster than the general purpose microprocessor can execute the same.

In the example of FIG. 21, the FPGA circuitry 2100 is structured to be programmed (and/or reprogrammed one or more times) by an end user by a hardware description language (HDL) such as Verilog. The FPGA circuitry 2100 of FIG. 21, includes example input/output (I/O) circuitry 2102 to obtain and/or output data to/from example configuration circuitry 2104 and/or external hardware (e.g., external hardware circuitry) 2106. For example, the configuration circuitry 2104 may implement interface circuitry that may obtain machine readable instructions to configure the FPGA circuitry 2100, or portion(s) thereof. In some such examples, the configuration circuitry 2104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2106 may implement the microprocessor 2000 of FIG. 20. The FPGA circuitry 2100 also includes an array of example logic gate circuitry 2108, a plurality of example configurable interconnections 2110, and example storage circuitry 2112. The logic gate circuitry 2108 and interconnections 2110 are configurable to instantiate one or more operations that may correspond to at least some of the machine readable instructions of FIGS. 10A-10B, 12A-12B, 14, 15, 16, and/or 17 and/or other desired operations. The logic gate circuitry 2108 shown in FIG. 21 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2108 to enable configuration of the electrical structures and/or the logic gates to form circuits to perform desired operations. The logic gate circuitry 2108 may include other electrical structures such as look-up tables (LUTs), registers (e.g., flip-flops or latches), multiplexers, etc.

The interconnections 2110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2108 to program desired logic circuits.

The storage circuitry 2112 of the illustrated example is structured to store result(s) of the one or more of the operations performed by corresponding logic gates. The storage circuitry 2112 may be implemented by registers or the like. In the illustrated example, the storage circuitry 2112 is distributed amongst the logic gate circuitry 2108 to facilitate access and increase execution speed.

The example FPGA circuitry 2100 of FIG. 21 also includes example Dedicated Operations Circuitry 2114. In this example, the Dedicated Operations Circuitry 2114 includes special purpose circuitry 2116 that may be invoked to implement commonly used functions to avoid the need to program those functions in the field. Examples of such special purpose circuitry 2116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2100 may also include example general purpose programmable circuitry 2118 such as an example CPU 2120 and/or an example DSP 2122. Other general purpose programmable circuitry 2118 may additionally or alternatively be present such as a GPU, an XPU, etc., that can be programmed to perform other operations.

Although FIGS. 20 and 21 illustrate two example implementations of the processor circuitry 1812 of FIG. 18 and/or the processor circuitry 1912 of FIG. 19, many other approaches are contemplated. For example, as mentioned above, modern FPGA circuitry may include an on-board CPU, such as one or more of the example CPU 2120 of FIG. 21. Therefore, the processor circuitry 1812 of FIG. 18 and/or the processor circuitry 1912 of FIG. 19 may additionally be implemented by combining the example microprocessor 2000 of FIG. 20 and the example FPGA circuitry 2100 of FIG. 21. In some such hybrid examples, a first portion of the machine readable instructions represented by the data flow diagrams and/or the flowcharts of FIGS. 10A-10B, 12A-12B, 14, 15, 16, and/or 17 may be executed by one or more of the cores 2002 of FIG. 20, a second portion of the machine readable instructions represented by the data flow diagrams and/or the flowcharts of FIGS. 10A-10B, 12A-12B, 14, 15, 16, and/or 17 may be executed by the FPGA circuitry 2100 of FIG. 21, and/or a third portion of the machine readable instructions represented by the data flow diagrams and/or the flowcharts of FIGS. 10A-10B, 12A-12B, 14, 15, 16, and/or 17 may be executed by an ASIC. It should be understood that some or all of the circuitry of FIG. 4 may, thus, be instantiated at the same or different times. Some or all of the circuitry may be instantiated, for example, in one or more threads executing concurrently and/or in series. Moreover, in some examples, some or all of the circuitry of FIG. 4 may be implemented within one or more virtual machines and/or containers executing on the microprocessor.

In some examples, the processor circuitry 1812 of FIG. 18 and/or the processor circuitry 1912 of FIG. 19 may be in one or more packages. For example, the processor circuitry 2000 of FIG. 20 and/or the FPGA circuitry 2100 of FIG. 21 may be in one or more packages. In some examples, an XPU may be implemented by the processor circuitry 1812 of FIG. 18 and/or the processor circuitry 1912 of FIG. 19, which may be in one or more packages. For example, the XPU may include a CPU in one package, a DSP in another package, a GPU in yet another package, and an FPGA in still yet another package.

Figure 22:
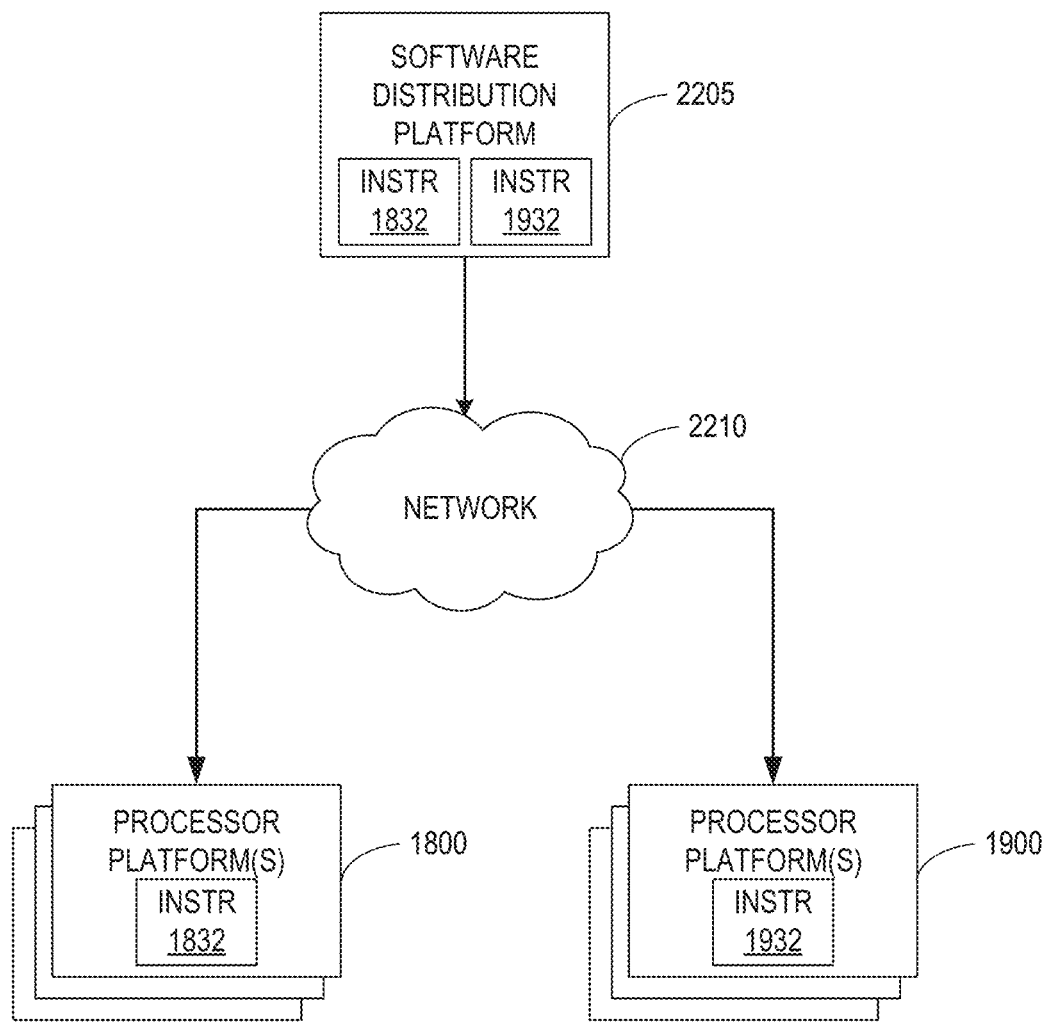
FIG. 22 is a block diagram of an example software distribution platform (e.g., one or more servers) to distribute software (e.g., software corresponding to the example machine readable instructions of FIGS. 10A-10B, 12A-12B, 14, 15, 16, and/or 17) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 2205 to distribute software such as the example machine readable instructions 1832 of FIG. 18 and/or the example machine readable instructions 1932 of FIG. 19 to hardware devices owned and/or operated by third parties is illustrated in FIG. 22. The example software distribution platform 2205 may be implemented by any computer server, data facility, cloud service, etc., capable of storing and transmitting software to other computing devices. The third parties may be customers of the entity owning and/or operating the software distribution platform 2205. For example, the entity that owns and/or operates the software distribution platform 2205 may be a developer, a seller, and/or a licensor of software such as the example machine readable instructions 1832 of FIG. 18 and/or the example machine readable instructions 1932 of FIG. 19. The third parties may be consumers, users, retailers, OEMs, etc., who purchase and/or license the software for use and/or re-sale and/or sub-licensing. In the illustrated example, the software distribution platform 2205 includes one or more servers and one or more storage devices. The storage devices store the machine readable instructions 1832, 1932, which may correspond to the example machine readable instructions 1000, 1200, 1400, 1500, 1600, 1700 of FIGS. 10A-10B, 12A-12B, 14, 15, 16, and/or 17, as described above. The one or more servers of the example software distribution platform 2205 are in communication with a network 2210, which may correspond to any one or more of the Internet and/or any of the example networks 319, 1826, 1926 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1832, 1932 from the software distribution platform 2205. For example, the software, which may correspond to the example machine readable instructions 1000, 1200, 1400, 1500, 1600, 1700 of FIGS. 10A-10B, 12A-12B, 14, 15, 16, and/or 17, may be downloaded to the example processor platform 1800, which is to execute the machine readable instructions 1832 to implement the radio configuration circuitry 400 and/or the example processor platform 1900, which is to execute the machine readable instructions 1932 to implement the radio configuration circuitry 400. In some example, one or more servers of the software distribution platform 2205 periodically offer, transmit, and/or force updates to the software (e.g., the example machine readable instructions 1832 of FIG. 18, the example machine readable instructions 1932 of FIG. 19, etc.) to ensure improvements, patches, updates, etc., are distributed and applied to the software at the end user devices.

From the foregoing, it will be appreciated that example systems, methods, apparatus, and articles of manufacture have been disclosed for aircraft communication configuration. Examples disclosed herein utilize public radios to configure private radios for enhanced security of communications between ground control stations and aircraft. Examples disclosed herein utilize low power and/or low bandwidth communication protocols to convey radio configuration information for aircraft and/or ground control radio information. Disclosed systems, methods, apparatus, and articles of manufacture improve the efficiency of using a computing device by reducing the amount of power and computation required to generate, transmit, and/or receive radio messages that convey radio configuration information. Disclosed systems, methods, apparatus, and articles of manufacture are accordingly directed to one or more improvement(s) in the operation of a machine such as a computer or other electronic and/or mechanical device.

Example methods, apparatus, systems, and articles for aircraft communication configuration are disclosed herein. Further examples and combinations thereof include the following:

Example 1 includes an apparatus comprising memory, instructions in the apparatus, and processor circuitry to execute the instructions to decrypt a first message received from a first radio of an aircraft, the first radio using a first communication protocol, the aircraft including a second radio to be configured for a second communication protocol different from the first communication protocol, and in response to a determination that the first message includes radio configuration information associated with the second radio, configure a third radio to transmit a second message to the second radio based on the radio configuration information.

Example 2 includes the apparatus of example 1, wherein the processor circuitry is to at least one of control the aircraft to perform a flight operation or cause the second radio to be configured based on the second message.

Example 3 includes the apparatus of example 1 or 2, wherein the first communication protocol is a public communication protocol associated with a first bandwidth and the second communication protocol is a private communication protocol associated with a second bandwidth, the first bandwidth less than the second bandwidth, and the public communication protocol is based on an S-Band, an L-Band, a C-Band, a Ka-Band, a Ku-Band, a very high frequency (VHF) band, or an ultra high frequency (UHF) band of the electromagnetic spectrum.

Example 4 includes the apparatus of examples 1-3, wherein the radio configuration information is second radio configuration information, and the processor circuitry is to execute the instructions to generate a first digital certificate associated with the first radio of the aircraft, generate a second digital certificate associated with the second radio of the aircraft, generate a third digital certificate associated with the third radio to a control station associated with the third radio, and determine first radio configuration information, the second radio configuration information, and third radio configuration information for respective ones of the first radio, the second radio, and the third radio based on respective ones of the first digital certificate, the second digital certificate, and the third digital certificate, and at least one of the first radio configuration information, the second radio configuration information, or the third radio configuration information including at least one of a radio configuration setting or an encryption key setting.

Example 5 includes the apparatus of examples 1-4, wherein the determination is a first determination, the radio configuration information is second radio configuration information, and the processor circuitry is to execute the instructions to in response to a second determination that the first message does not include the second radio configuration information associated with the second radio, generate first radio configuration information, deliver a third message to the aircraft based on the first radio configuration information, in response to not establishing communication with the aircraft based on the third message, generate the second radio configuration information, and invoke communication with the aircraft based on the second radio configuration information.

Example 6 includes the apparatus of examples 1-5, wherein the aircraft is a first aircraft, and the apparatus is included in a second aircraft, a ground vehicle, a marine vehicle, a line-of-sight control station, a beyond-line-of-sight control station, or a satellite.

Example 7 includes the apparatus of examples 1-6, wherein the processor circuitry is to receive the first message from an Internet-of-Things (IoT) device or a cloud provider associated with the IoT device, the IoT device to receive the first message from the aircraft.

Example 8 includes the apparatus of examples 1-7, wherein the aircraft is a first aircraft, the apparatus, the third radio, and a fourth radio are included in a second aircraft, the first message to be received with the fourth radio, the third radio is a private radio and the fourth radio is a public radio, and the processor circuitry is to execute the instructions to receive the first message with the public radio of the second aircraft, provide the first message from the public radio to a network switch included in the second aircraft, provide the first message from the network switch to a payload computer of the second aircraft, validate the radio configuration information based on cryptographic information included in the radio configuration information, in response to a validation of the radio configuration information, configure the private radio of the second aircraft based on the radio configuration information, and transmit the second message with the private radio.

Example 9 includes a non-transitory computer readable storage medium comprising instructions that, when executed, cause processor circuitry to at least decrypt a first message received from a first radio of an aircraft, the first radio using a first communication protocol, the aircraft including a second radio to be configured for a second communication protocol different from the first communication protocol, and in response to a determination that the first message includes radio configuration information associated with the second radio, configure a third radio to transmit a second message to the second radio based on the radio configuration information.

Example 10 includes the non-transitory computer readable storage medium of example 9, wherein the instructions, when executed, cause the processor circuitry to at least one of control the aircraft to perform a flight operation or cause the second radio to be configured based on the second message.

Example 11 includes the non-transitory computer readable storage medium of examples 9 or 10, wherein the first communication protocol is a public communication protocol associated with a first bandwidth and the second communication protocol is a private communication protocol associated with a second bandwidth, the first bandwidth less than the second bandwidth, and the private communication protocol is based on an S-Band, an L-Band, a C-Band, a Ka-Band, a Ku-Band, a very high frequency (VHF) band, or an ultra high frequency (UHF) band of the electromagnetic spectrum.

Example 12 includes the non-transitory computer readable storage medium of examples 9-11, wherein the radio configuration information is second radio configuration information, and the instructions, when executed, cause the processor circuitry to generate a first digital certificate associated with the first radio of the aircraft, generate a second digital certificate associated with the second radio of the aircraft, generate a third digital certificate associated with the third radio to a control station associated with the third radio, and determine first radio configuration information, the second radio configuration information, and third radio configuration information for respective ones of the first radio, the second radio, and the third radio based on respective ones of the first digital certificate, the second digital certificate, and the third digital certificate, and at least one of the first radio configuration information, the second radio configuration information, or the third radio configuration information including at least one of a radio configuration setting or an encryption key setting.

Example 13 includes the non-transitory computer readable storage medium of examples 9-12, wherein the determination is a first determination, the radio configuration information is second radio configuration information, and instructions, when executed, cause the processor circuitry to in response to a second determination that the first message does not include the second radio configuration information associated with the second radio, generate first radio configuration information, transmit a third message to the aircraft based on the first radio configuration information, in response to not establishing communication with the aircraft based on the third message, generate the second radio configuration information, and facilitate communication with the aircraft based on the second radio configuration information.

Example 14 includes the non-transitory computer readable storage medium of examples 9-13, wherein the aircraft is a first aircraft, the third radio and a fourth radio are included in a second aircraft, the first message to be received with the fourth radio, the third radio is a private radio and the fourth radio is a public radio, and the instructions, when executed, cause the processor circuitry to obtain the first message with the public radio of the second aircraft, deliver the first message from the public radio to a network switch included in the second aircraft, provide the first message from the network switch to a payload computer of the second aircraft, verify the radio configuration information based on cryptographic information included in the radio configuration information, in response to a verification of the radio configuration information, adjust the private radio of the second aircraft based on the radio configuration information, and transmit the second message with the private radio.

Example 15 includes a method comprising decrypting a first message received from a first radio of an aircraft, the first radio using a first communication protocol, the aircraft including a second radio to be configured for a second communication protocol different from the first communication protocol, and in response to determining that the first message includes radio configuration information associated with the second radio, configuring a third radio to transmit a second message to the second radio based on the radio configuration information.

Example 16 includes the method of example 15, further including at least one of controlling the aircraft to perform a flight operation based on the second message or configuring the second radio based on the second message.

Example 17 includes the method of example 15 or 16, wherein the first communication protocol is a public communication protocol associated with a first bandwidth and the second communication protocol is a private communication protocol associated with a second bandwidth, the first bandwidth less than the second bandwidth, and the private communication protocol is based on an S-Band, an L-Band, a C-Band, a Ka-Band, a Ku-Band, a very high frequency (VHF) band, or an ultra high frequency (UHF) band of the electromagnetic spectrum.

Example 18 includes the method of examples 15-17, wherein the radio configuration information is second radio configuration information, and further including issuing a first digital certificate associated with the first radio of the aircraft, issuing a second digital certificate associated with the second radio of the aircraft, issuing a third digital certificate associated with the third radio to a control station associated with the third radio, and determining first radio configuration information, the second radio configuration information, and third radio configuration information for respective ones of the first radio, the second radio, and the third radio based on respective ones of the first digital certificate, the second digital certificate, and the third digital certificate, and at least one of the first radio configuration information, the second radio configuration information, or the third radio configuration information including at least one of a radio configuration setting or an encryption key setting.

Example 19 includes the method of examples 15-18, wherein the radio configuration information is second radio configuration information, and further including in response to determining that the first message does not include the second radio configuration information associated with the second radio, generating first radio configuration information, transmitting a third message to the aircraft based on the first radio configuration information, in response to not establishing communication with the aircraft based on the third message, generating the second radio configuration information, and establishing communication with the aircraft based on the second radio configuration information.

Example 20 includes the method of examples 15-19, wherein the aircraft is a first aircraft, the third radio and a fourth radio included in a second aircraft, the first message to be received with the fourth radio, the third radio is a private radio and the fourth radio is a public radio, and further including receiving the first message with the public radio of the second aircraft, providing the first message from the public radio to a network switch included in the second aircraft, providing the first message from the network switch to a payload computer of the second aircraft, authenticating the radio configuration information based on cryptographic information included in the radio configuration information, in response to authenticating the radio configuration information, configuring the private radio of the second aircraft based on the radio configuration information, and transmitting the second message with the private radio.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
  memory;
  machine-readable instructions; and
  at least one processor circuit to execute the machine-readable instructions to:
    generate a first digital certificate associated with a first radio of an aircraft;
    generate a second digital certificate associated with a second radio of the aircraft;

generate a third digital certificate associated with a third radio to a control station associated with the third radio;
determine first radio configuration information, second radio configuration information, and third radio configuration information for respective ones of the first radio, the second radio, and the third radio based on respective ones of the first digital certificate, the second digital certificate, and the third digital certificate, at least one of the first radio configuration information, the second radio configuration information, or the third radio configuration information including at least one of a radio configuration setting or an encryption key setting;
decrypt a first message received from the first radio, the first radio using a first communication protocol, the second radio to be configured for a second communication protocol different from the first communication protocol; and
in response to a determination that the first message includes the second radio configuration information associated with the second radio, configure the third radio to transmit a second message to the second radio based on the second radio configuration information.

2. The apparatus of claim 1, wherein one or more of the at least one processor circuit is to at least one of control the aircraft to perform a flight operation or cause the second radio to be configured based on the second message.

3. The apparatus of claim 1, wherein the first communication protocol is a public communication protocol associated with a first bandwidth and the second communication protocol is a private communication protocol associated with a second bandwidth, the first bandwidth less than the second bandwidth, and the public communication protocol is based on an S-Band, an L-Band, a C-Band, a Ka-Band, a Ku-Band, a very high frequency (VHF) band, or an ultra high frequency (UHF) band of the electromagnetic spectrum.

4. The apparatus of claim 1, wherein the determination is a first determination, and one or more of the at least one processor circuit is to execute the machine-readable instructions to:
in response to a second determination that the first message does not include the second radio configuration information associated with the second radio, deliver a third message to the aircraft based on the first radio configuration information; and
in response to not establishing communication with the aircraft based on the third message, invoke communication with the aircraft based on the second radio configuration information.

5. The apparatus of claim 1, wherein the aircraft is a first aircraft, and the apparatus is included in a second aircraft, a ground vehicle, a marine vehicle, a line-of-sight control station, a beyond-line-of-sight control station, or a satellite.

6. The apparatus of claim 1, wherein the aircraft is a first aircraft, the apparatus, the third radio, and a fourth radio are included in a second aircraft, the first message to be received with the fourth radio, the third radio is a public radio and the fourth radio is a private radio, and one or more of the at least one processor circuit is to execute the instructions to:
receive the first message with the public radio of the second aircraft;
provide the first message from the public radio to a network switch included in the second aircraft;
provide the first message from the network switch to a payload computer of the second aircraft;
validate the second radio configuration information based on cryptographic information included in the second radio configuration information;
in response to a validation of the second radio configuration information, configure the private radio of the second aircraft based on the second radio configuration information; and
transmit the second message with the private radio.

7. An apparatus comprising:
memory;
machine-readable instructions; and
at least one processor circuit to execute the machine-readable instructions to:
decrypt a first message received from a first radio of an aircraft, the first radio using a first communication protocol, the aircraft including a second radio to be configured for a second communication protocol different from the first communication protocol, the first message received from an Internet-of-Things (IoT) device or a cloud provider associated with the IoT device, the IoT device to receive the first message from the aircraft;
determine that the first message includes radio configuration information associated with the second radio; and
in response to the determination that the first message includes the radio configuration information associated with the second radio, configure a third radio to transmit a second message to the second radio based on the radio configuration information.

8. The apparatus of claim 7, wherein the machine-readable instructions are to cause one or more of the at least one processor circuit to:
determine that the first message includes radio encryption key enumeration corresponding to the second radio; and
cause the radio encryption key enumeration to be displayed via a graphic user interface.

9. The apparatus of claim 7, wherein the machine-readable instructions are to cause one or more of the at least one processor circuit to determine that the third radio is compatible with the radio configuration information.

10. At least one non-transitory computer readable storage medium comprising machine-readable instructions to cause at least one processor circuit to at least:
generate a first digital certificate associated with a first radio of an aircraft;
generate a second digital certificate associated with a second radio of the aircraft;
generate a third digital certificate associated with a third radio to a control station associated with the third radio;
determine first radio configuration information, second radio configuration information, and third radio configuration information for respective ones of the first radio, the second radio, and the third radio based on respective ones of the first digital certificate, the second digital certificate, and the third digital certificate, and at least one of the first radio configuration information, the second radio configuration information, or the third radio configuration information including at least one of a radio configuration setting or an encryption key setting;
decrypt a first message received from the first radio, the first radio using a first communication protocol, the second radio to be configured for a second communication protocol different from the first communication protocol; and in response to a determination that the first message includes the second radio configuration information associated with the second radio, configure the third radio to transmit a second message to the second radio based on the second radio configuration information.

11. The at least one non-transitory computer readable storage medium of claim 10, wherein the machine-readable instructions are to cause one or more of the at least one processor circuit to at least one of control the aircraft to perform a flight operation or cause the second radio to be configured based on the second message.

12. The at least one non-transitory computer readable storage medium of claim 10, wherein the first communication protocol is a public communication protocol associated with a first bandwidth and the second communication protocol is a private communication protocol associated with a second bandwidth, the first bandwidth less than the second bandwidth, and the private communication protocol is based on an S-Band, an L-Band, a C-Band, a Ka-Band, a Ku-Band, a very high frequency (VHF) band, or an ultra high frequency (UHF) band of the electromagnetic spectrum.

13. The at least one non-transitory computer readable storage medium of claim 10, wherein the determination is a first determination, and the machine-readable instructions are to cause one or more of the at least one processor circuit to:

in response to a second determination that the first message does not include the second radio configuration information associated with the second radio, transmit a third message to the aircraft based on the first radio configuration information; and in response to not establishing communication with the aircraft based on the third message, facilitate communication with the aircraft based on the second radio configuration information.

14. The at least one non-transitory computer readable storage medium of claim 10, wherein the aircraft is a first aircraft, the third radio and a fourth radio are included in a second aircraft, the first message to be received with the fourth radio, the third radio is a public radio and the fourth radio is a private radio, and the machine-readable instructions are to cause one or more of the at least one processor circuit to:

obtain the first message with the public radio of the second aircraft;

deliver the first message from the public radio to a network switch included in the second aircraft;

provide the first message from the network switch to a payload computer of the second aircraft;

verify the second radio configuration information based on cryptographic information included in the second radio configuration information;

in response to a verification of the second radio configuration information, adjust the private radio of the second aircraft based on the second radio configuration information; and transmit the second message with the private radio.

15. The at least one non-transitory computer readable storage medium of claim 10, wherein the machine-readable instructions are to cause one or more of the at least one processor circuit to:

determine that the first message includes radio encryption key enumeration corresponding to the second radio; and cause the radio encryption key enumeration to be displayed via a graphic user interface.

16. A method comprising:

issuing a first digital certificate associated with a first radio of an aircraft;

issuing a second digital certificate associated with a second radio of the aircraft;

issuing a third digital certificate associated with a third radio to a control station associated with the third radio; and determining first radio configuration information, second radio configuration information, and third radio configuration information for respective ones of the first radio, the second radio, and the third radio based on respective ones of the first digital certificate, the second digital certificate, and the third digital certificate, and at least one of the first radio configuration information, the second radio configuration information, or the third radio configuration information including at least one of a radio configuration setting or an encryption key setting;

decrypting a first message received from the first radio, the first radio using a first communication protocol, the second radio to be configured for a second communication protocol different from the first communication protocol; and in response to determining that the first message includes the second radio configuration information associated with the second radio, configuring the third radio to transmit a second message to the second radio based on the second radio configuration information.

17. The method of claim 16, further including at least one of controlling the aircraft to perform a flight operation based on the second message or configuring the second radio based on the second message.

18. The method of claim 16, wherein the first communication protocol is a public communication protocol associated with a first bandwidth and the second communication protocol is a private communication protocol associated with a second bandwidth, the first bandwidth less than the second bandwidth, and the private communication protocol is based on an S-Band, an L-Band, a C-Band, a Ka-Band, a Ku-Band, a very high frequency (VHF) band, or an ultra high frequency (UHF) band of the electromagnetic spectrum.

19. The method of claim 16, and further including:

in response to determining that the first message does not include the second radio configuration information associated with the second radio, transmitting a third message to the aircraft based on the first radio configuration information; and in response to not establishing communication with the aircraft based on the third message, establishing communication with the aircraft based on the second radio configuration information.

20. The method of claim 16, wherein the aircraft is a first aircraft, the third radio and a fourth radio included in a second aircraft, the first message to be received with the fourth radio, the third radio is a public radio and the fourth radio is a private radio, and further including:

receiving the first message with the public radio of the second aircraft;

providing the first message from the public radio to a network switch included in the second aircraft;

providing the first message from the network switch to a payload computer of the second aircraft;

authenticating the second radio configuration information based on cryptographic information included in the second radio configuration information;
in response to authenticating the second radio configuration information, configuring the private radio of the second aircraft based on the second radio configuration information; and
transmitting the second message with the private radio.

* * * * *